(12) United States Patent
Smith et al.

(10) Patent No.: US 7,292,763 B2
(45) Date of Patent: Nov. 6, 2007

(54) FIBER ACCESS TERMINAL

(75) Inventors: Trevor Smith, Eden Prairie, MN (US); Matthew D. Ferris, Carver, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/075,847

(22) Filed: Mar. 8, 2005

(65) Prior Publication Data

US 2005/0213921 A1 Sep. 29, 2005

Related U.S. Application Data

(60) Provisional application No. 60/600,129, filed on Aug. 9, 2004, provisional application No. 60/551,164, filed on Mar. 8, 2004.

(51) Int. Cl.
*G02B 6/00* (2006.01)

(52) U.S. Cl. .................................. 385/135; 385/134

(58) Field of Classification Search ............... 385/135
See application file for complete search history.

(56) References Cited

U.S. PATENT DOCUMENTS

| | | | |
|---|---|---|---|
| 4,652,072 A | 3/1987 | Arasi, Jr. | |
| 4,717,231 A | 1/1988 | Dewez et al. | |
| 4,805,979 A | 2/1989 | Bossard et al. | |
| 4,986,762 A | 1/1991 | Keith | |
| 5,029,958 A | 7/1991 | Hodge et al. | |
| 5,046,811 A | 9/1991 | Jung et al. | |
| 5,097,529 A | 3/1992 | Cobb et al. | |
| 5,122,069 A | 6/1992 | Brownlie et al. | |
| 5,129,030 A | 7/1992 | Petrunia | |
| 5,133,038 A | 7/1992 | Zipper | |
| 5,212,761 A | 5/1993 | Petrunia | |
| 5,214,735 A | 5/1993 | Henneberger et al. | |
| 5,231,687 A | 7/1993 | Handley | |
| 5,235,665 A | 8/1993 | Marchesi et al. | |

(Continued)

FOREIGN PATENT DOCUMENTS

EP          0 511 147 A1     10/1992

(Continued)

OTHER PUBLICATIONS

ADC Telecommunications; FL2000 Products; 6 pages; Nov. 1996.

(Continued)

*Primary Examiner*—Sung Pak
(74) *Attorney, Agent, or Firm*—Merchant & Gould, P.C.

(57) ABSTRACT

A fiber access terminal for mounting to the end of a fiber distribution cable and configured to be extended through a buried conduit. The fiber distribution cable may include a plurality of optical fibers and enters a housing of the terminal through a base. The terminal also includes a plurality of fiber optic connectors or adapters extending through the housing in generally the same direction as the fiber distribution cable for connecting to optical fiber customer drop cables. The terminal includes a cover and the housing defining an interior and the interior includes a cable slack storage arrangement providing bend radius protection for the optical fiber cables within the interior. A method of assembling a fiber access terminal. A fiber access terminal assembly including a pedestal mounting arrangement.

17 Claims, 81 Drawing Sheets

U.S. PATENT DOCUMENTS

| | | | |
|---|---|---|---|
| 5,267,122 A | 11/1993 | Glover et al. | |
| 5,363,465 A | 11/1994 | Korkowski et al. | |
| 5,367,598 A | 11/1994 | Devenish, III et al. | |
| RE34,955 E | 5/1995 | Anton et al. | |
| 5,446,823 A | 8/1995 | Bingham et al. | |
| 5,509,099 A * | 4/1996 | Hermsen et al. | 385/134 |
| 5,633,973 A | 5/1997 | Vincent et al. | |
| 5,659,650 A | 8/1997 | Arnett | |
| 5,689,607 A | 11/1997 | Vincent et al. | |
| 5,701,380 A | 12/1997 | Larson et al. | |
| 5,732,180 A | 3/1998 | Kaplan | |
| 5,734,776 A | 3/1998 | Puetz | |
| 5,745,633 A | 4/1998 | Giebel et al. | |
| 5,758,003 A | 5/1998 | Wheeler et al. | |
| 5,781,678 A | 7/1998 | Sano et al. | |
| 5,828,807 A | 10/1998 | Tucker et al. | |
| 5,892,870 A * | 4/1999 | Fingler et al. | 385/59 |
| 5,894,540 A | 4/1999 | Drewing | |
| 5,903,698 A | 5/1999 | Poremba et al. | |
| 5,907,653 A | 5/1999 | Burek et al. | |
| 5,917,648 A | 6/1999 | Harker | |
| 5,975,769 A | 11/1999 | Larson et al. | |
| RE36,592 E | 2/2000 | Giebel et al. | |
| 6,167,183 A | 12/2000 | Swain | |
| 6,208,796 B1 | 3/2001 | Williams Vigliaturo | |
| 6,215,939 B1 | 4/2001 | Cloud | |
| 6,259,024 B1 | 7/2001 | Daoud | |
| 6,292,614 B1 * | 9/2001 | Smith et al. | 385/135 |
| 6,300,562 B1 | 10/2001 | Daoud | |
| 6,439,779 B1 | 8/2002 | Hafer | |
| 6,453,106 B1 | 9/2002 | Glaser et al. | |
| 6,535,682 B1 | 3/2003 | Puetz et al. | |
| 6,621,975 B2 | 9/2003 | Laporte et al. | |
| 6,760,531 B1 | 7/2004 | Solheid et al. | |
| 6,766,094 B2 | 7/2004 | Smith et al. | |
| 6,880,986 B2 | 4/2005 | Mynatt et al. | |
| 6,926,449 B1 | 8/2005 | Keenum et al. | |
| 7,120,347 B2 | 10/2006 | Blackwell, Jr. et al. | |
| 2003/0077041 A1 | 4/2003 | Belaidi et al. | |
| 2003/0103750 A1 | 6/2003 | Laporte et al. | |
| 2004/0062508 A1 | 4/2004 | Blankenship et al. | |
| 2004/0211774 A1 | 10/2004 | Daoud et al. | |
| 2005/0094959 A1 | 5/2005 | Sibley et al. | |
| 2005/0129375 A1 | 6/2005 | Elkins, II et al. | |
| 2005/0145522 A1 | 7/2005 | Bloodworth et al. | |
| 2005/0163448 A1 | 7/2005 | Blackwell, Jr. et al. | |
| 2005/0175307 A1 | 8/2005 | Battey et al. | |
| 2005/0175308 A1 | 8/2005 | Elkins, II et al. | |
| 2005/0185895 A1 | 8/2005 | Keenum et al. | |
| 2005/0213921 A1 | 10/2005 | Mertesdorf et al. | |
| 2005/0220421 A1 | 10/2005 | Keenum et al. | |
| 2006/0098932 A1 * | 5/2006 | Battey et al. | 385/135 |

FOREIGN PATENT DOCUMENTS

| | | |
|---|---|---|
| EP | 0 805 536 A1 | 11/1997 |
| EP | 0 851 257 A1 | 1/1998 |
| EP | 0 844 504 A2 | 5/1998 |
| FR | 2 853 775 A1 | 10/2004 |
| JP | 9-15426 | 1/1997 |
| WO | WO95/07478 | 3/1995 |
| WO | WO 02/06879 A1 | 1/2002 |

OTHER PUBLICATIONS

ADC Telecommunications; Fiber Panel Products Second Edition; 16 pages; Jul. 1996.

ADC Telecommunications; Fiber Cable Management Products Third Edition; 22 pages; Jun. 1998.

ADC Telecommunications; Value-Added Module System; 8 pages; Jun. 1998.

ADC Telecommunications; FL2000™ Wall Mount Box Installation Instructions; 18 pages; ADCP-90-210 Issue 4; Jan. 1998.

ADC Telecommunications; FTUA 4- and 12-Fiber Wall Box User Manual; 14 pages; ADCP-90-249 Issue 2, Mar. 1997.

ADC Telecommunications; Wall Mount Box Dec. 24, 1936 Fiber User Manual; 16 pages; ADCP-90-149 Issue 3, Jul. 1997.

ADC Telecommunications; FL1000 Wall-Mount Box Installation and Operation Guide; 28 pages; ADCP-90-334 Issue 1, Nov. 2004.

ADC Telecommunications; FTD1 36-Fiber Wall Box User Manual; 15 pages; ADCP-90-250 Issue 1, Nov. 1996.

ADC Telecommunications; Six-Fiber In-Building Wall Box Installation Instructions; 8 pages; ADCP-90-167 Issue 3, Nov. 1997.

* cited by examiner

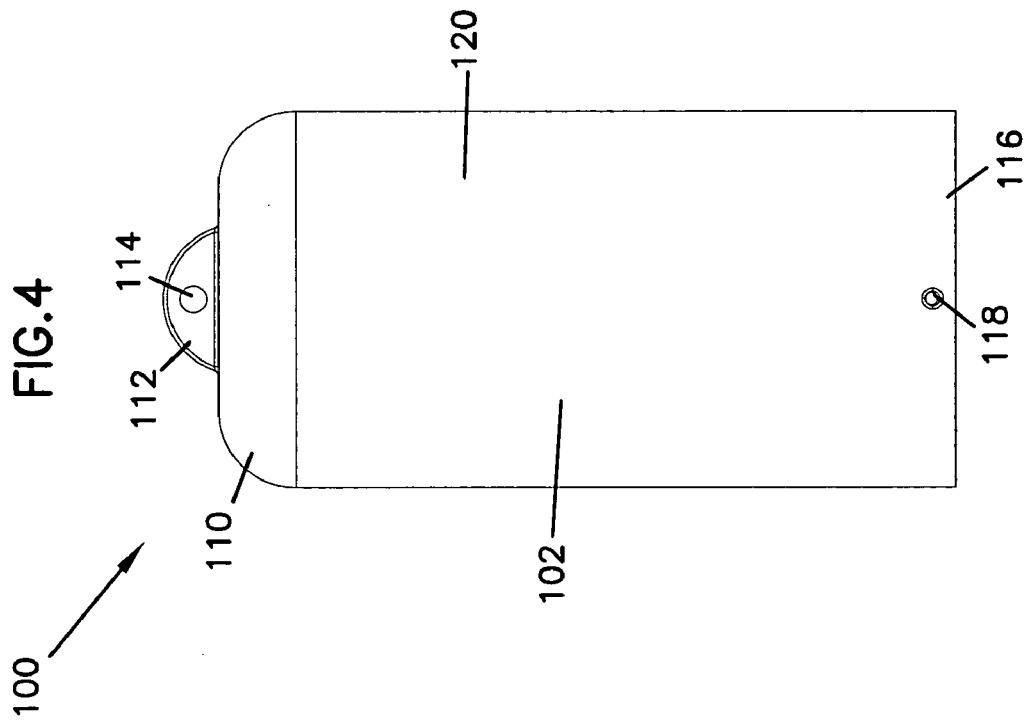
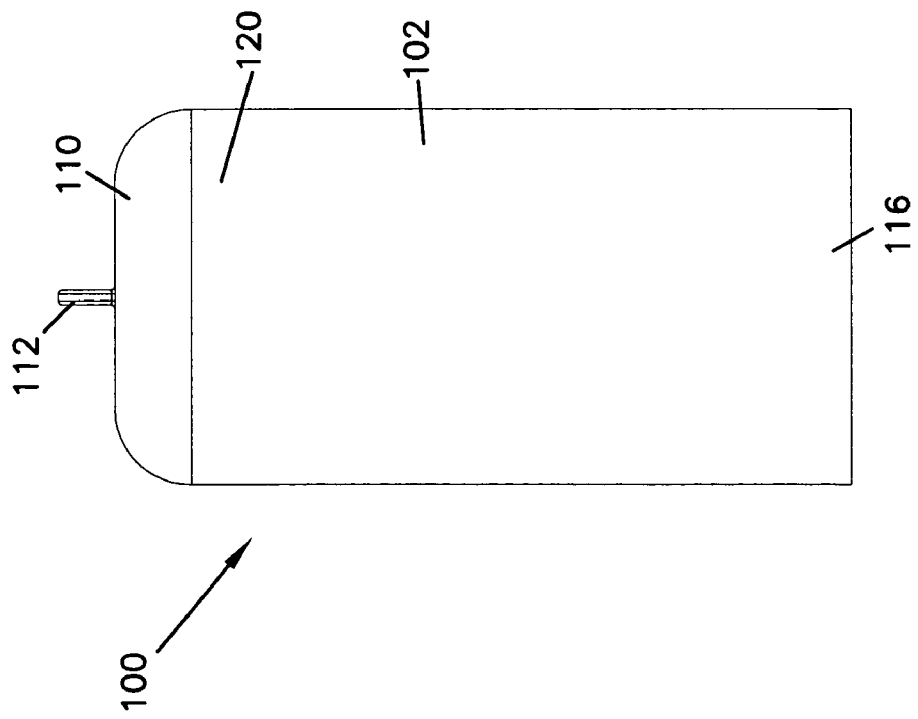

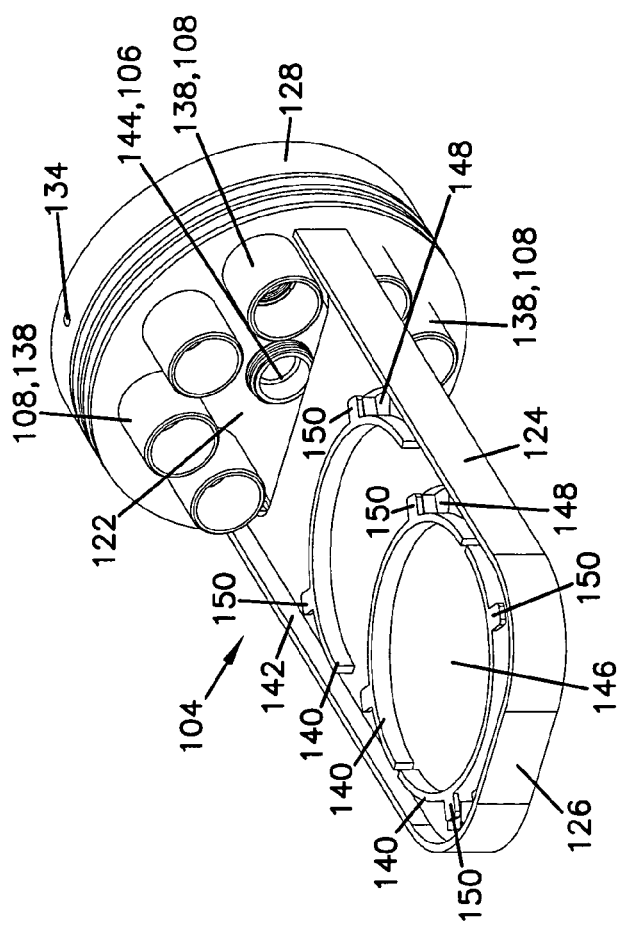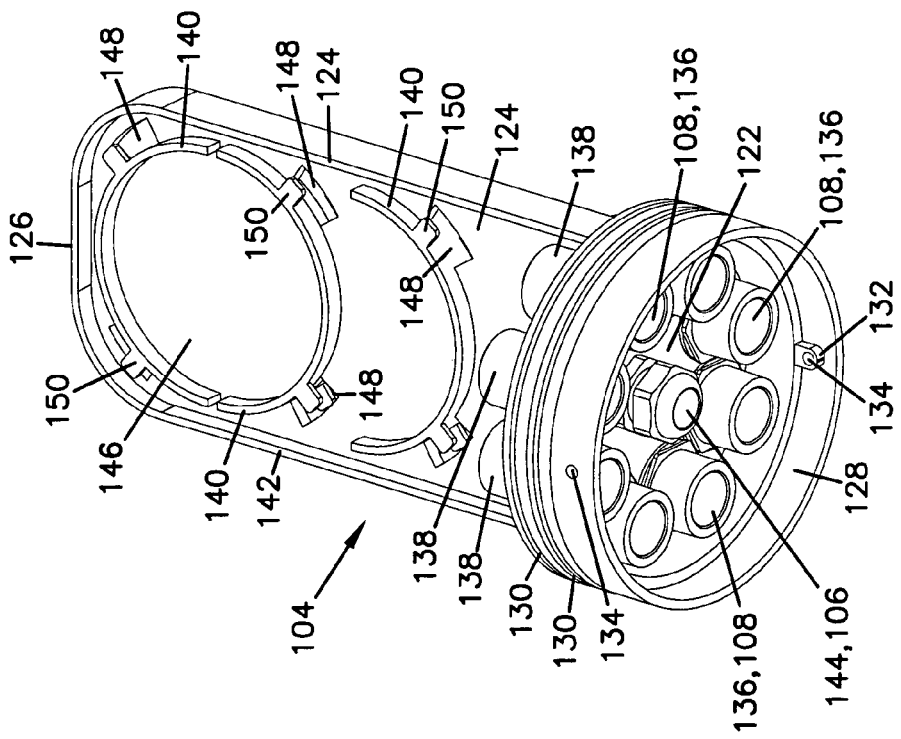

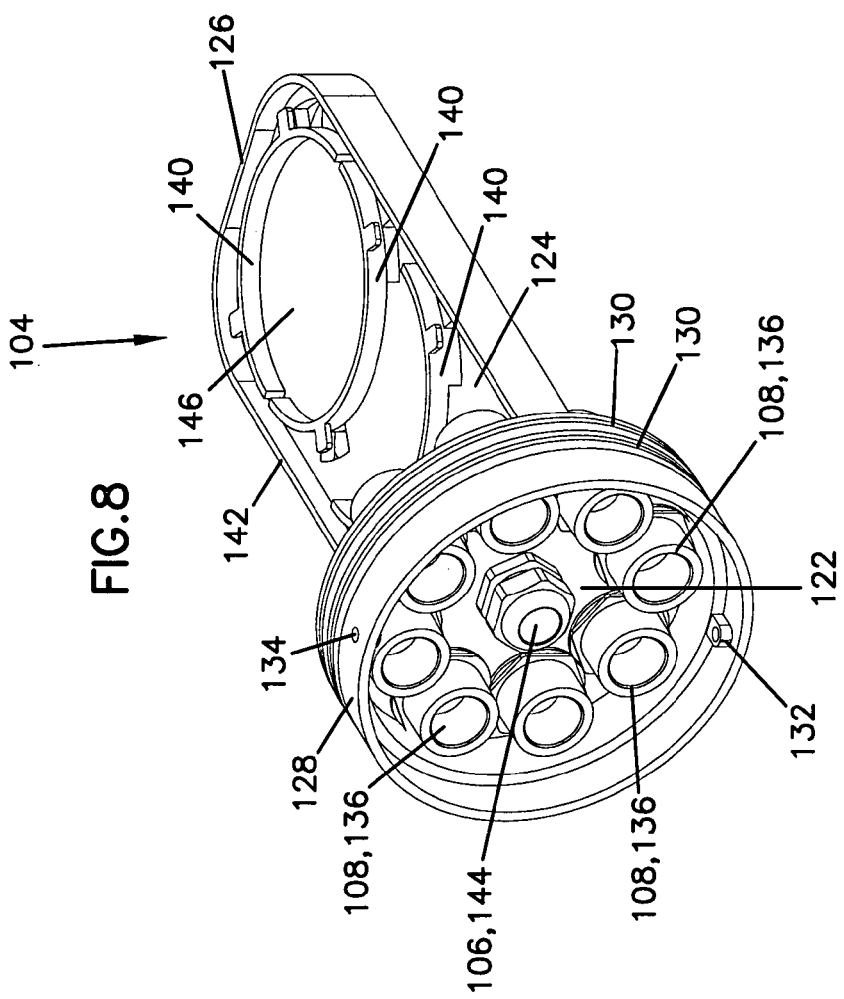
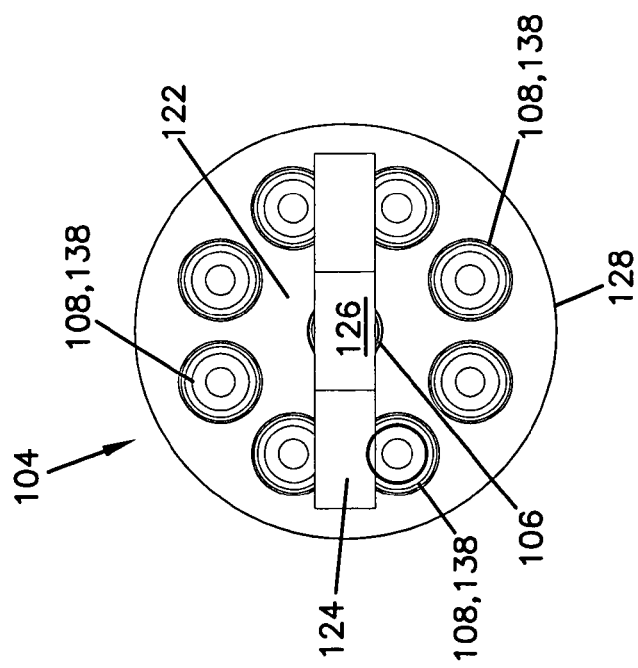

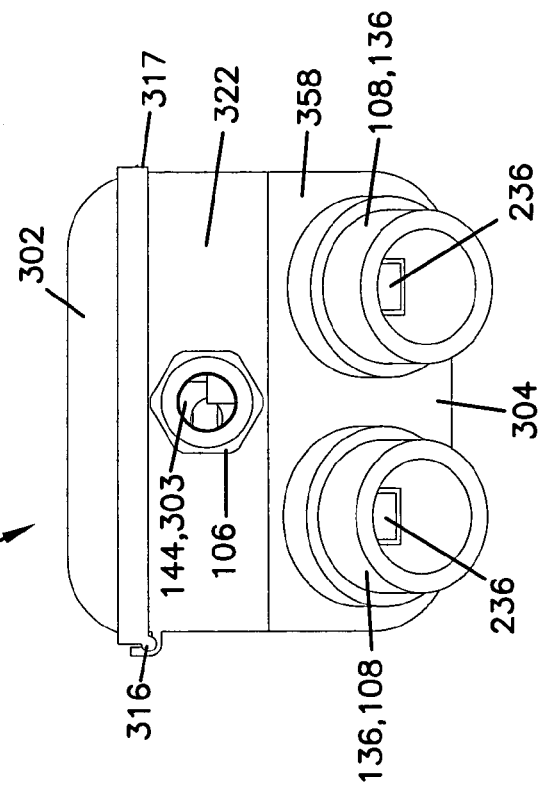
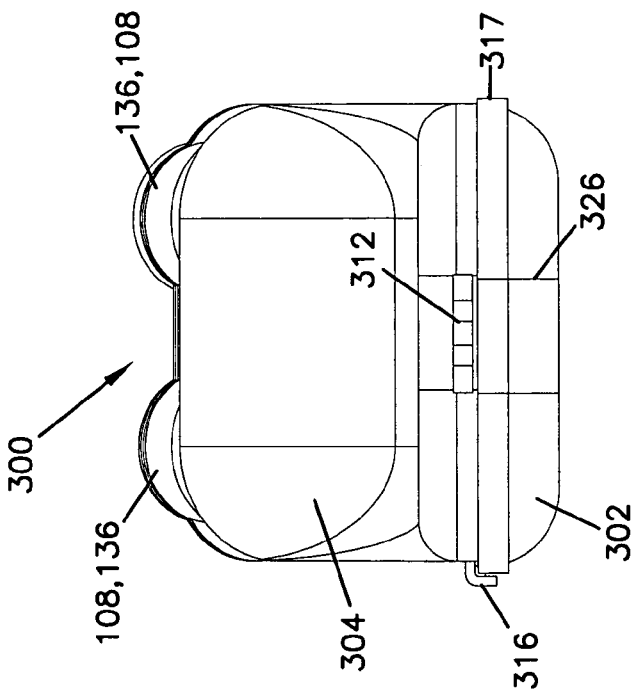

FIG.48
FIG.49
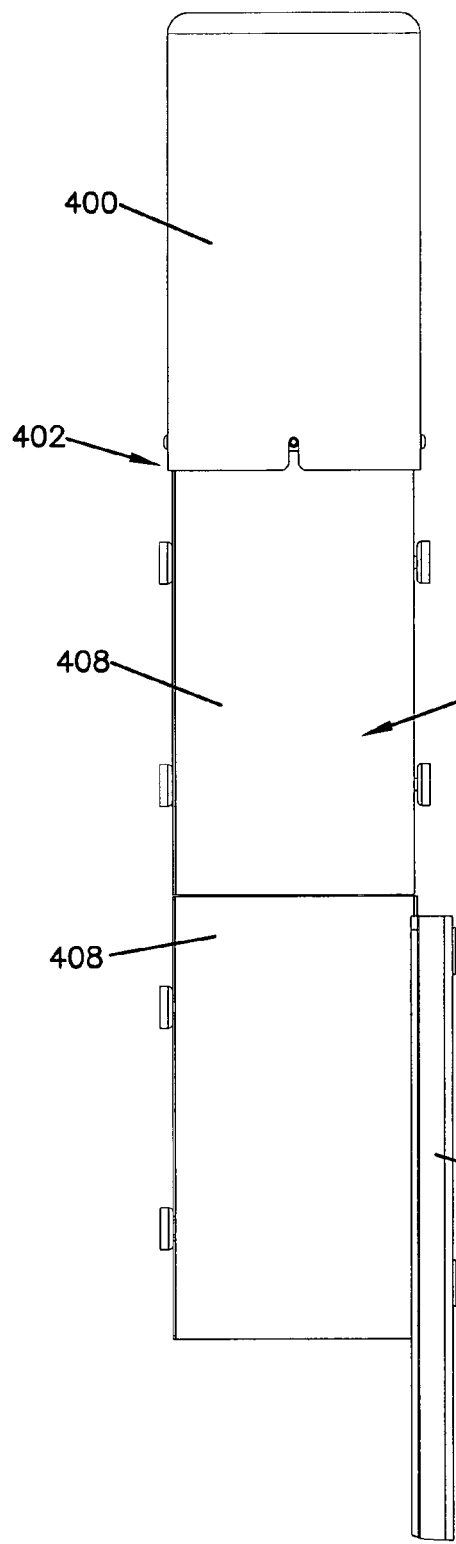
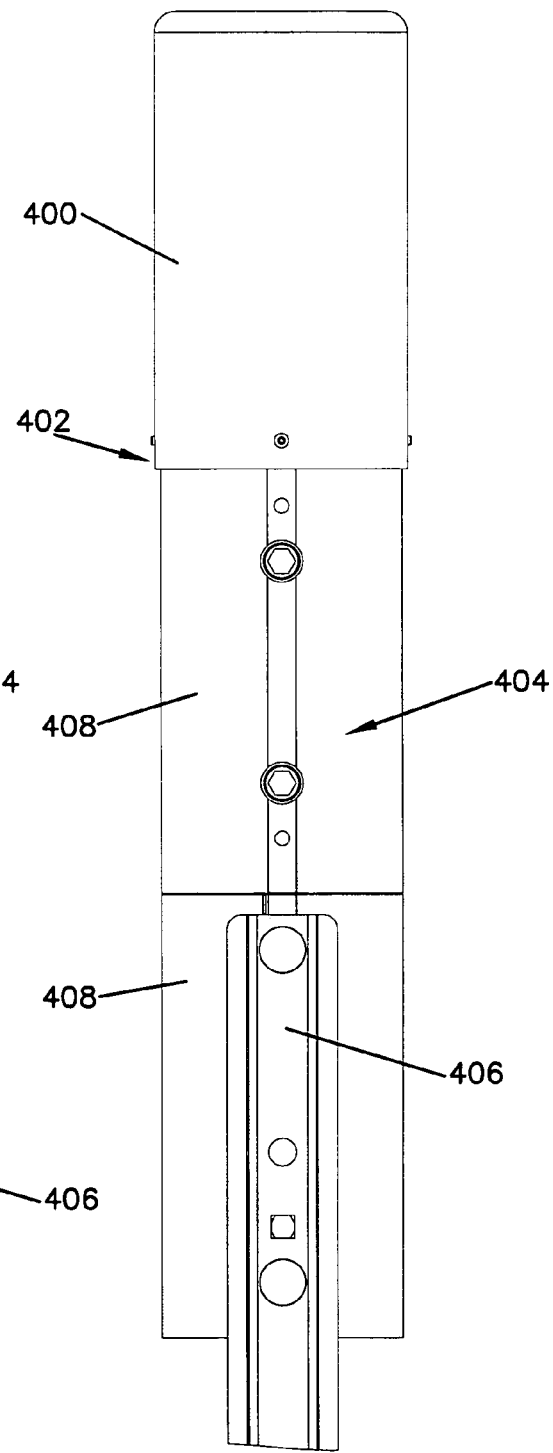

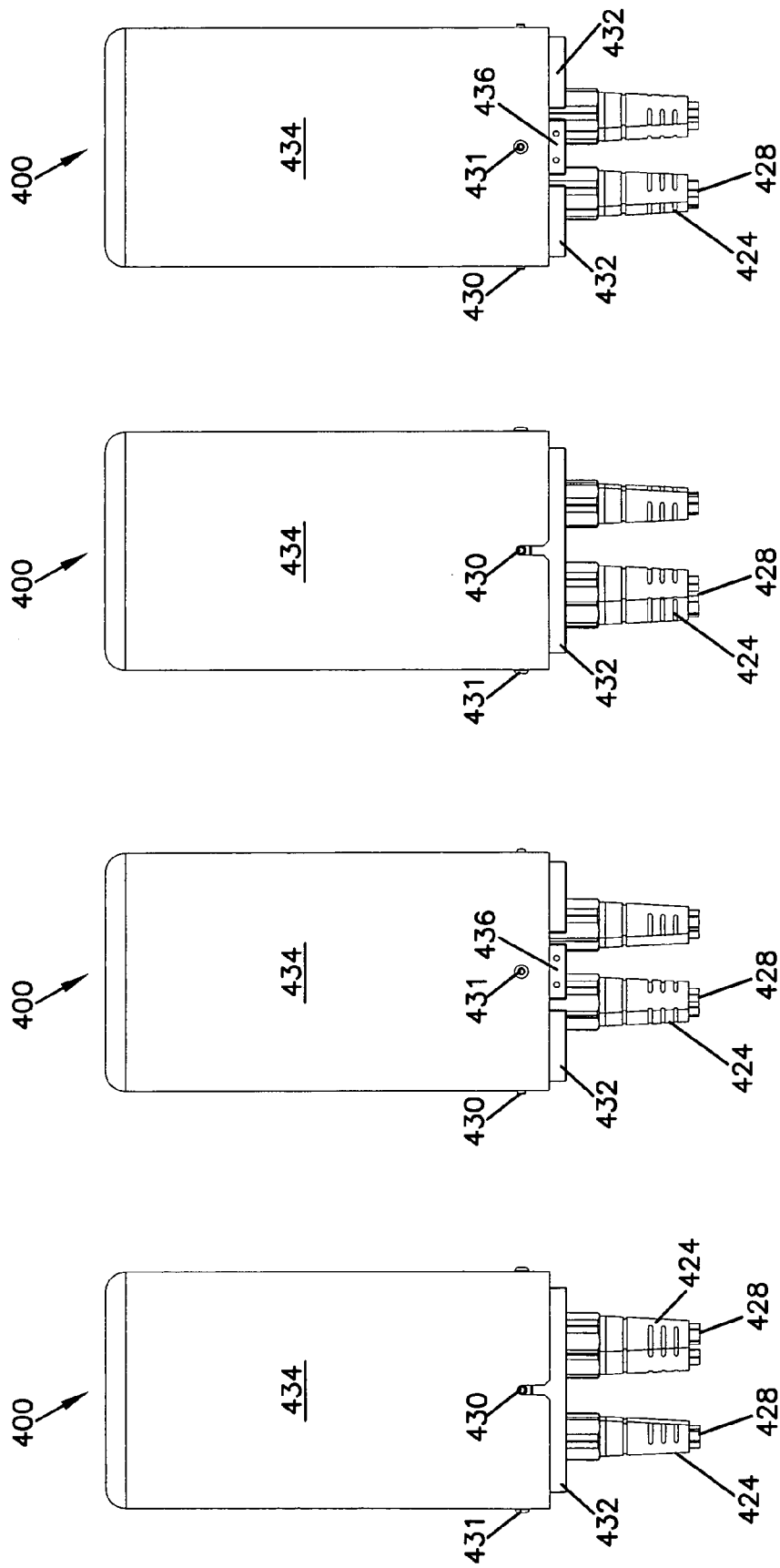

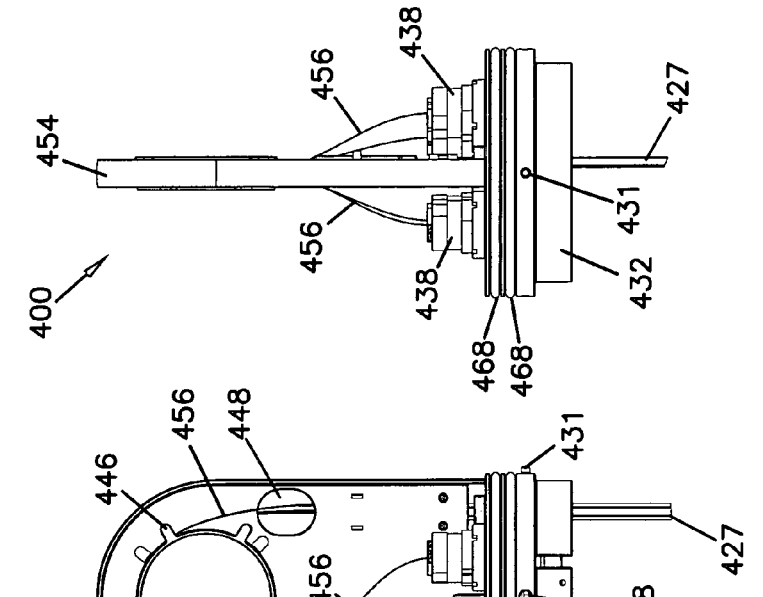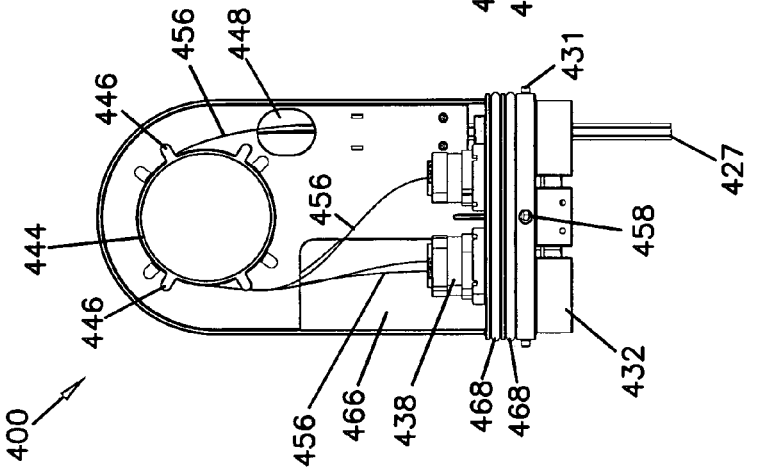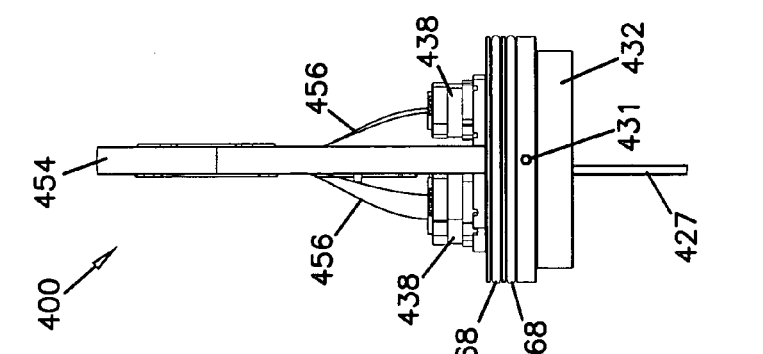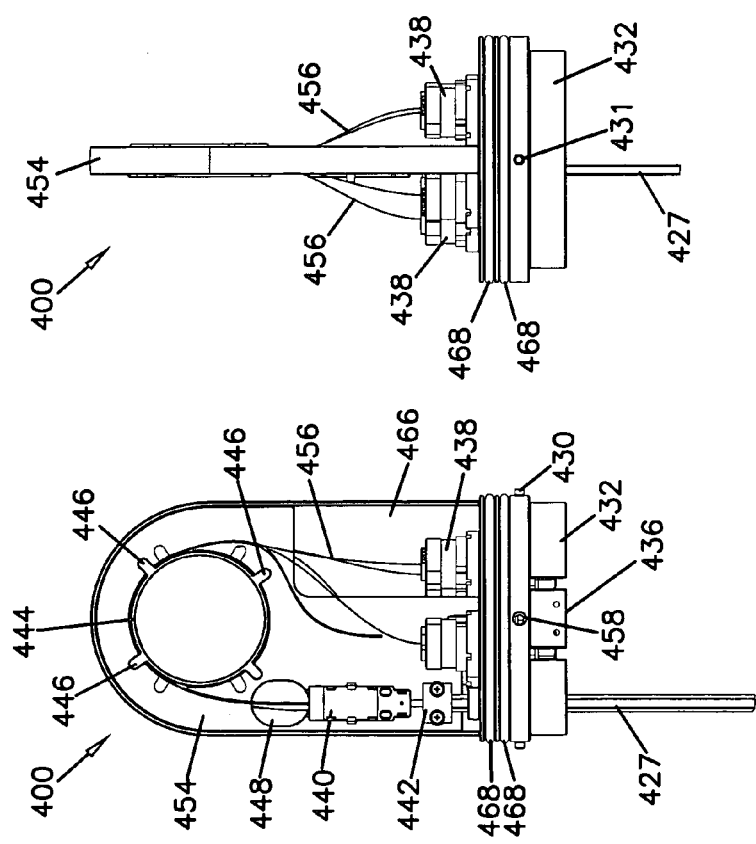

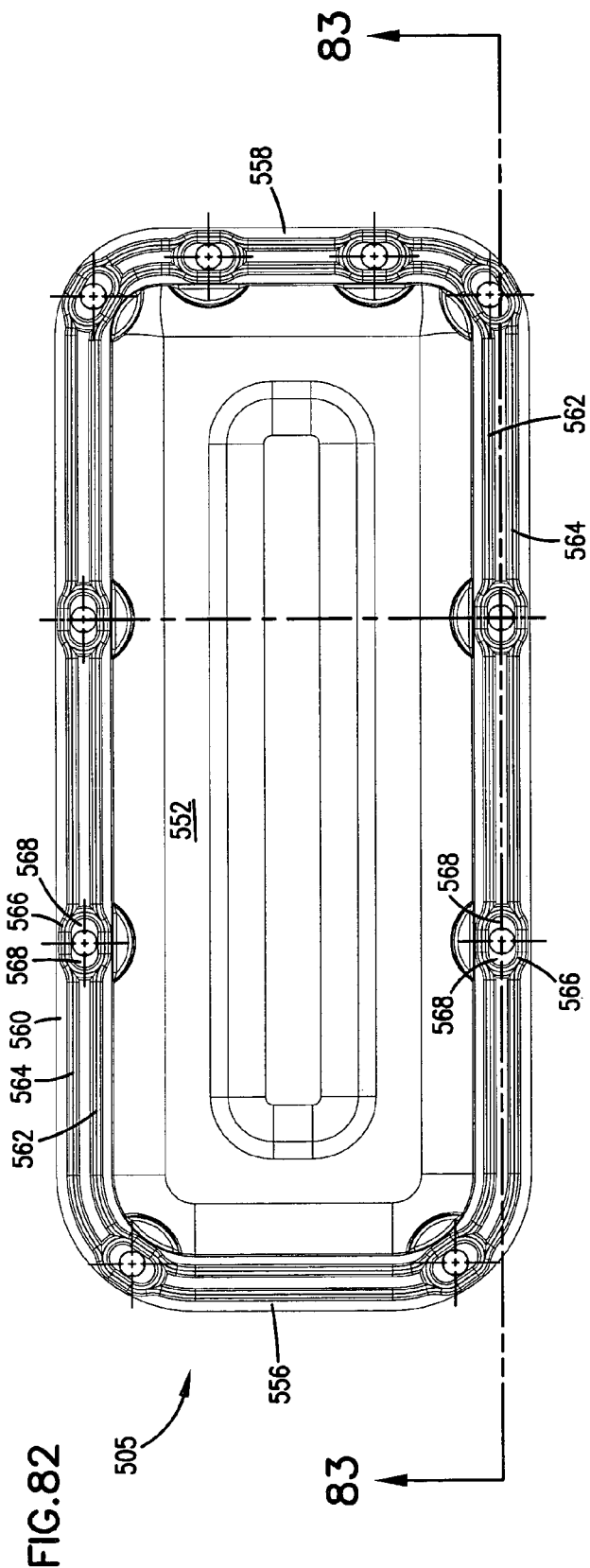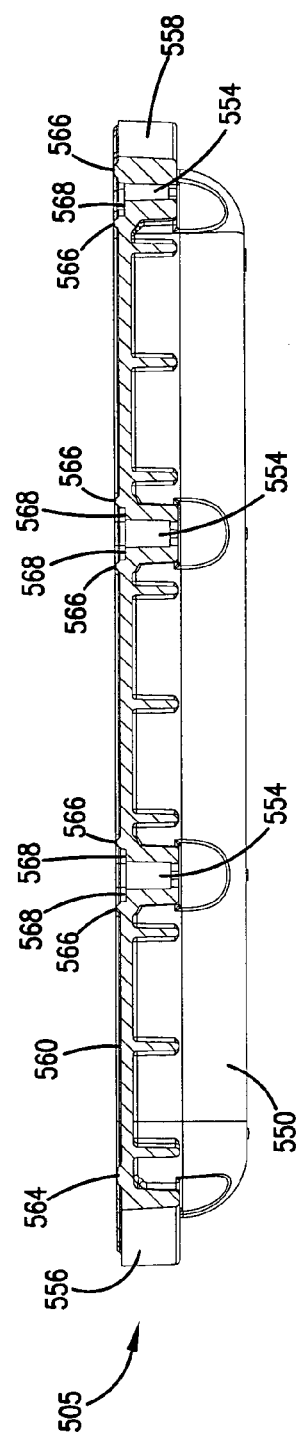
FIG.82
FIG.83

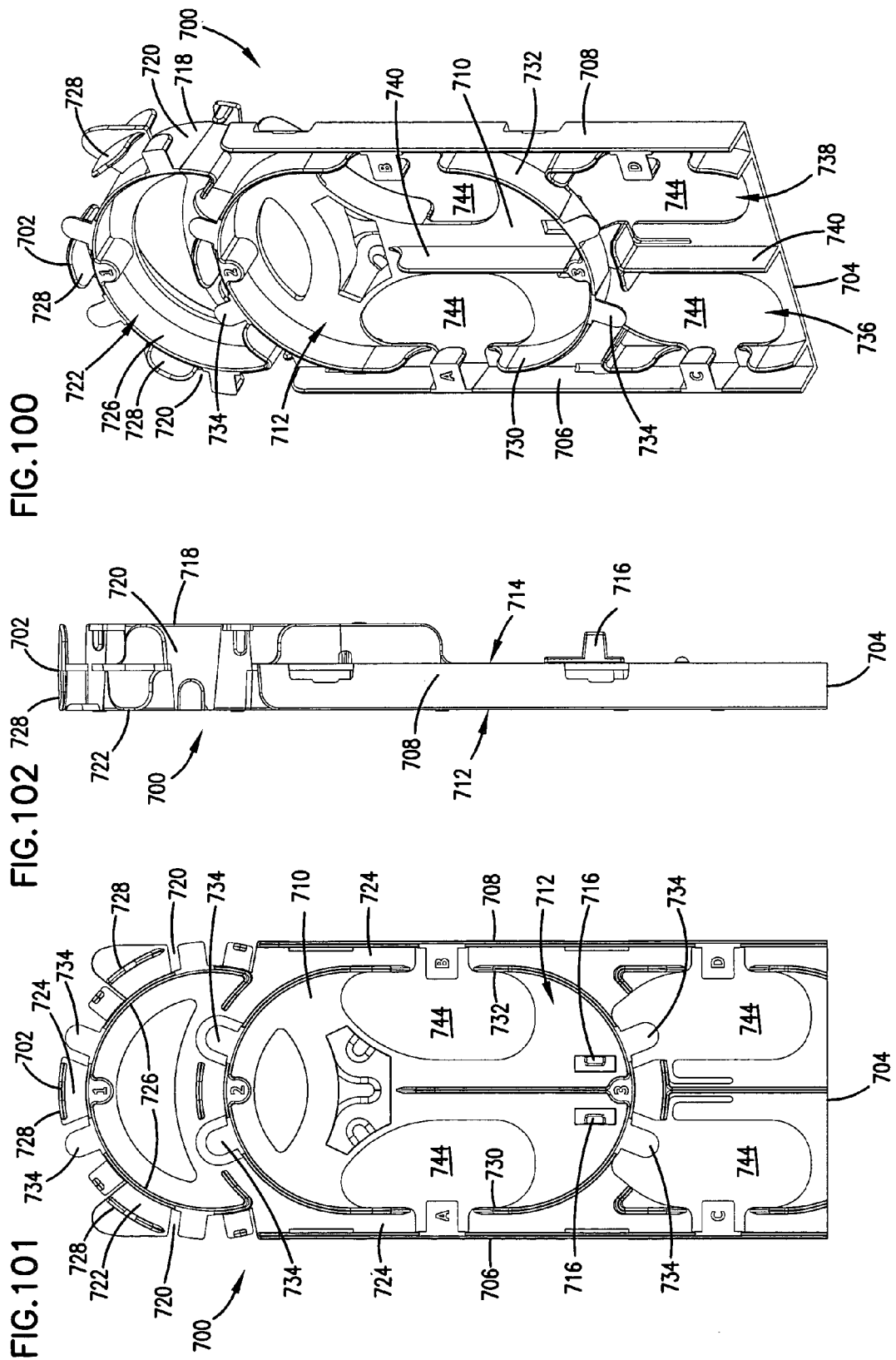

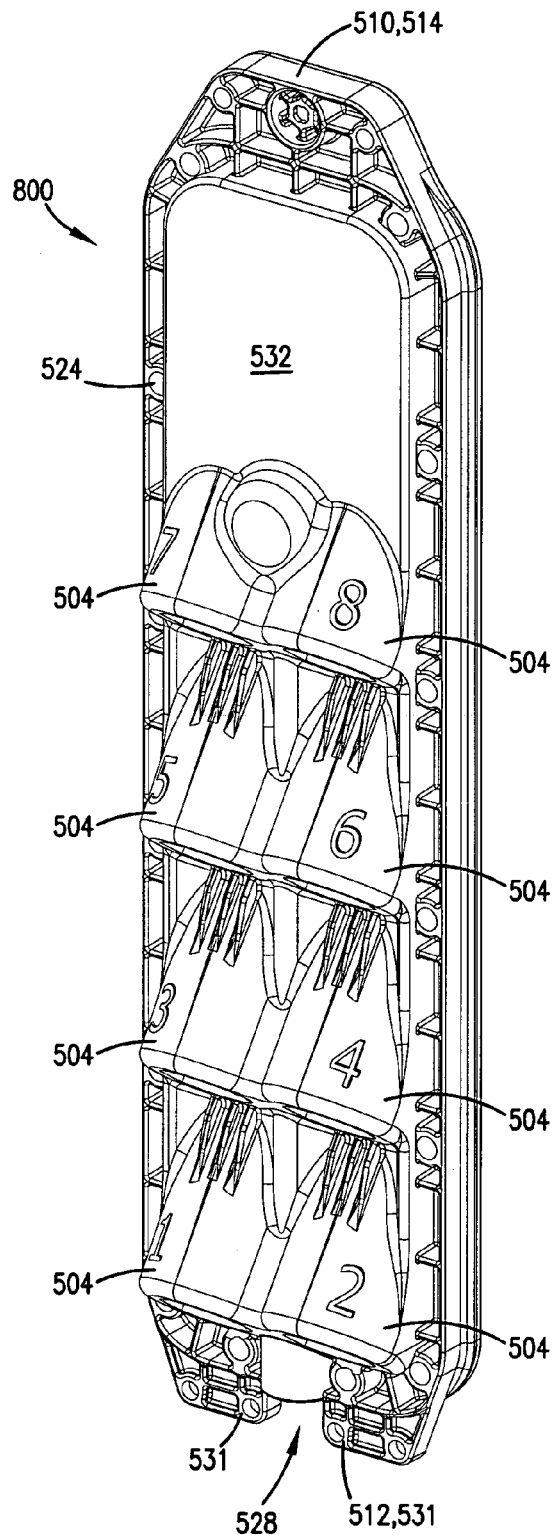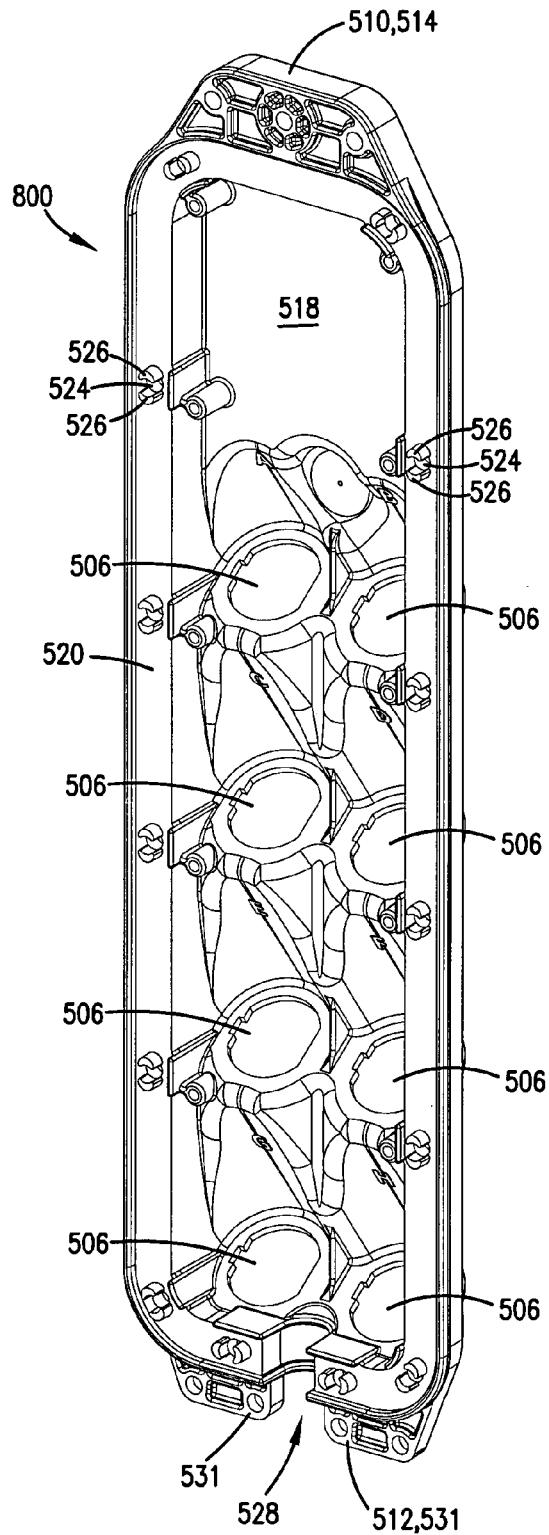

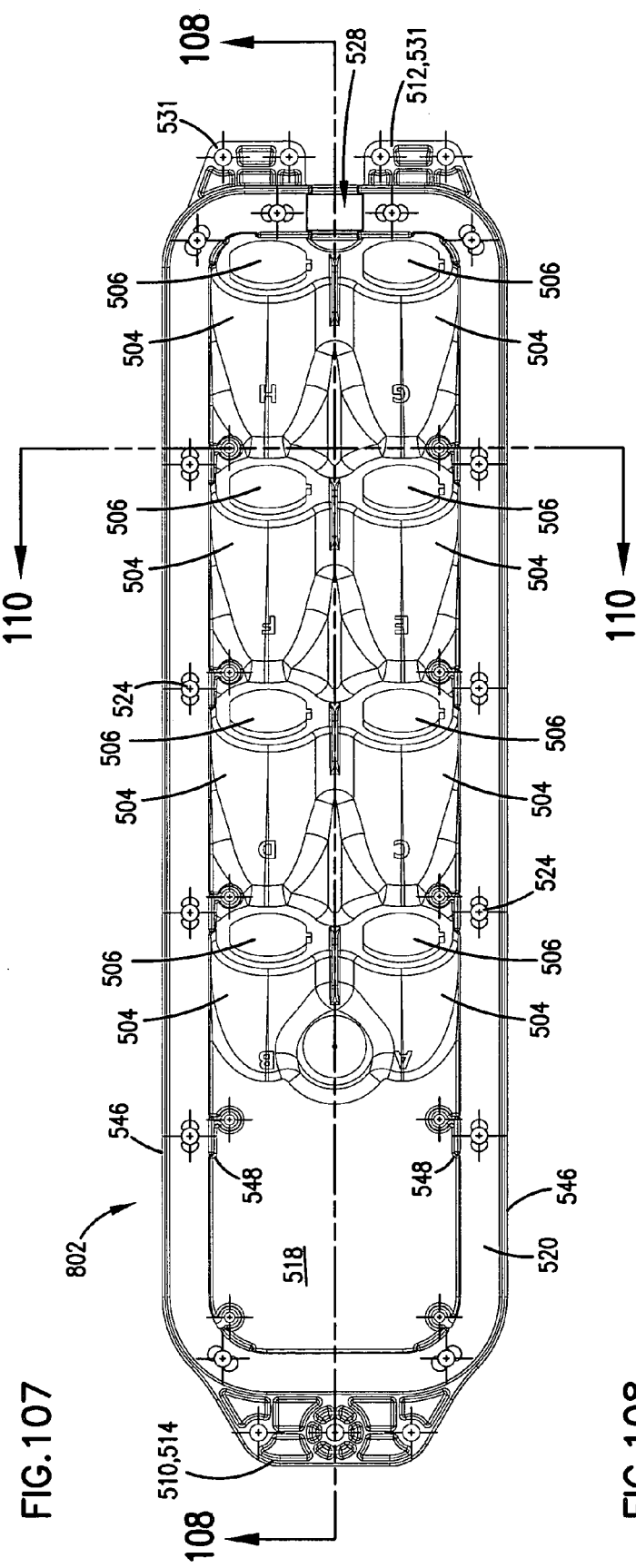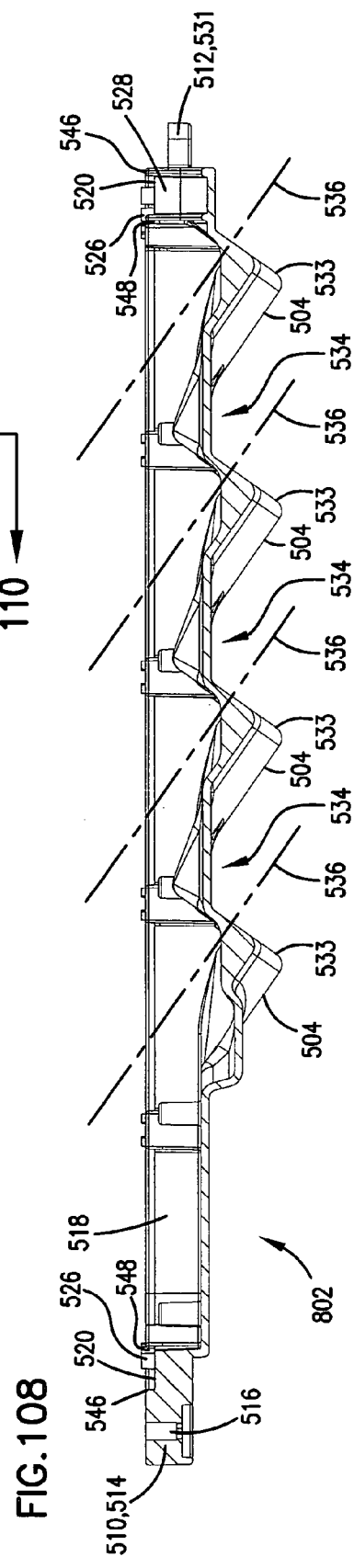

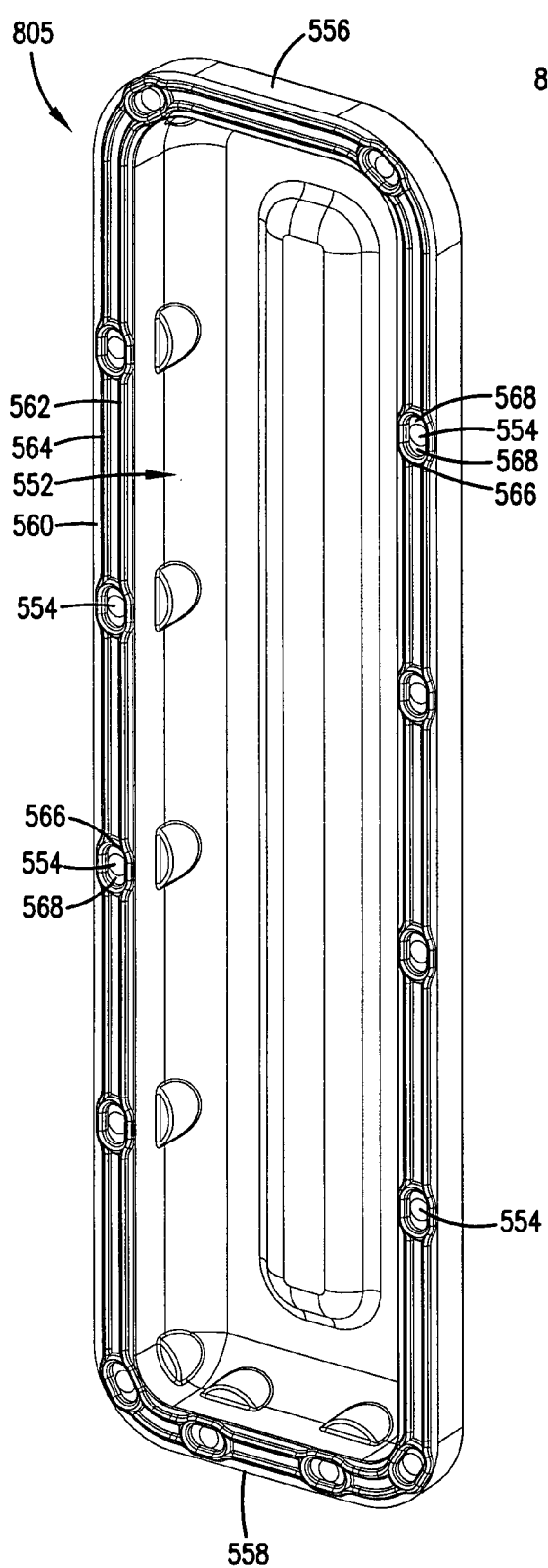
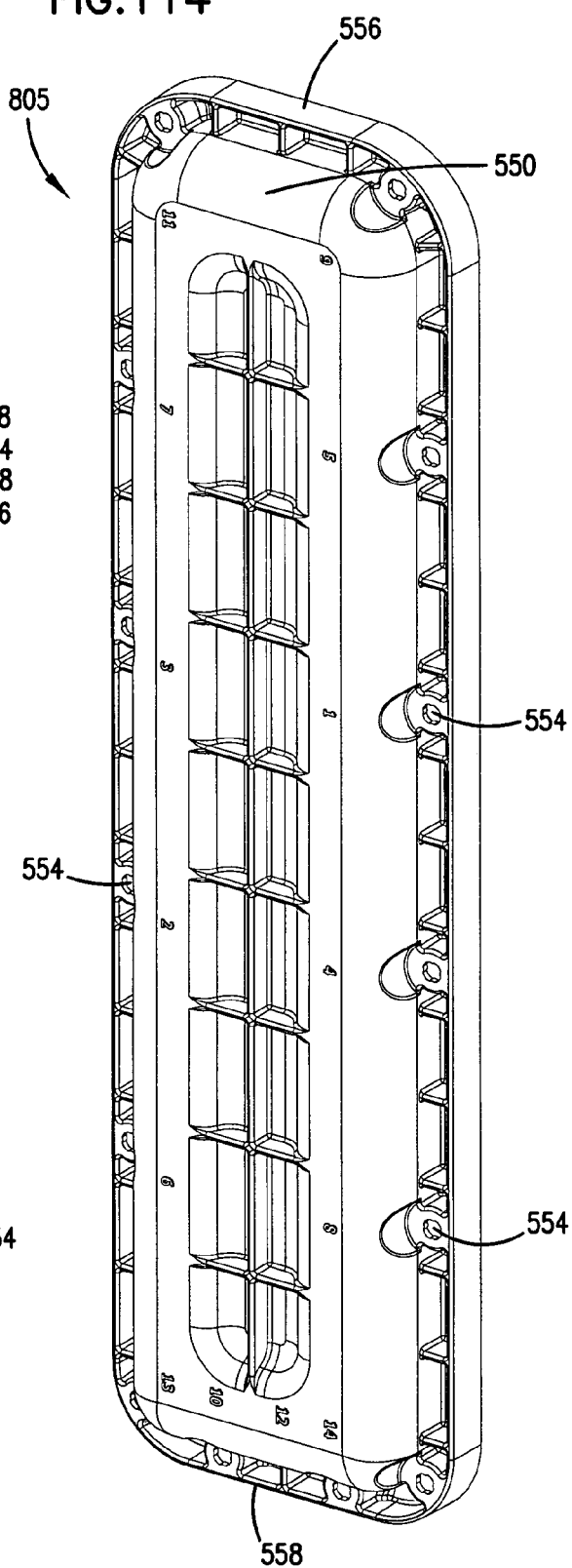

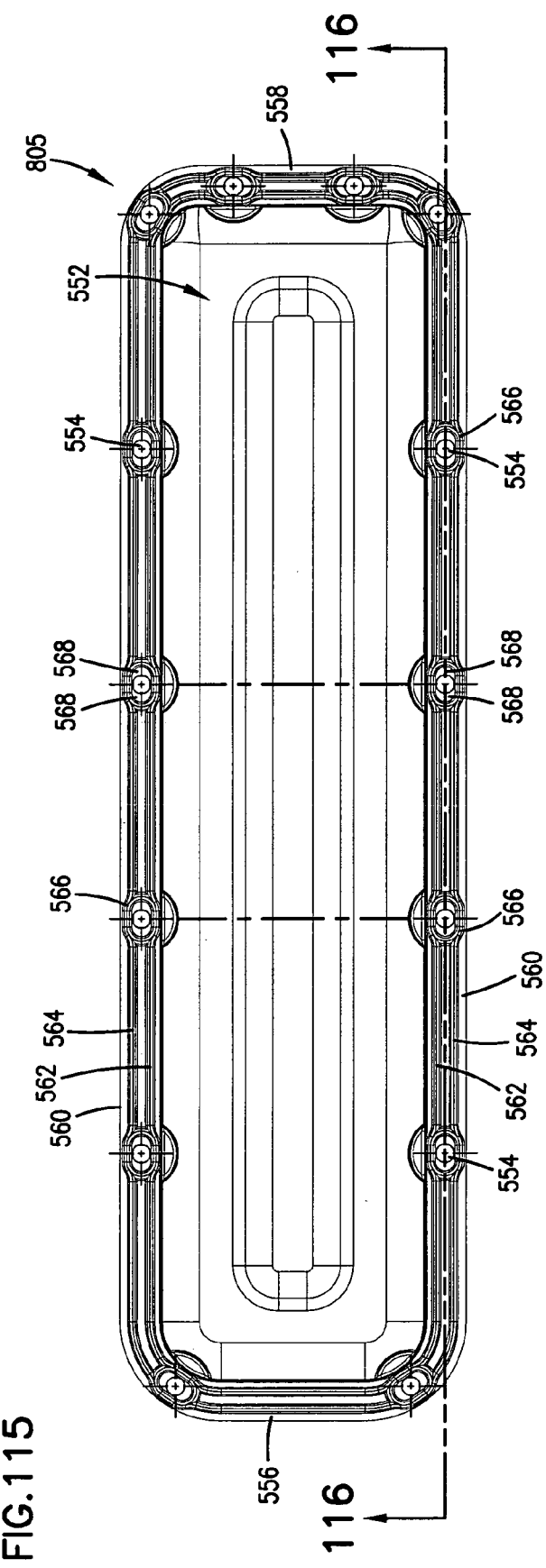
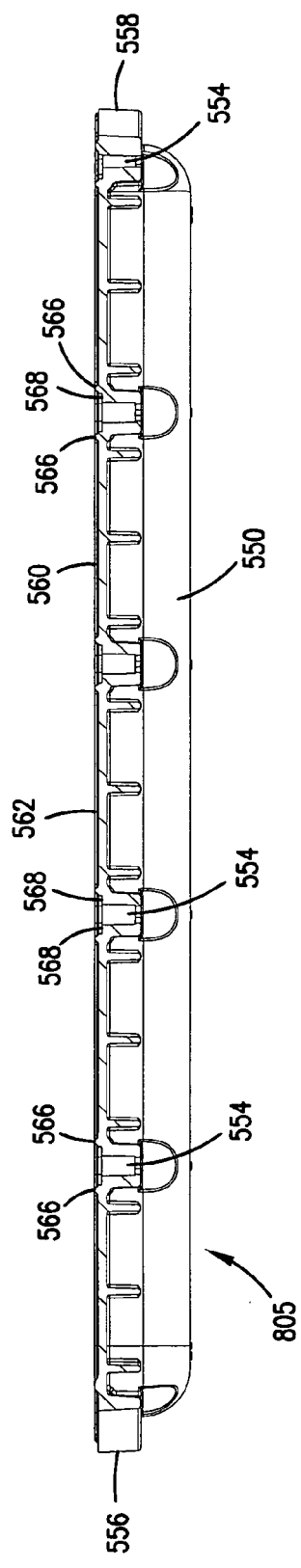
FIG.115
FIG.116

FIG.125
FIG.126
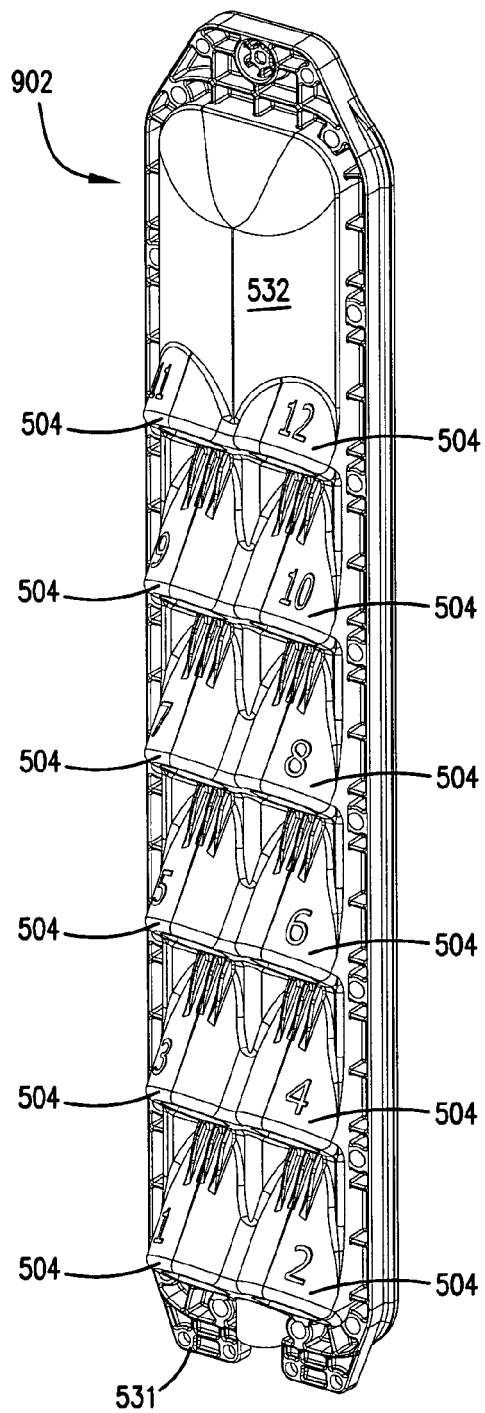
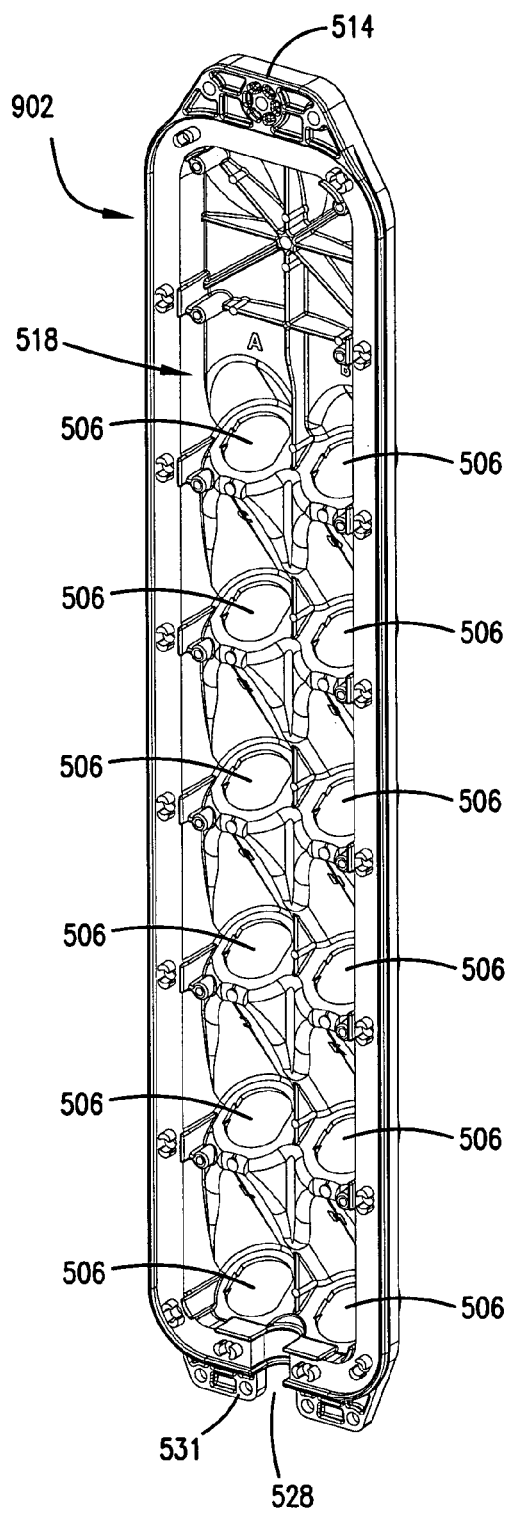

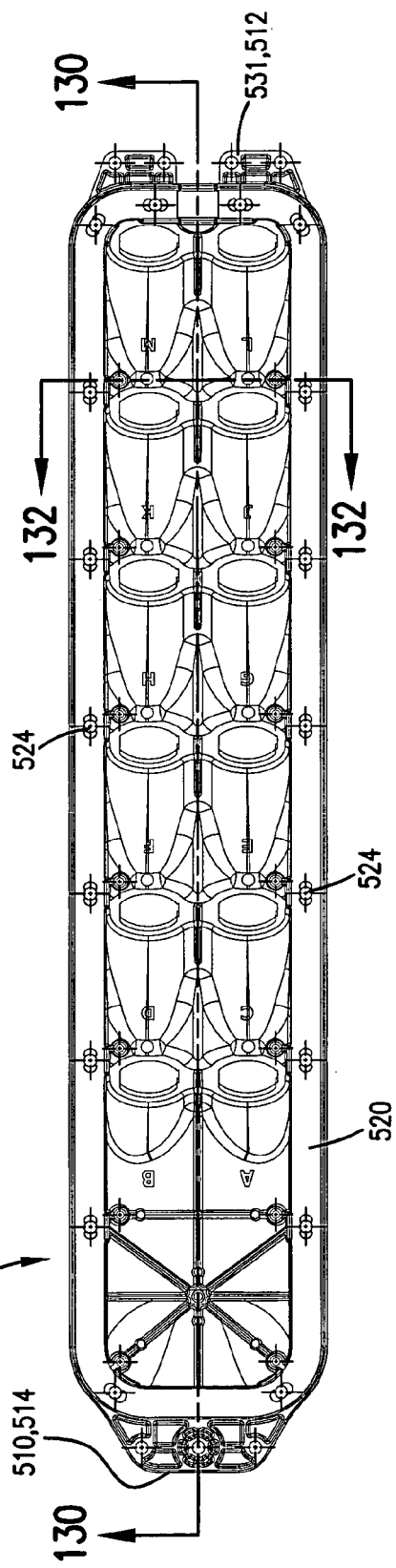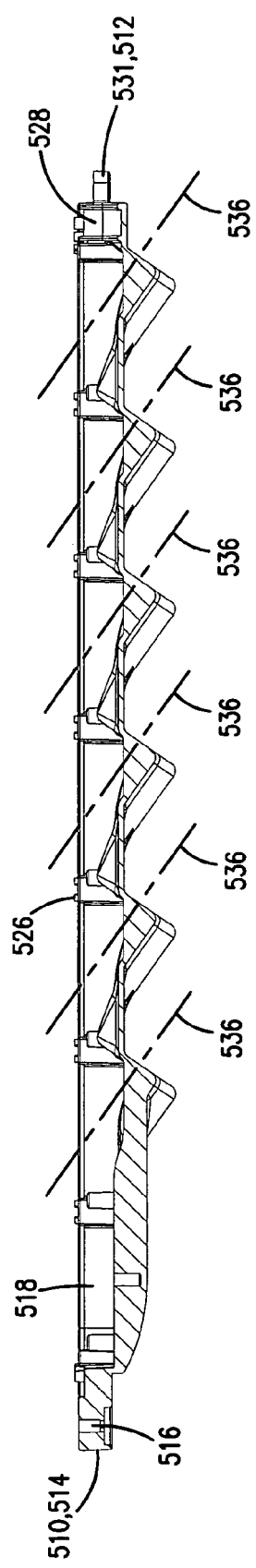
FIG. 129
FIG. 130

FIG.135
FIG.136
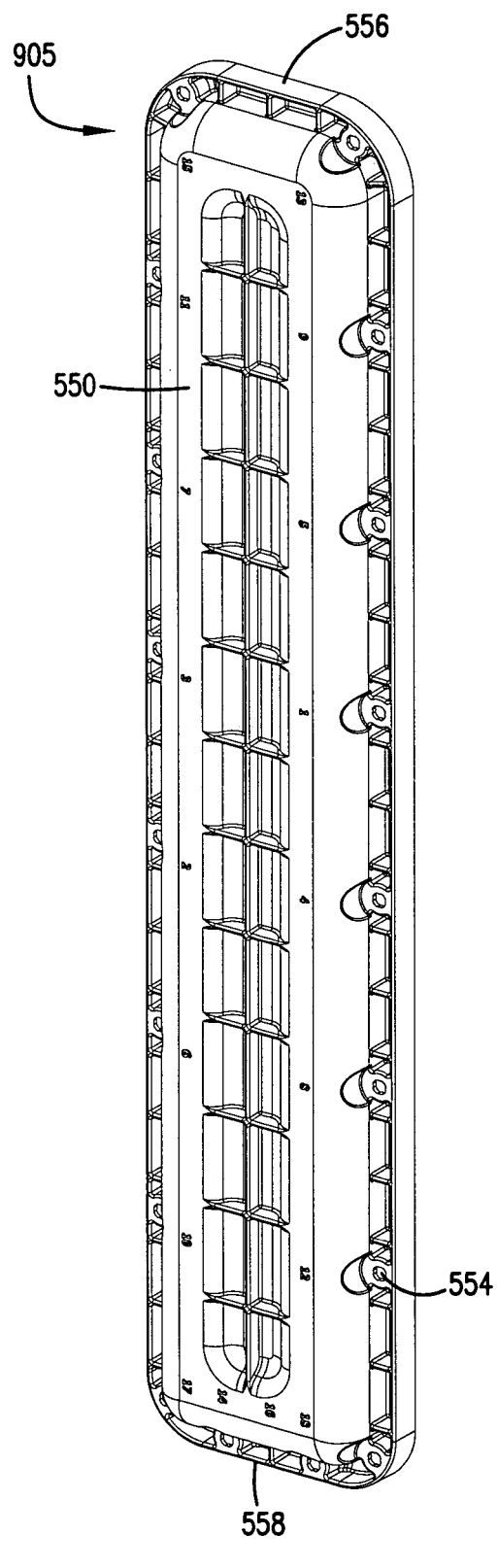
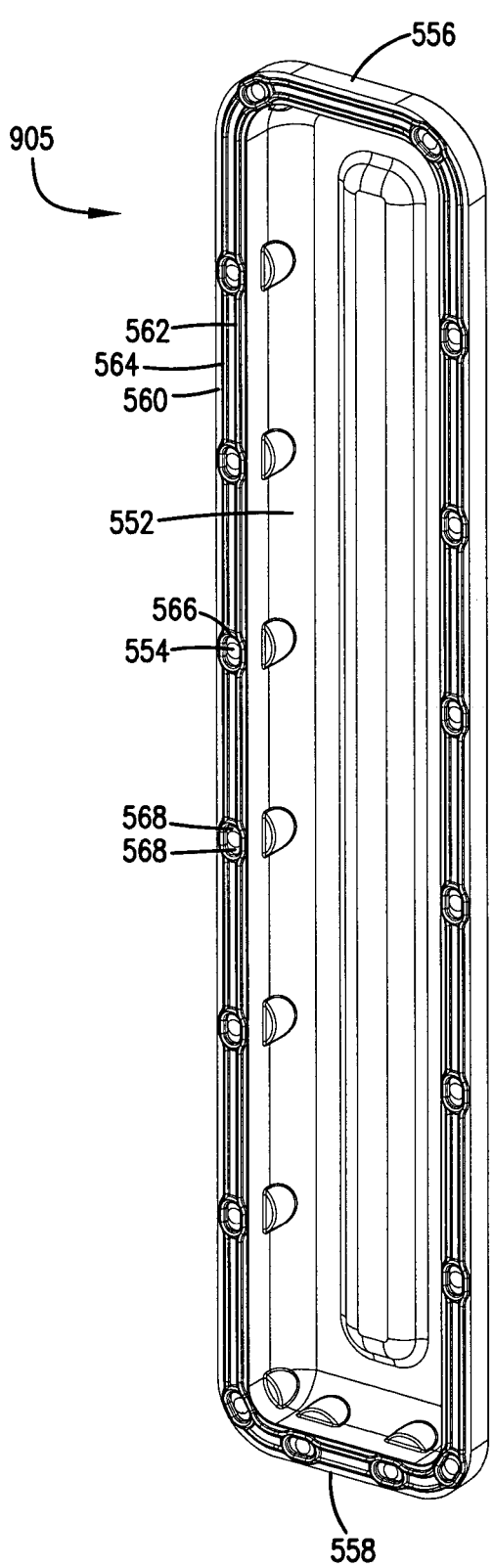

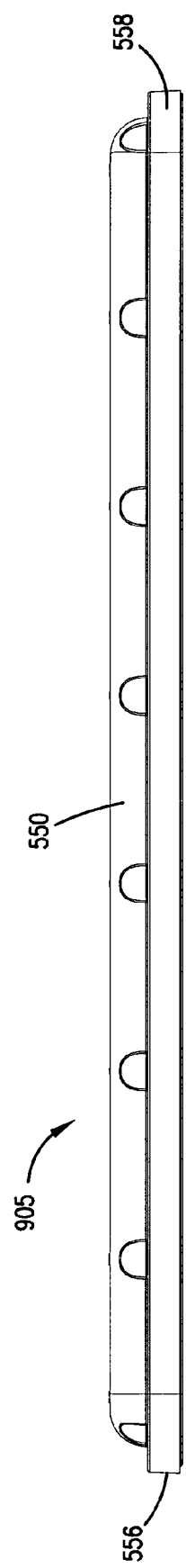
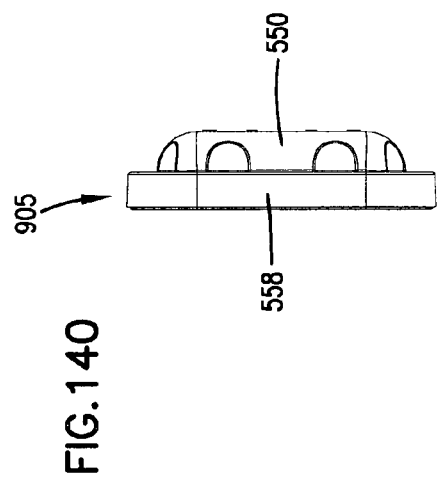
FIG.139
FIG.140

FIBER ACCESS TERMINAL

CROSS-REFERENCE TO RELATED PROVISIONAL APPLICATION

The present application claims priority to U.S. Provisional Application 60/551,164 filed Mar. 8, 2004 and U.S. Provisional Application 60/600,129, filed Aug. 9, 2004.

BACKGROUND

Expansion of fiber optic based telecommunication service is being expended to greater diversity of businesses and homes. Many of these extensions of service within neighborhoods, industrial parks and business developments utilize optical fiber distribution cables laid within buried conduit. Such optical fiber distribution cables might extend from a larger fiber distribution terminal or pedestal to a smaller fiber access terminal directly adjacent the business or home to which service may be provided. From the fiber access terminal to the home or business, a fiber drop cable may connect to the home or business.

A fiber distribution terminal may be configured to receive fibers from a central office and contain a number of splitters. Each of the fibers from the central office may carry a large number of signals and the splitters separate the compound signals into individual circuits. These individual circuits are then transmitted through individual optical fibers. Each of the fibers from the main office may enter one of the splitters in the fiber distribution terminal and the splitter may direct each of these signals into up to thirty-two fibers. A typical fiber distribution terminal may be configured to support from 100 fibers up to 1500 fibers. The smaller fiber access terminals may more typically house up to 8 or 12 fibers. The fiber distribution cables between the fiber distribution terminal and the fiber access terminal may have these eight to twelve fibers bundled together in a single multi-strand cable. Within the fiber access terminal, these multiple strands are broken out of the multistrand cable so that each fiber may be directed to an individual customer.

Currently, when fiber optic cables are extended from a fiber distribution terminal to a fiber access terminal, a variety of techniques are available for pulling and/or pushing the cable through the conduit. However, such cables must then be terminated and connectorized at the fiber access terminal. Termination and connectorizing is preferable performed in an environmentally stable and protected environment, such as a factory. Contamination of the fiber, the fiber end face or the junctions between fibers can degrade or inhibit communication with the customer.

Improvements to current fiber distribution cables and fiber access terminals are desirable.

SUMMARY

The present invention relates to a fiber access terminal assembly with a fiber optic distribution cable, and a fiber enclosure at one end of the fiber optic distribution cable. The fiber enclosure is configured to be inserted through a hollow conduit with a top end positioned in a direction of insertion into the conduit. The fiber enclosure includes a terminal body and a removable cover which cooperate to define an interior, the top end and a base end. The base end of the fiber enclosure includes a first opening through which the fiber optic distribution cable enters the interior of the fiber enclosure. The fiber optic distribution cable includes a plurality of optical fiber strands. Optical fiber strands from the distribution cable are separated within the interior of the enclosure and terminated with fiber optic connectors.

The terminal body includes a plurality of fiber optic adapters extending through the terminal body. Each of the adapters has a first end within the interior configured to receive one of the connectors of the optical fiber strands, and a second end outside the interior of the enclosure. The second ends are configured to receive a connector of an optical fiber drop cable extending to an exterior of the fiber enclosure and extend generally in the direction of the fiber optic distribution cable. The interior includes a cable slack storage arrangement for storing excess cable length of any of the optical fiber strands between the fiber optic distribution cable and the first end of an adapter. The cable slack storage arrangement also provides bend radius protection for the optical fiber strands stored within the cable slack storage arrangement.

The present invention further relates to a method of assembling a fiber access terminal to the end of a fiber distribution cable. The terminal includes an enclosure defined by a housing and a cover. In an environmentally protected location, a fiber optic distribution cable is extended through a first opening in the housing into the interior of the housing and secured to a strain relief. A plurality of optical fiber strands are separated from the fiber optic distribution cable within the interior of the enclosure body. Each of the optical fiber strands are terminated with a fiber optic connector within the interior of the enclosure body. The optical fiber strands within the interior of the housing are extended about a cable slack storage arrangement within the interior. The fiber optic connectors are connected to one of a plurality of mating fiber optic adapters. The fiber optic adapters extend through the housing from the interior to outside the housing and include a second end outside the housing for connecting with a mating fiber optic connector. The second end is configured to receive a fiber optic drop cable extending from generally the same direction as the fiber optic distribution cable. The cover is positioned to close off an open side of the housing and the interior to form the fiber enclosure and the fiber enclosure is configured to pass through a buried conduit.

The present invention also relates to a fiber access terminal assembly including a fiber optic distribution cable with a first end and a second end, a fiber enclosure at the second end of the fiber optic distribution cable, and a pedestal mounting arrangement. The fiber enclosure includes a terminal body and a removable cover cooperating to define an interior, the top end and a base end. The base end of the fiber enclosure includes a first opening through which the fiber optic distribution cable enters the interior of the fiber enclosure. The fiber optic distribution cable includes a plurality of optical fiber strands, the plurality of optical fiber strands separated from the fiber optic distribution cable within the interior and terminated with fiber optic connectors. The terminal body includes a plurality of fiber optic adapters extending through the terminal body. Each of the adapters has a first end within the interior configured to receive one of the connectors of the optical fiber strands within the interior, and a second end accessible from outside the terminal body configured to receive a connector of an optical fiber drop cable extending to an exterior of the fiber enclosure. The interior includes a cable slack storage arrangement for storing excess cable length of any of the optical fiber strands between the fiber optic distribution cable and the first end of an adapter, the cable slack storage arrangement providing bend radius protection for the optical fiber strands stored within the cable slack storage arrangement.

BRIEF DESCRIPTION OF THE DRAWINGS

The accompanying drawings, which are incorporated in and constitute a part of the description, illustrate several aspects of the invention and together with the detailed description, serve to explain the principles of the invention. A brief description of the drawings is as follows:

FIG. 3 is a first side view of the fiber access terminal of FIG. 1.

FIG. 4 is a second side view of the fiber access terminal of FIG. 1, offset approximately ninety degrees from the side view of FIG. 3.

FIG. 7 is a first perspective view of a terminal body of the fiber access terminal of FIG. 1, from a base end of the terminal body.

FIG. 8 is a second perspective view of the terminal body of FIG. 7, showing more of the base of the terminal body.

FIG. 9 is a third perspective view of the terminal body of FIG. 7, from a top opposite the base.

FIG. 12 is a top end view of the terminal body of FIG. 7.

FIG. 31 is an end view of the base of the terminal of FIG. 30.

FIG. 32 is an end view of a top of the terminal of FIG. 30.

FIGS. 48 to 51 are a series of four side views of the fiber access terminal and pedestal of FIG. 47, rotated approximately ninety degrees from each other.

FIGS. 58 to 61 are a series of four side views of the fiber access terminal and pedestal of FIG. 55, rotated approximately ninety degrees from each other.

FIGS. 64 to 67 are a series of four side views of the fiber access terminal of FIG. 62 with the cover removed.

FIG. 82 is a view of an interior front of the cover of FIG. 80.

FIG. 83 is a side view of the cover of FIG. 80, with a partial cross-sectional view taken along line 83-83 in FIG. 82.

FIG. 100 is a perspective view of a cable routing and management insert for use with the fiber access housing of FIG. 70 and the cover of FIG. 80.

FIG. 101 is a first side of the cable routing and management insert of FIG. 100.

FIG. 102 is an edge view of the cable routing and management insert of FIG. 100.

FIG. 103 is a first perspective view of a fiber access terminal housing of a sixth alternative embodiment of a fiber access terminal according to the present invention.

FIG. 104 is a second perspective view of the fiber access terminal housing of FIG. 103.

FIG. 107 is a view of an interior front of the fiber access terminal housing of FIG. 103.

FIG. 108 is a cross-sectional view of the fiber access terminal of FIG. 103, taken along line 108-108 of FIG. 107.

FIG. 113 is a first perspective view of a cover for use with the fiber access terminal housing of FIG. 103.

FIG. 114 is a second perspective view of the cover of FIG. 113.

FIG. 115 is a view of an interior front of the cover of FIG. 113.

FIG. 116 is a side view of the cover of FIG. 113, with a partial cross-sectional view taken along line 116-116 in FIG. 115.

FIG. 125 is a first perspective view of a fiber access terminal housing of a seventh alternative embodiment of a fiber access terminal according to the present invention.

FIG. 126 is a second perspective view of the fiber access terminal housing of FIG. 125.

FIG. 128 is a side view of the fiber access terminal housing of FIG. 125.

FIG. 129 is a view of an interior front of the fiber access terminal housing of FIG. 125.

FIG. 130 is a cross-sectional view of the fiber access terminal of FIG. 125, taken along line 130-130 of FIG. 129.

FIG. 131 is a closer perspective view of connector mounting locations of the fiber access terminal housing of FIG. 125.

FIG. 132 is a base end view of the fiber access terminal housing of FIG. 125.

FIG. 133 is a top end view of the fiber access terminal housing of FIG. 125, with a partial cross-sectional view taken along line 133-133 in FIG. 127.

FIG. 134 is a base end view of the fiber access terminal housing of FIG. 125, with a partial cross-sectional view taken along line 134-134 in FIG. 127.

FIG. 135 is a first perspective view of a cover for use with the fiber access terminal housing of FIG. 125.

FIG. 136 is a second perspective view of the cover of FIG. 135.

FIG. 137 is a view of an exterior back of the cover of FIG. 135.

FIG. 138 is a view of an interior front of the cover of FIG. 135.

FIG. 139 is a side view of the cover of FIG. 135.

Figure 2:
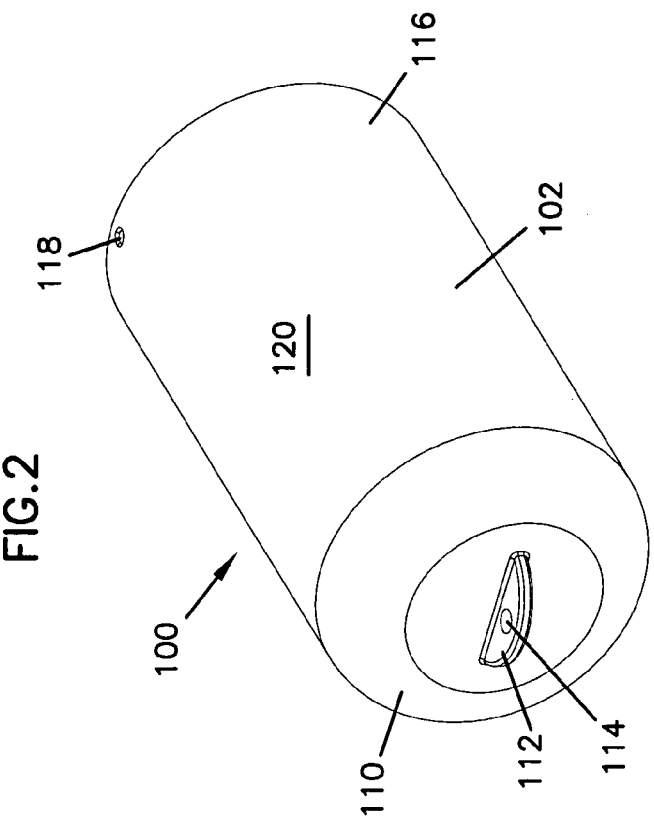
FIG. 2 is a second perspective view of the fiber access terminal of FIG. 1.
Figure 1:
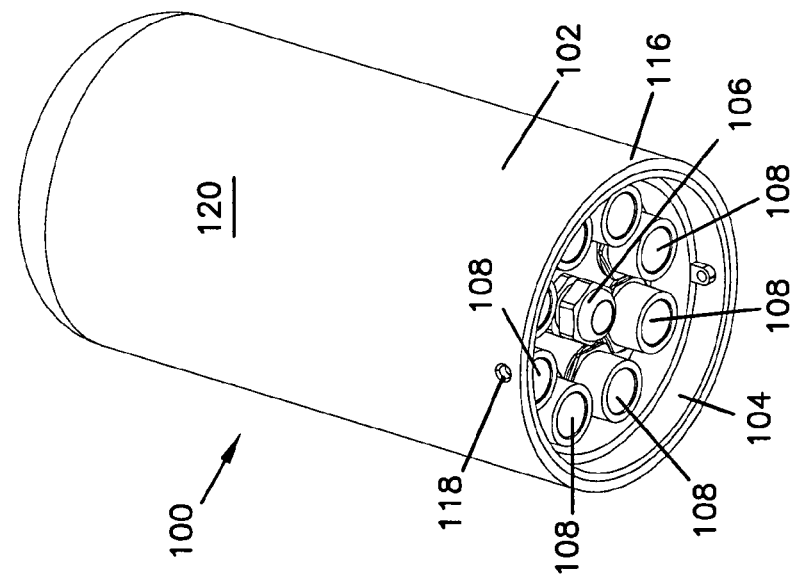
FIG. 1 is a first perspective view of a fiber access terminal according to the present invention.

FIG. 140 is base end view of the cover of FIG. 135.

DETAILED DESCRIPTION

Reference will now be made in detail to exemplary aspects of the present invention which are illustrated in the accompanying drawings. Wherever possible, the same reference numbers will be used throughout the drawings to refer to the same or like parts.

FIGS. 1 to 4 show a fiber access terminal 100 for mounting to a fiber distribution cable. Terminal 100 includes a cover 102 and a housing 104. Housing 104 includes a central distribution cable entry fitting 106 and a plurality of fiber optic connectors 108 extending through housing 104. Cover 102 includes a top end 110 with a tab 112. Tab 112 is configured to permit a pull-through rope, cable or wire to be attached to terminal 100 for pulling terminal 100 through a conduit. An opening 114 in tab 112 is provided for attaching the pull through. As shown, terminal 100 is configured to receive a single fiber distribution cable and connect to up to eight fiber drop cables. These cables would extend to housing 104 of terminal 100, accessible through an open bottom end 116 of cover 102.

Figure 6:
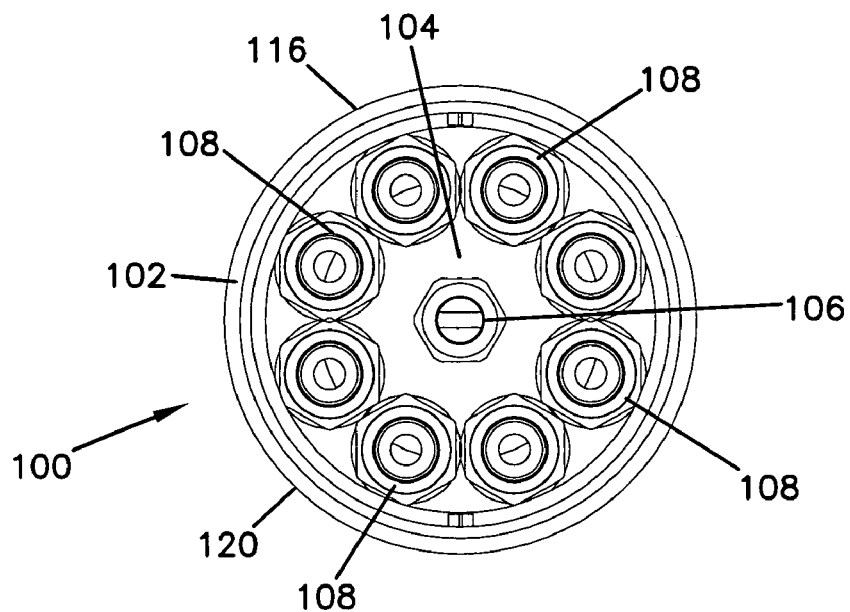
FIG. 6 is a base end view of the fiber access terminal of FIG. 1.
Figure 5:
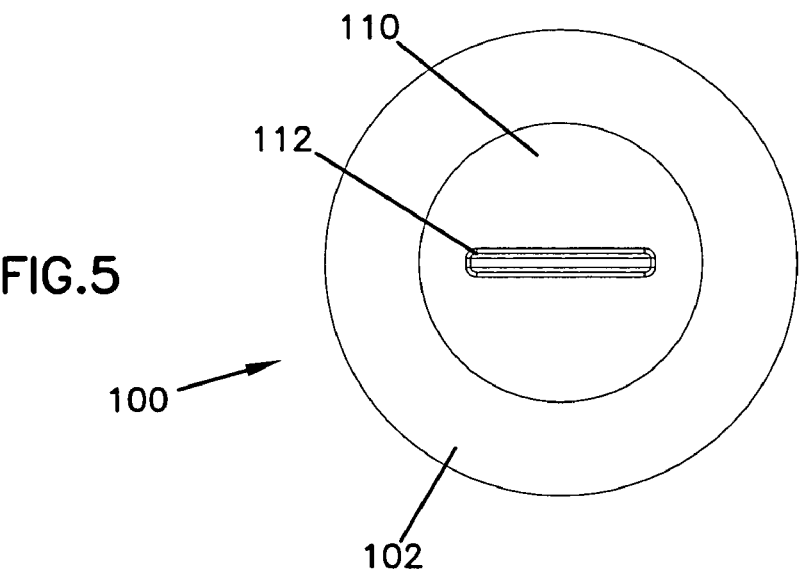
FIG. 5 is a top end view of the fiber access terminal of FIG. 1.
Figure 11:
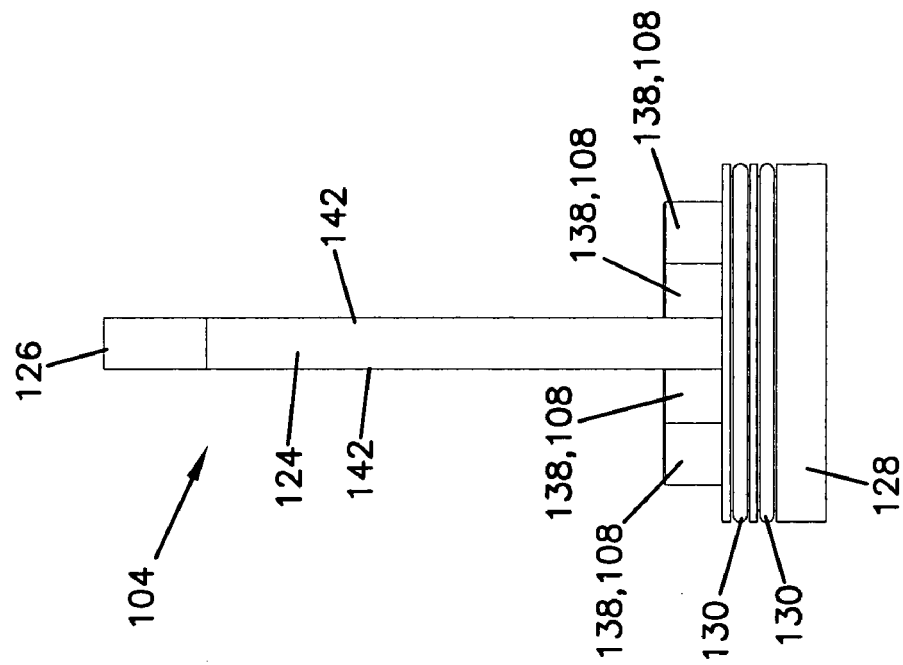
FIG. 11 is a second side view of the terminal body of FIG. 7, offset approximately ninety degrees from the side view of FIG. 9.
Figure 10:
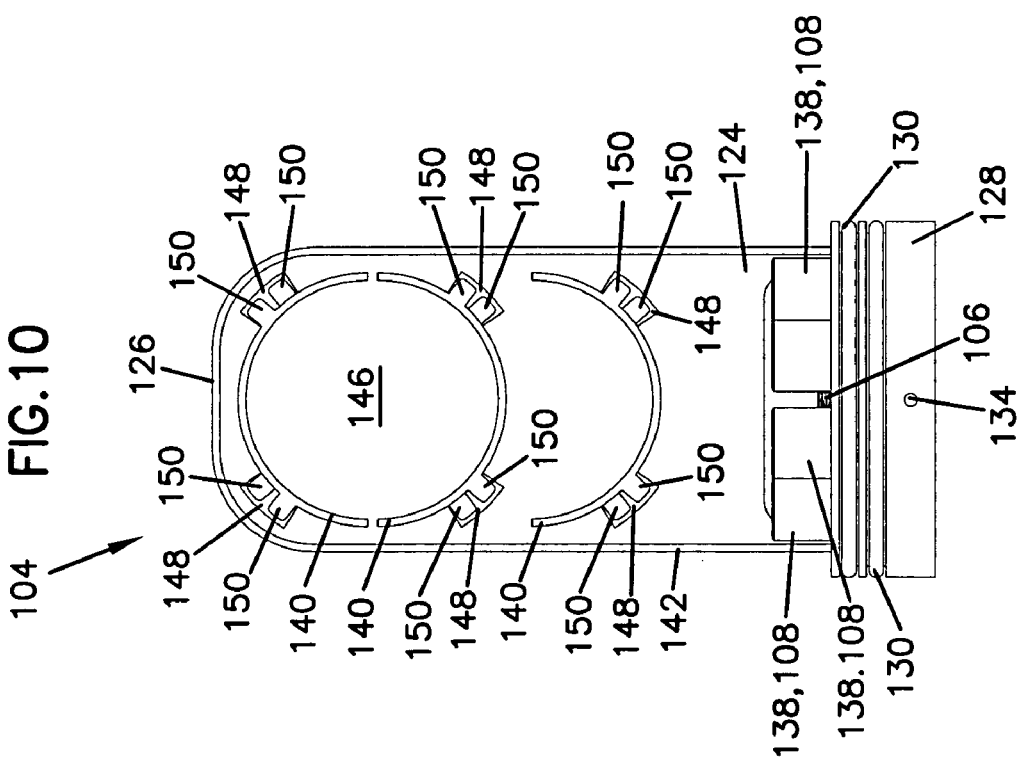
FIG. 10 is a first side view of the terminal body of FIG. 7.
Figure 13:
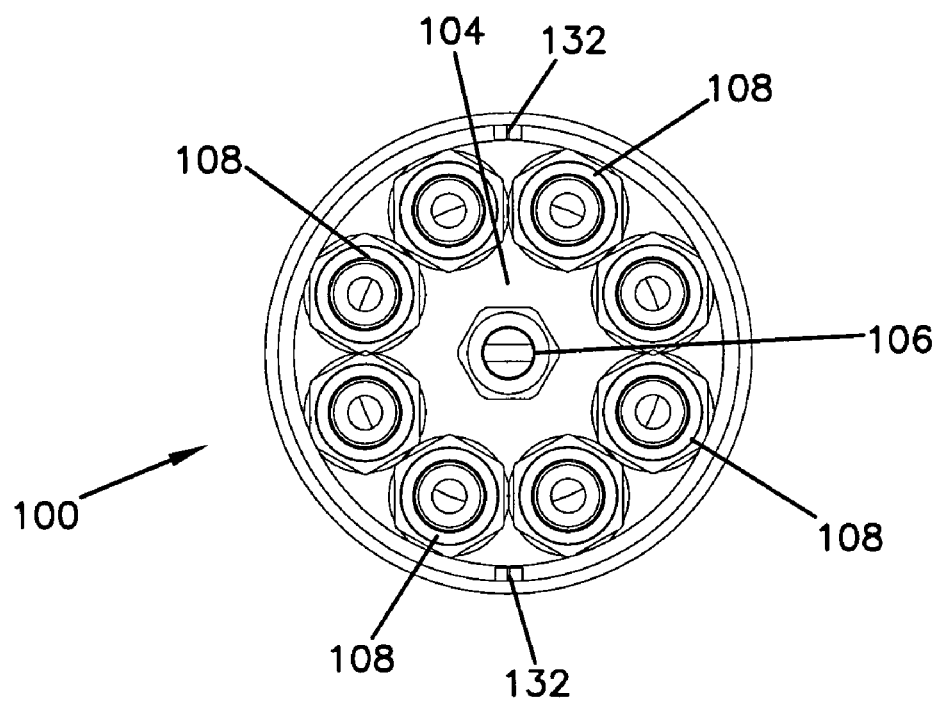
FIG. 13 is a base end view of the terminal body of FIG. 7.

Cover 102 includes a pair of fastener openings 118 positioned adjacent bottom end 116 extending through a cylindrical side wall 120. Openings 118 receive fasteners to releasably hold cover 102 about base 104 while allowing access into an interior of terminal 100. FIG. 5 shows top end 110 of terminal 100 with tab 112 centrally positioned. FIG. 6 shows housing 104 positioned within cover 102 with distribution cable fitting 106 centrally located and fiber optic cable connectors 108 evenly spaced about housing 104 around fitting 106.

Referring now to FIGS. 7 to 13, housing 104 includes a base 122 through which fitting 106 and cable connectors 108 extend. Each of the cable connectors 108 includes a first or inner end 138 and a second or outer end 136 and extends through a connector opening in base 122 (connector openings are not visible as they are occluded by connectors 108). Both ends 136 and 138 are configured to receive and mate with a fiber optic cable connector. Fitting 106 defines an opening 144 also extending through base 122 of base 104 so that a fiber distribution cable may pass through base 122 into an interior of defined about an inner structure 124 of terminal 100 by cover 102. Inner structure 124 includes a top end 126 which is positioned within cover 102 adjacent top end 110. About base 122 is a circumferential wall 128 sized to fit within cover 102 and fit closely with an inner wall of cover 102 adjacent bottom end 116. At least one seal, such as O-rings 130, are positioned about base 104 to provide a weather-tight seal between cover 102 and base 104.

Extending through circumferential wall 128 is a pair of openings 134 for receiving fasteners extending through openings 118 of cover 102. Openings 134 are formed through a pair of fastener bosses 132, providing additional material for the fasteners to extend within. On a bulkhead 146 of inner structure 124 between base 122 and top 126 are plurality of cable routing guides 140 to provide cable slack storage and bend radius protection to fiber optic cables extending into and within terminal 100. An outer wall 142 extends about bulkhead 146 to help retain cables within cable guides 140 and prevent pinching or other damages to cables when cover 102 is positioned about base 104. As shown, inner structure 124 is a two-sided structure with similar arrangements of cable guides 140 and outer wall 142 on either side. A plurality of openings 148 extend between the opposing sides of inner structure 124 and a plurality of cable tabs 150 of cable guides 140 are positioned adjacent each of the openings 148. Cables passing about cable guides 140 on one side of inner structure 124 may pass through one of the openings 148 to pass about one of the cable guides 140 of the other side and then be directed to one of the inner ends 138 of connectors 108. Tabs 150 are provided to hold cables about cable guides 140. Tabs 150 and openings 148 are shown positioned adjacent each other but other configurations are also anticipated.

Inner structure may also include a distribution cable tie-off or strain relief fixture adjacent fitting 106 so that the fiber distribution cable extending through opening 144 may be securely held within terminal 100.

Terminal 100 is expected to be pulled through a buried conduit and mounted in a field enclosure adjacent a customer's home or business. Such a field housing may not provide a weather-tight seal or may be subject to damage allowing entry of contaminants. Fiber optic connectors 108 are anticipated to be environmentally hardened connectors, permitting connection of fiber optic drop cables to connect to customer equipment but providing protection to the connector and connection at fiber access terminal 100. Terminal 100 is configured to be mounted vertically within such a field housing with top 110 of cover 102 up. The fiber distribution cable would extend out of housing 104 downward and any customer service drop cables connected to connectors 108 would also extend generally downward alongside the distribution cable. Such a configuration provides increased protection of the connectors 108 and any connections between connectors 108 and the customer service drop cables.

Figure 14:
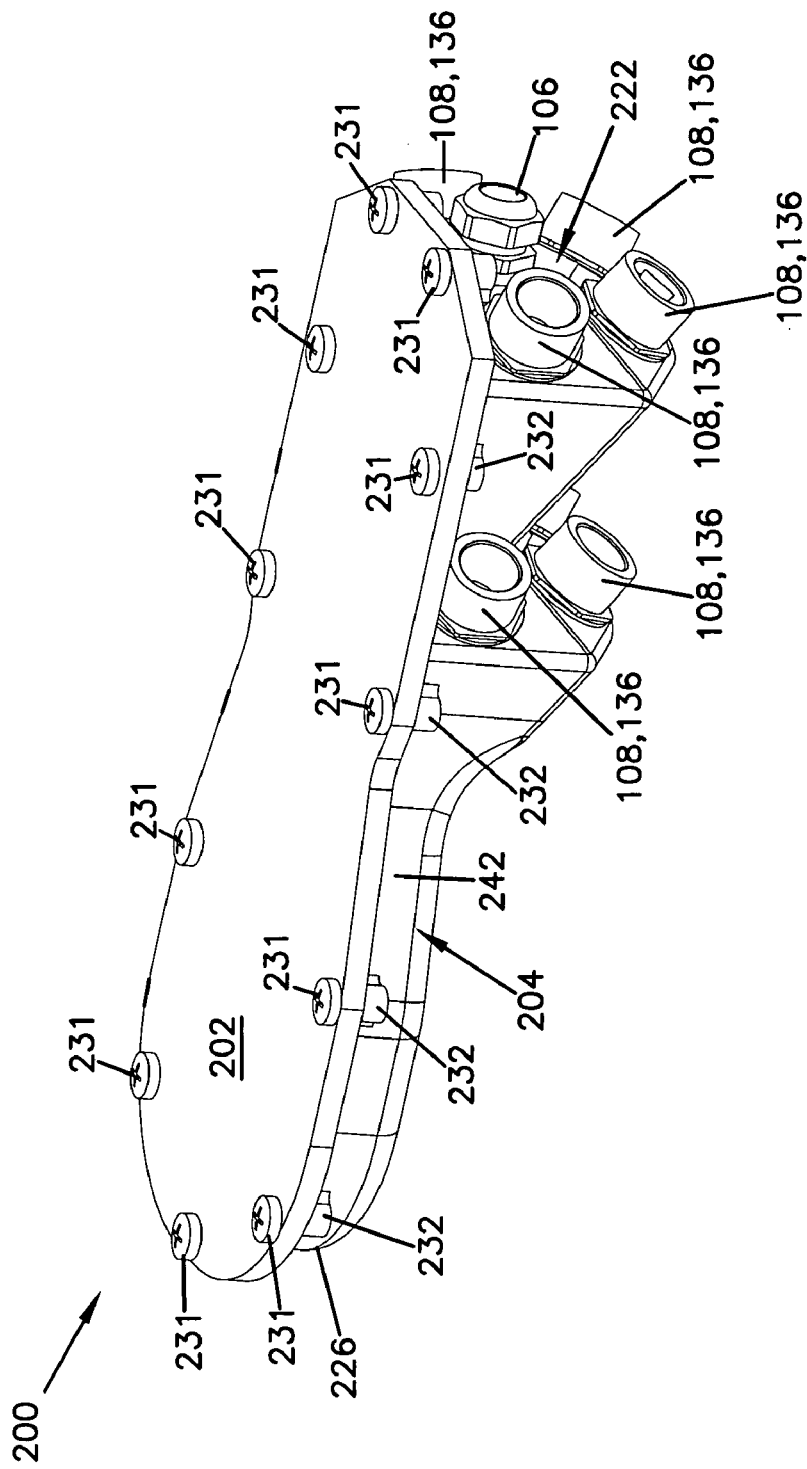
FIG. 14 is a perspective view of a second embodiment of a fiber access terminal according to the present invention.
Figure 15:
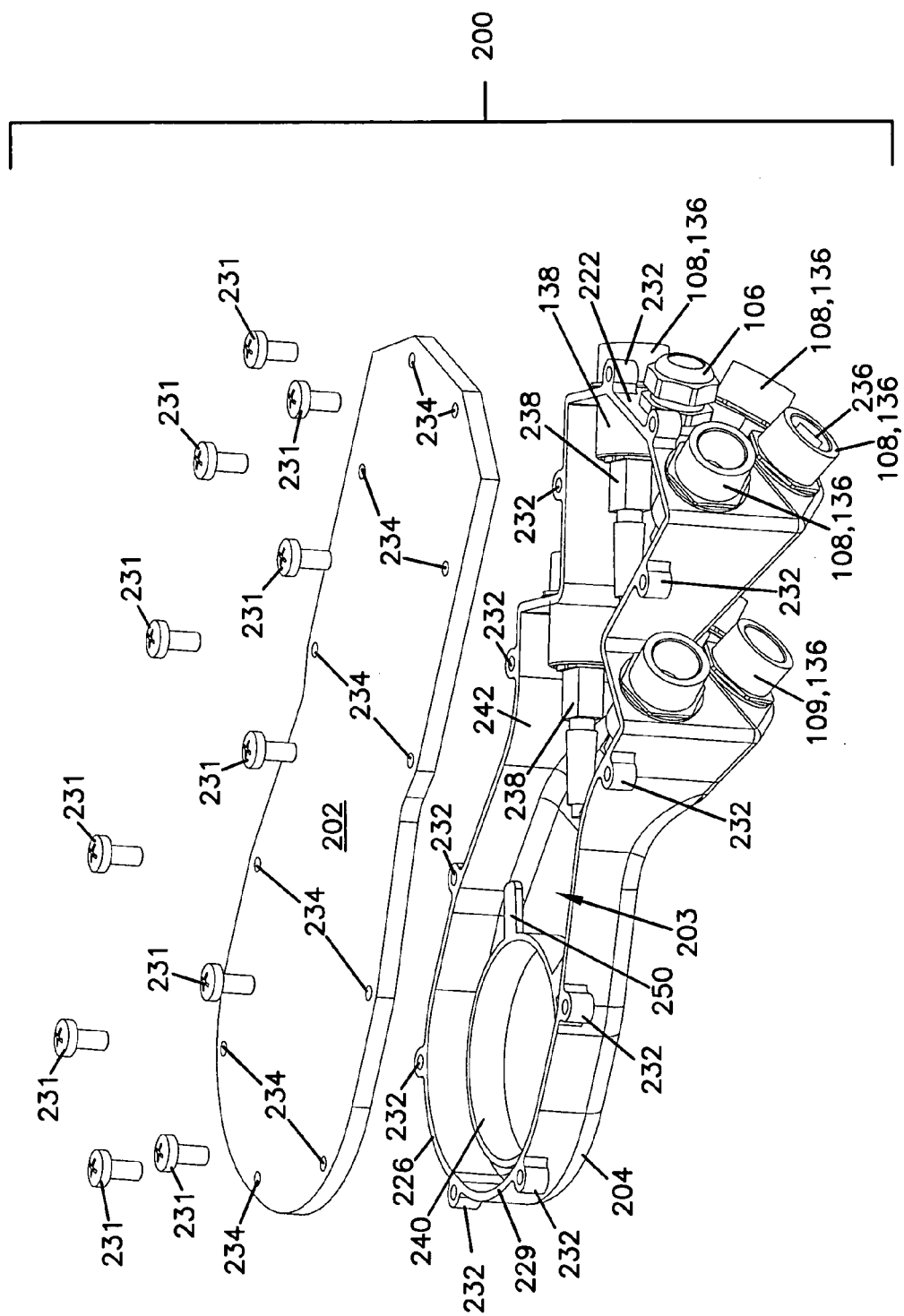
FIG. 15 is an exploded perspective view of the fiber access terminal of FIG. 14.
Figure 16:
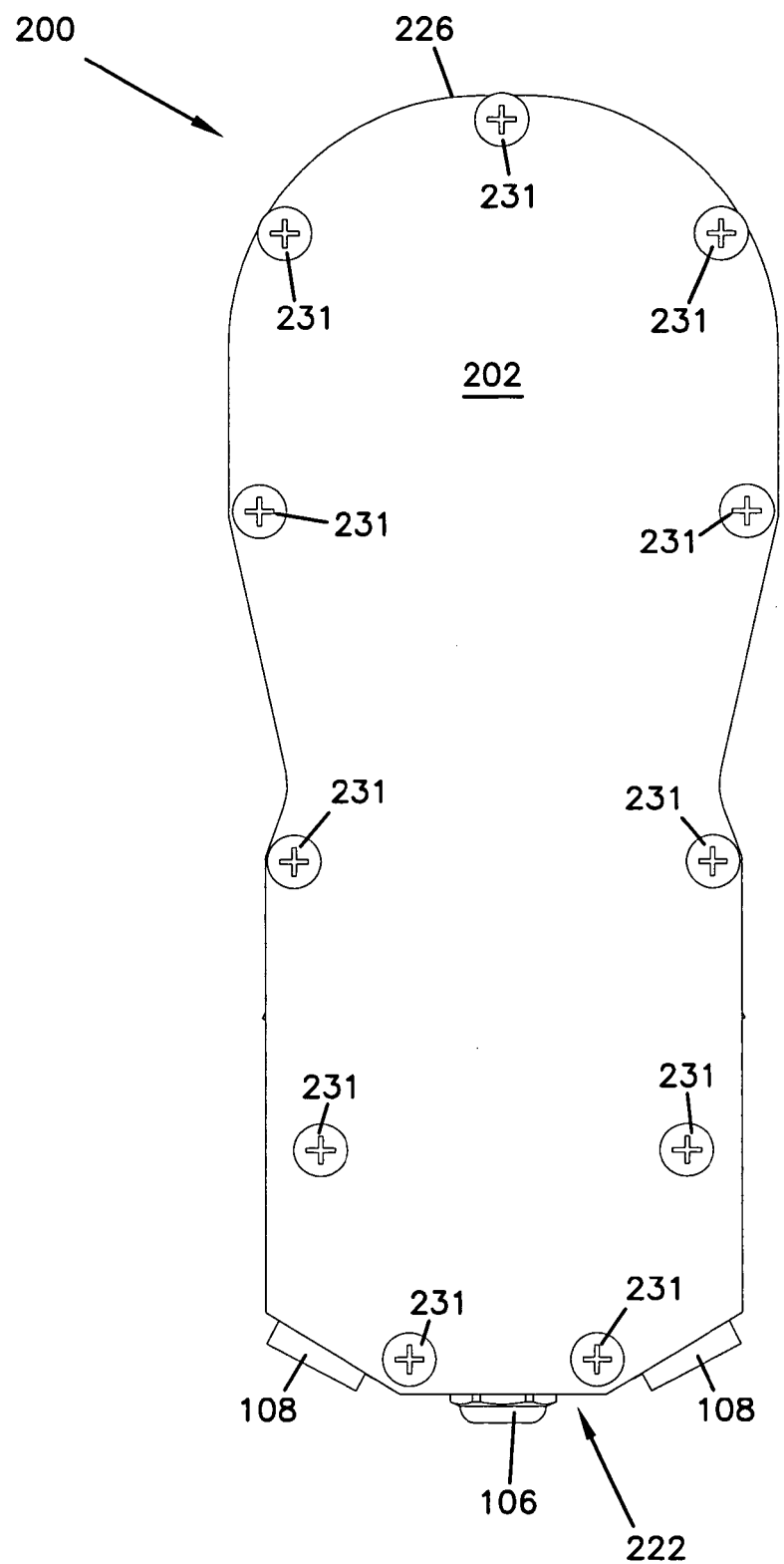
FIG. 16 is a first side view of the fiber access terminal of FIG. 14.
Figure 17:
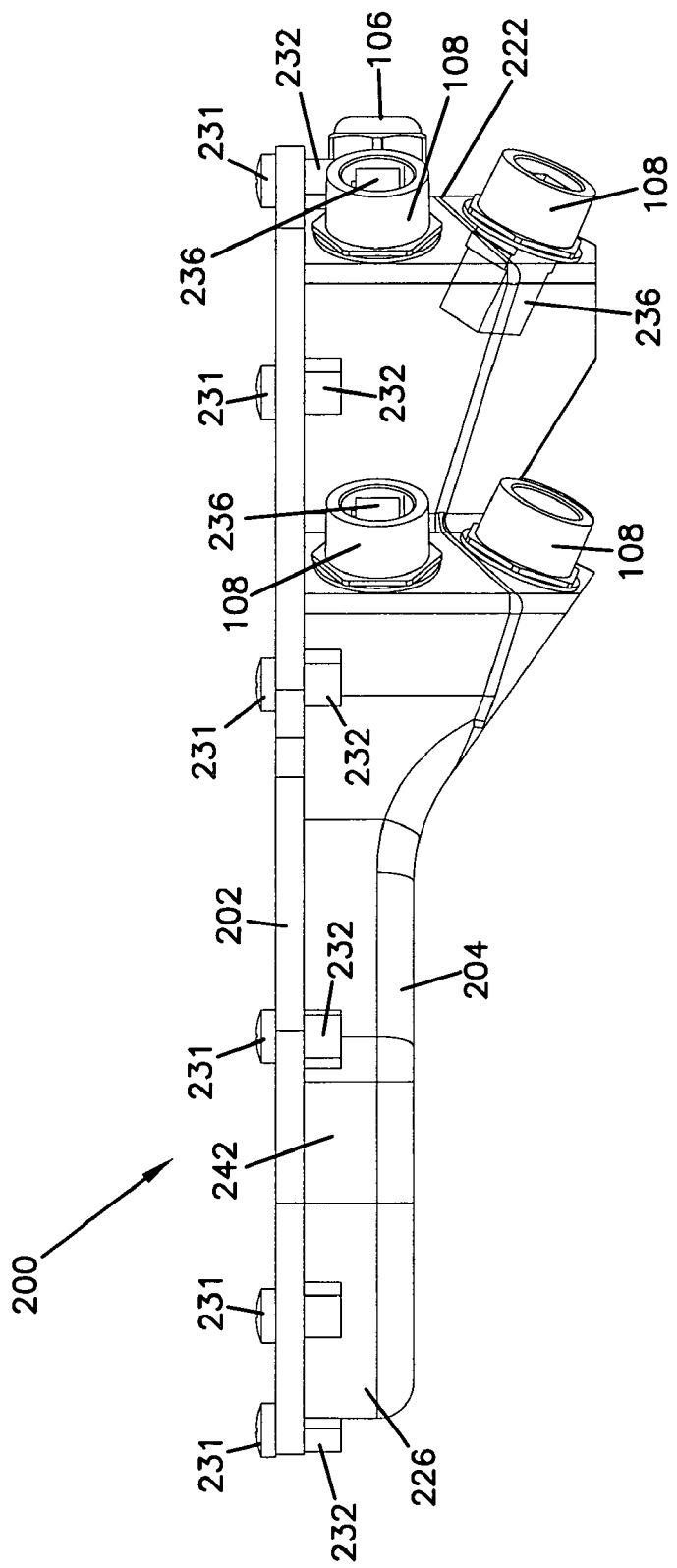
FIG. 17 is a second side view of the fiber access terminal of FIG. 14, offset approximately ninety degrees from the side view of FIG. 16.
Figure 18:
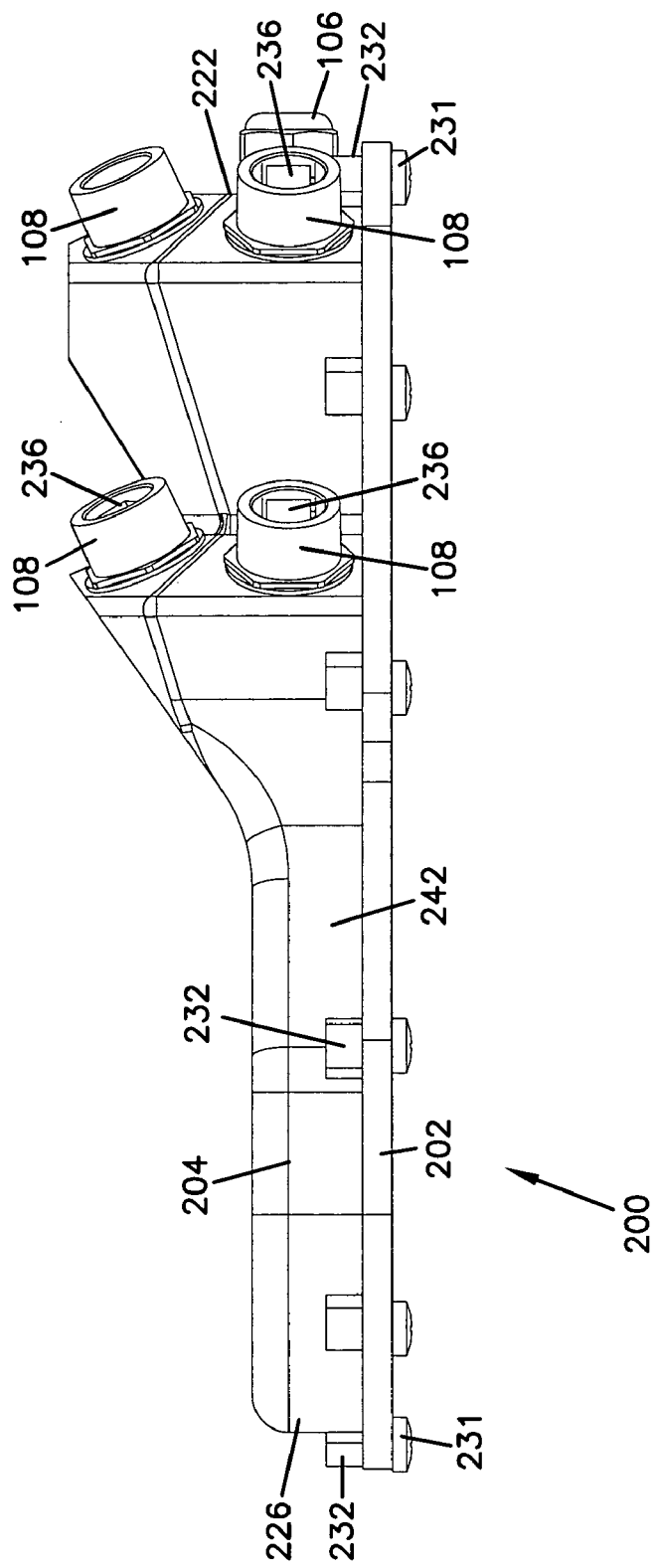
FIG. 18 is a third side view of the fiber access terminal of FIG. 14, opposite the side view of FIG. 17.

Referring now to FIGS. 14 to 20, a second embodiment 200 of a fiber access terminal according to the present invention is shown. As shown in FIGS. 14 and 15, terminal 200 includes a cover 202 and a housing 204 having a top end 226. A plurality of fasteners 231 extend through a plurality of openings 234 in cover 202 and are received within fastener bosses 232 of housing 204 to releasably hold cover 202 to housing 204. Extending through a base 222 of housing 204 is a fiber distribution cable fitting 106 to permit passage of a fiber distribution cable through housing 204 into an interior 203 of terminal 200. A plurality of fiber optic connectors 108 are positioned adjacent cable fitting 106 adjacent base 222.

Connectors 108 include inner ends 138 and outer ends 136. As shown, within each connector 108 is a fiber optic adapter 236. Positioned within each of inner ends 138 in fiber optic adapter 236 is a cable connector 238. The fiber optic distribution cable entering interior 203 through fitting 106 may be a multistrand cable and each of the individual optical fibers may be broken out of the distribution cable within interior 203. These individual optical fibers may be routed within interior 203 about a cable guide 240 positioned adjacent top end 226 and may be terminated by cable connector 238. Such break-outs and terminations are well known in the telecommunications industry.

Cable guide 240 may include one or more tabs 250 to aid in keeping optical fiber cables within interior 203 in the desired position to slack storage and bend radius protection. A wall 242 extends around housing 204 and includes an upper edge 229. Upper edge 229 is preferably defines a plane so that cover 202 can mate closely with housing 204. A seal such as a gasket 230 (not shown in the FIGS.) may be positioned between upper edge 229 and cover 202 to aid in forming a weathertight seal for interior 203.

Figure 20:
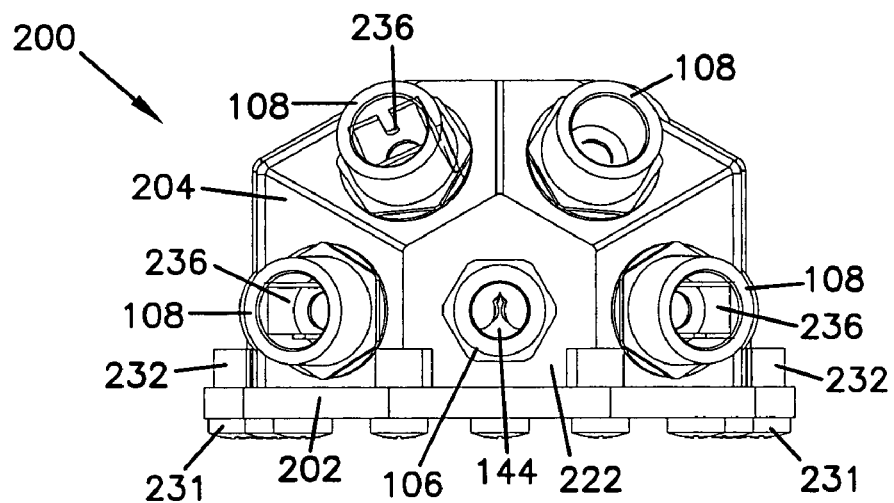
FIG. 20 is a base end view of the fiber access terminal of FIG. 14.
Figure 19:
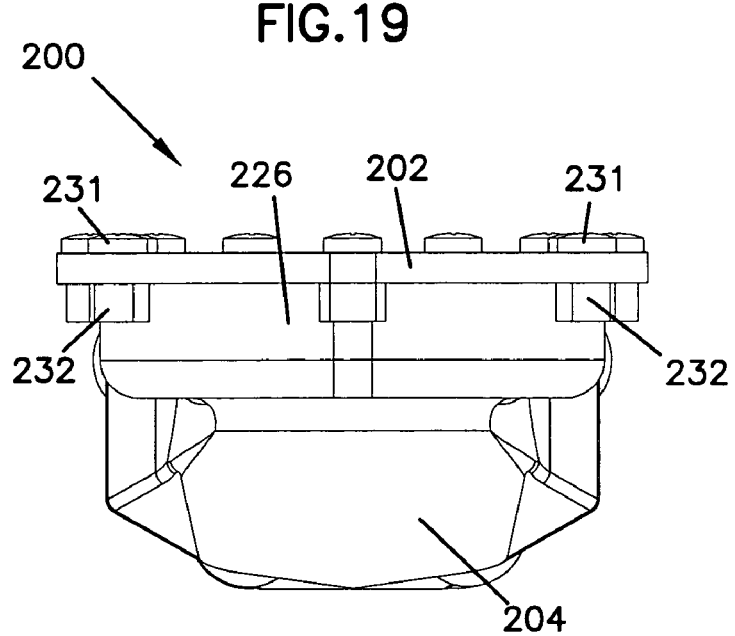
FIG. 19 is a top end view of the fiber access terminal of FIG. 14.
Figure 21:
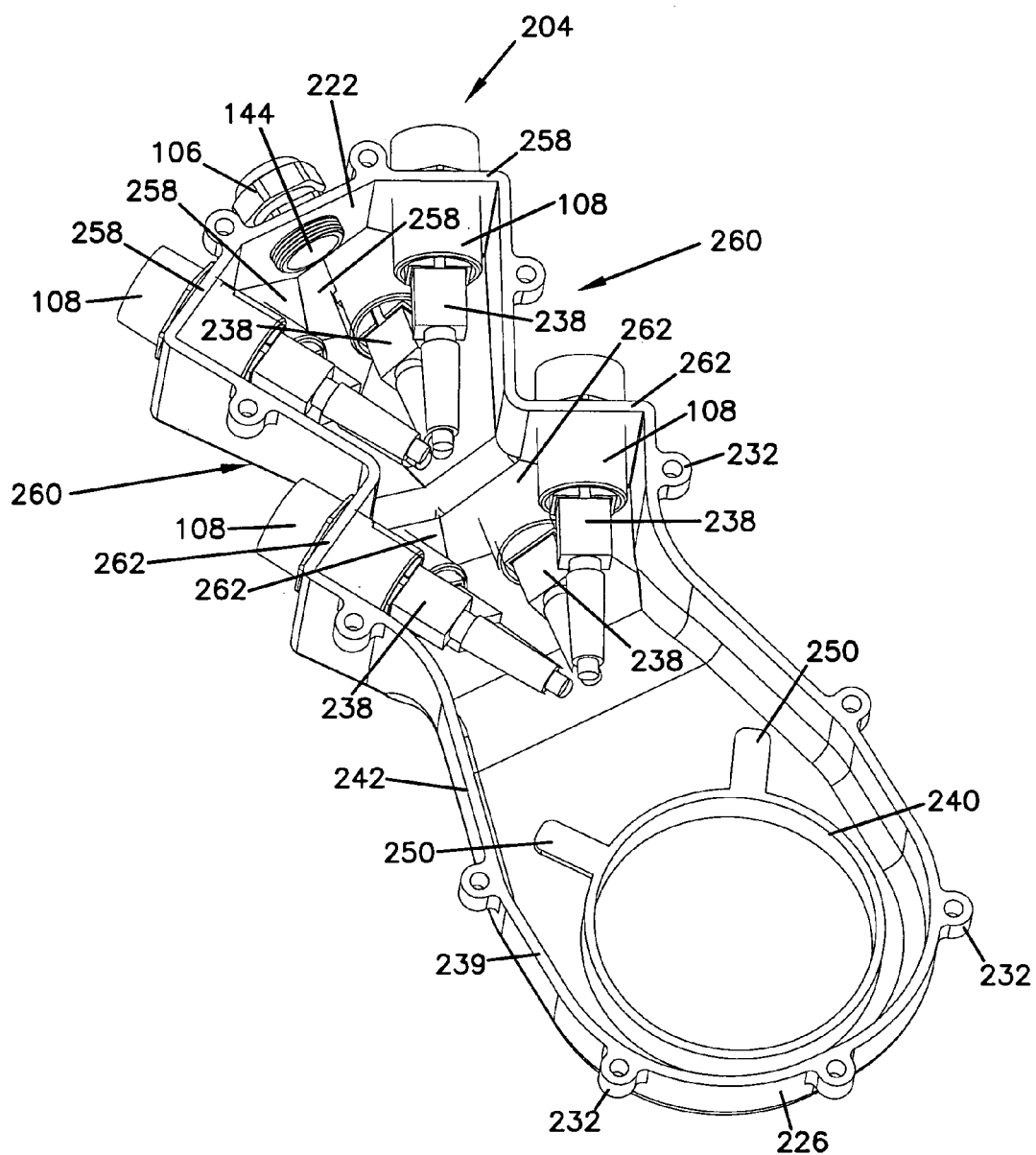
FIG. 21 is a first perspective view of a terminal body of the fiber access terminal of FIG. 14.
Figure 22:
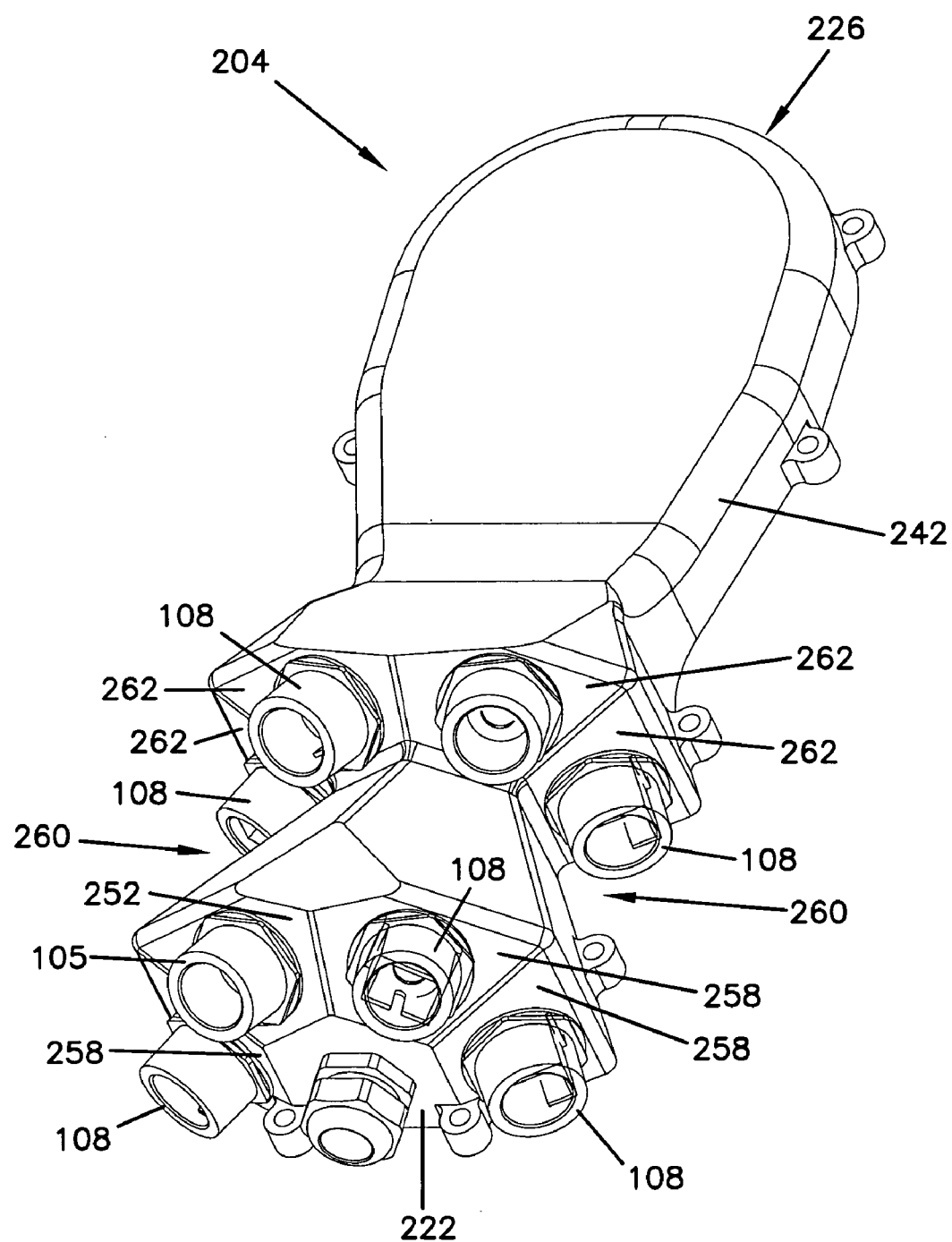
FIG. 22 is a second perspective view of the terminal body of FIG. 21.
Figure 23:
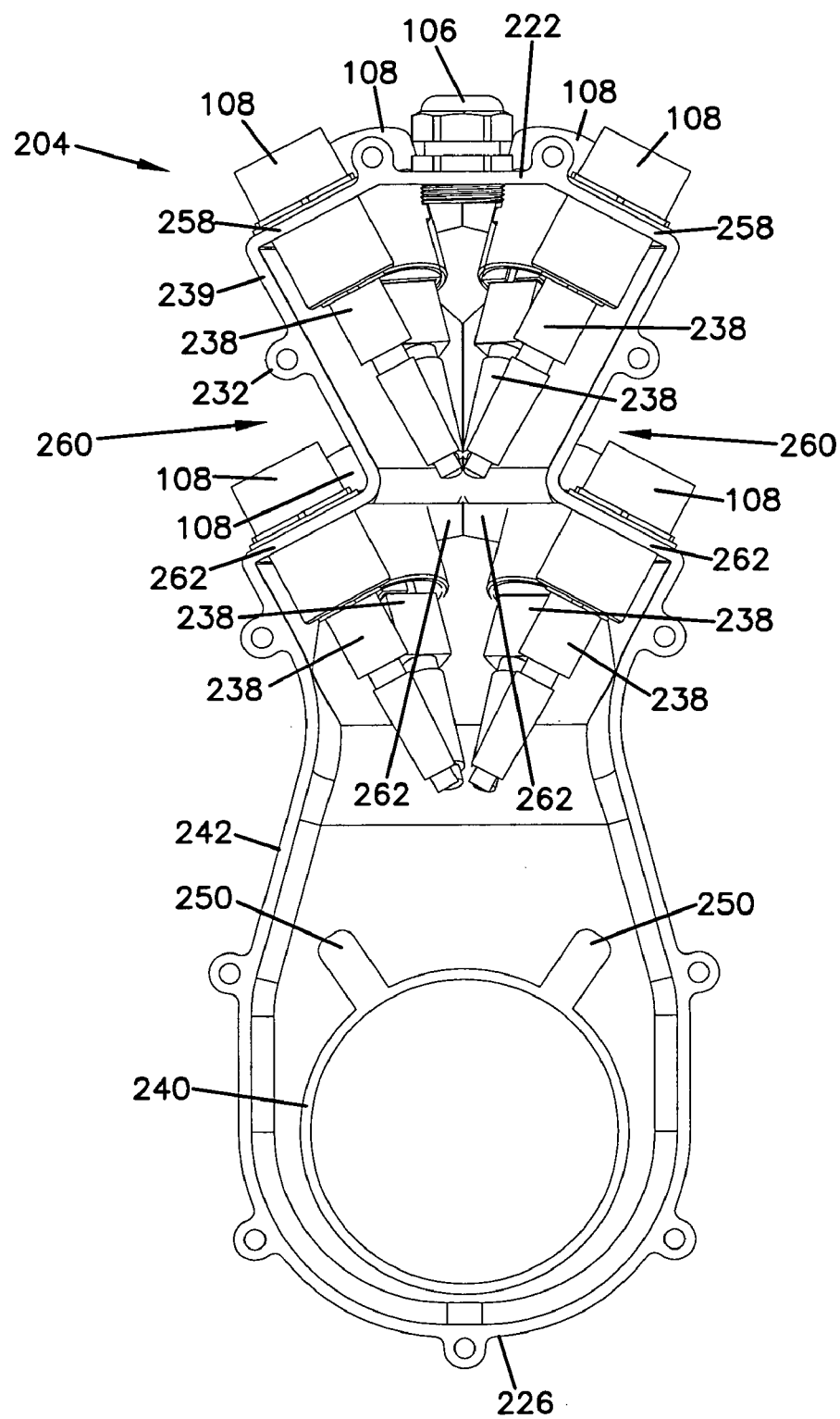
FIG. 23 is a first side view of the terminal body of FIG. 21.
Figure 24:
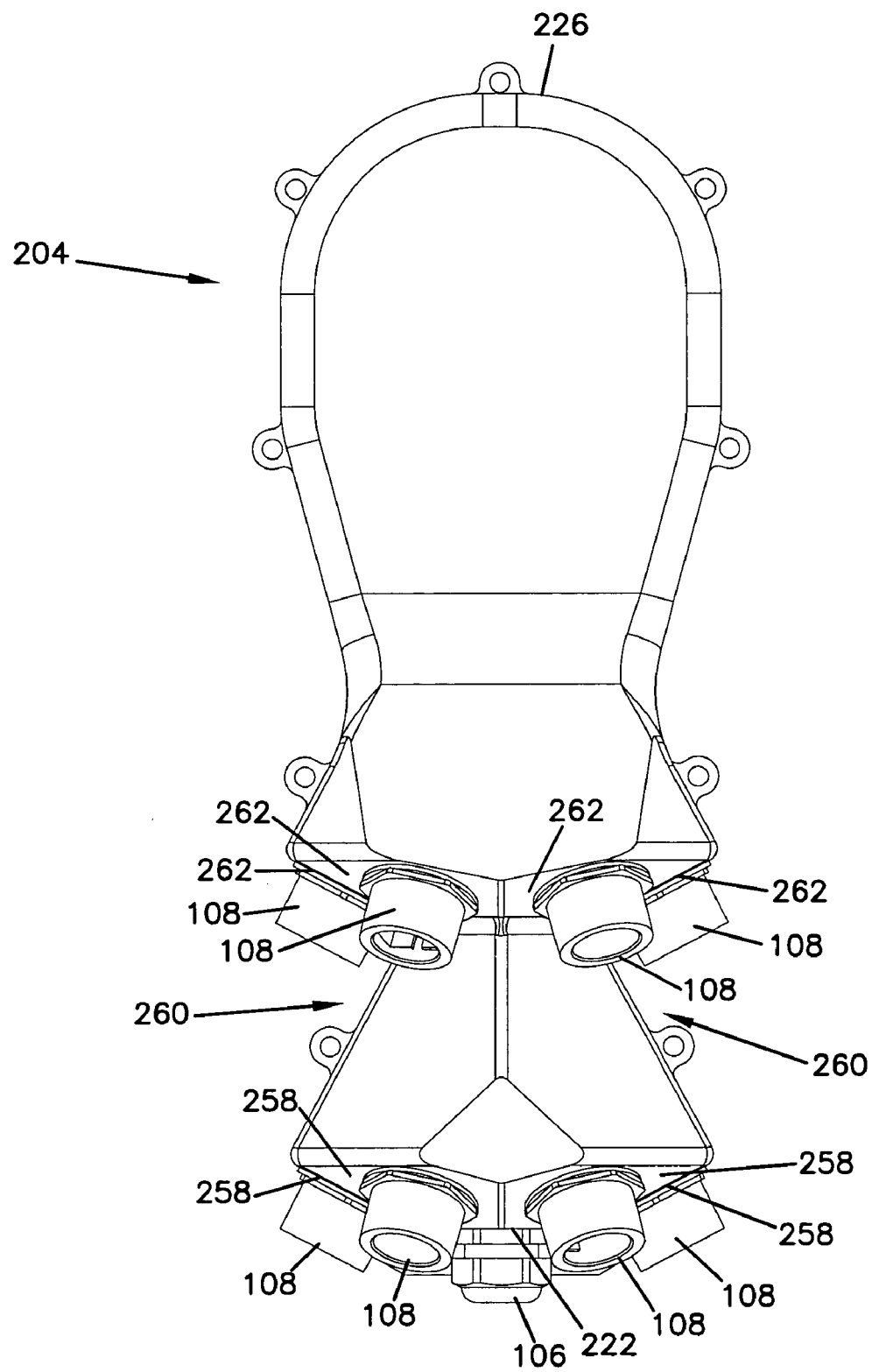
FIG. 24 is a second side view of the terminal body of FIG. 21, opposite the side view of FIG. 23.

Referring to FIG. 20, fitting 106 includes opening 144 extending through base 222 into interior 203 to permit entry of the fiber distribution cable. In FIG. 20, four of the eight connectors 108 are visible and are arranged in a semicircle about fitting 106. These four connectors 108 are mounted through mounting surfaces 258 positioned about base 222. Outer end 136 of each of the visible connectors 108 is angled radially with respect to opening 144 and fitting 106. This angling of those connectors 108 closest to fitting 106 can be seen in FIGS. 21 to 24, and aids in access to the outer ends 136 for connecting fiber optic drop cables to provide a service connection between a customer and the fiber distribution cable.

As can be seen in FIGS. 21 to 24, the other four connectors 108 are similarly arranged in a semi-circle and are angled outward, although they are positioned between base 222 and top end 226. A narrowed waist area 260 is provided in hsouing 204 so that these second set of four connectors may be positioned as desired and not increase the overall width of terminal 200. Similarly to terminal 100, terminal 200 is configured to be passed through a buried conduit to extend fiber optic connectivity between a fiber distribution terminal and a fiber access terminal. As many of these conduits are limited in diameter, it is desirable that housing 204 provide an arrangement of connectors 108 that improves access for connecting drop cables while not unduly increasing the overall width of terminal 200. Waist area 260 provides mounting surfaces 262 for the set of four connectors 108 offset from base 222 and insets these four connectors 108 to approximately the same width as the four connectors 108 mounted to surfaces 258.

All of the eight connectors 108 permit connection of drop cables for connecting to a customer which are generally from the same direction as the fiber distribution cable entering interior 203 through fitting 106 and opening 144.

Figure 25:
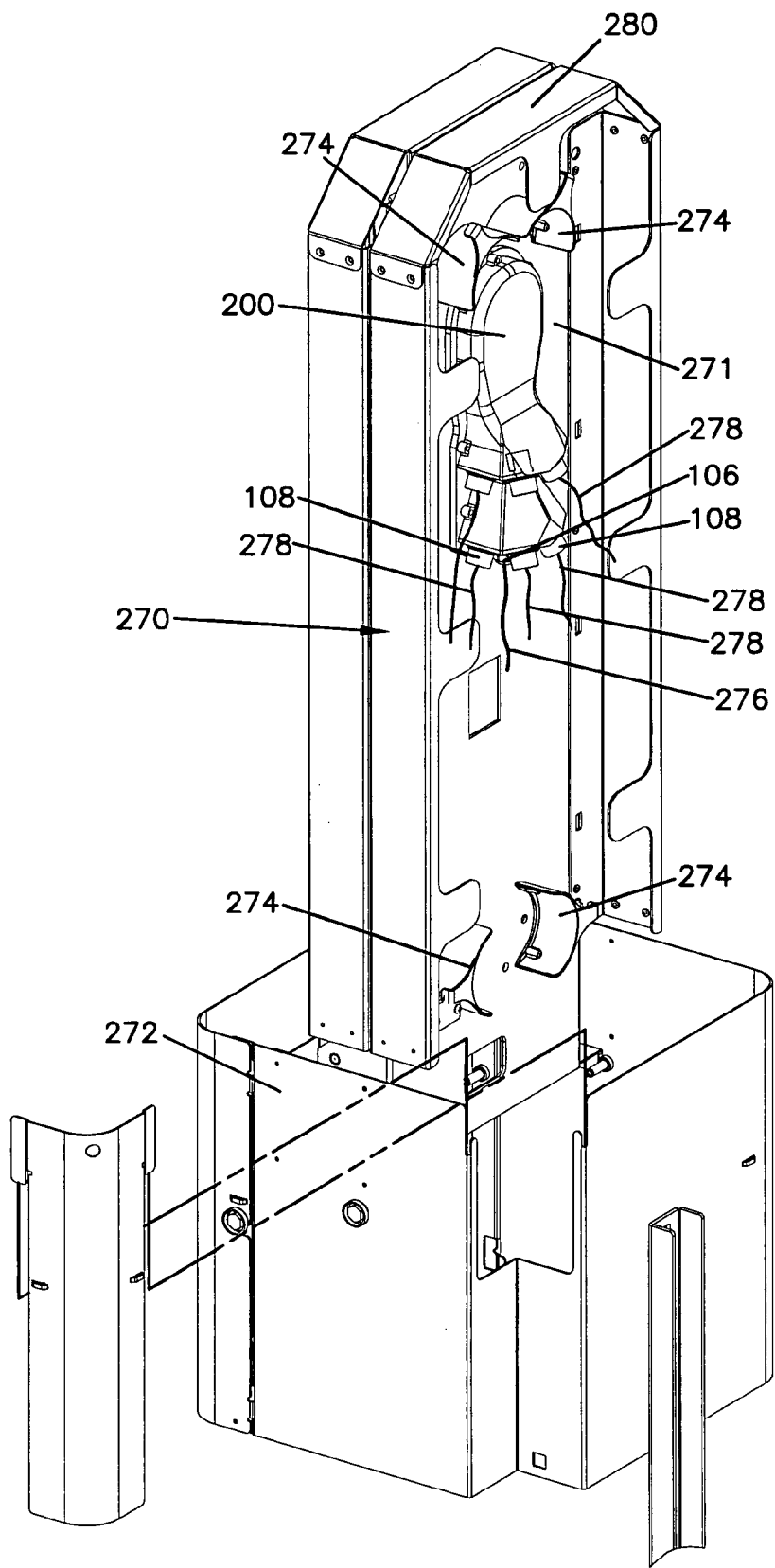
FIG. 25 is a perspective view of a terminal mount with the fiber access terminal of FIG. 13 mounted.
Figure 26:
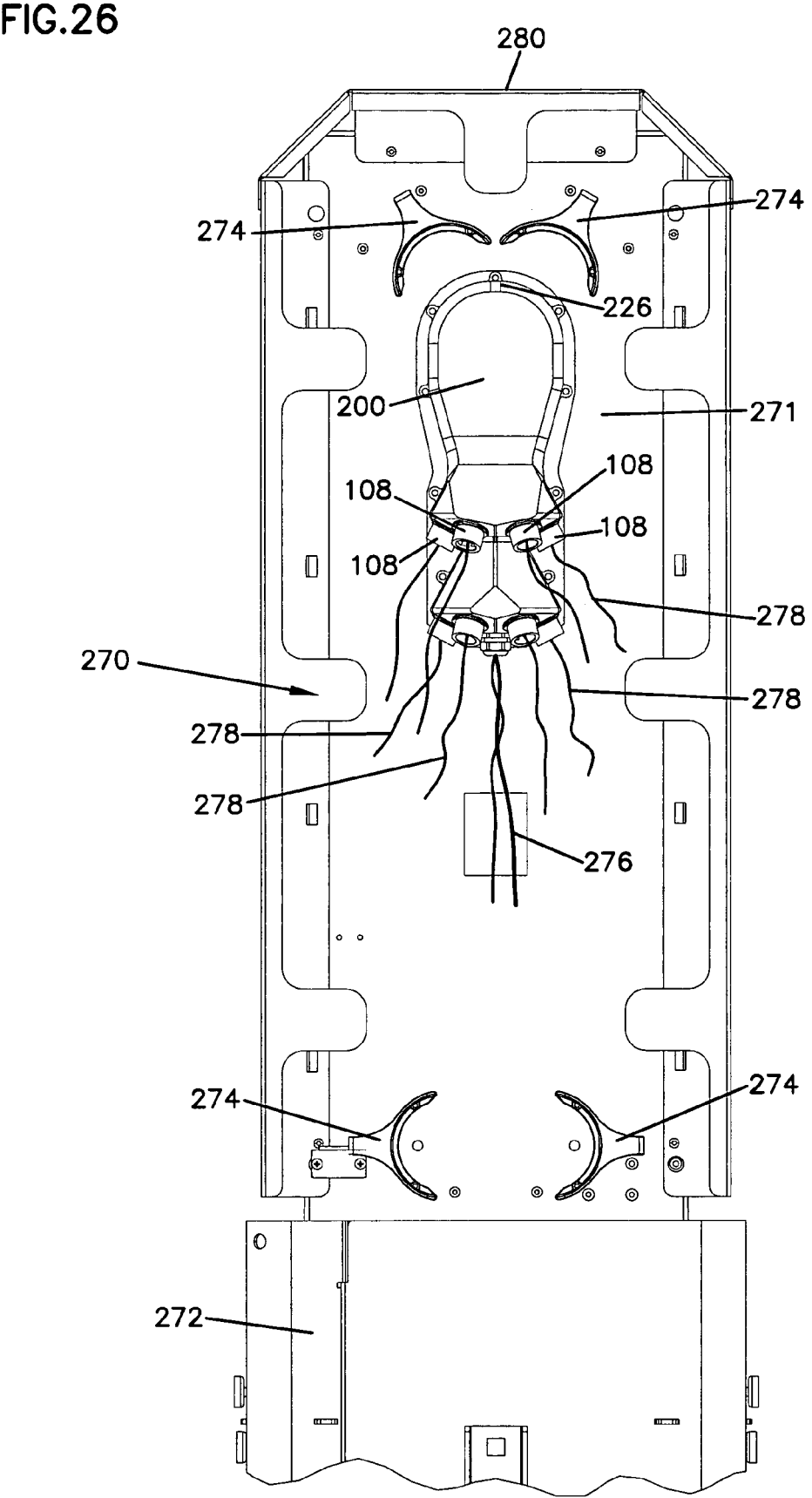
FIG. 26 is a front view of the terminal mount of FIG. 25.

FIGS. 25 and 26 illustrate the mounting of terminal 200 within a terminal mount 270 extending upward from a mounting base 272 to a top 280. Terminal 200 is mounted to an inner bulkhead 271 to which are also mounted a plurality of cable routing guides 274 to provide for bend radius protection and cable slack storage which may be used for a multi-fiber fiber distribution cable 276 or a plurality of customer drop cables 278. By mounting terminal 200 as shown in FIGS. 25 and 26, fitting 106 and connectors 108 are positioned downward to prevent contaminants from falling in. By directing all cables 276 and 278 to terminal 200 from the same direction, that is, from beneath toward base 222, cable management within terminal mount 270 may be simplified. It is anticipated that terminal mount 270 could be adapted and configured for use with terminal 100, described above, as well as with the alternative embodiments of fiber access terminals described below.

Figure 27:
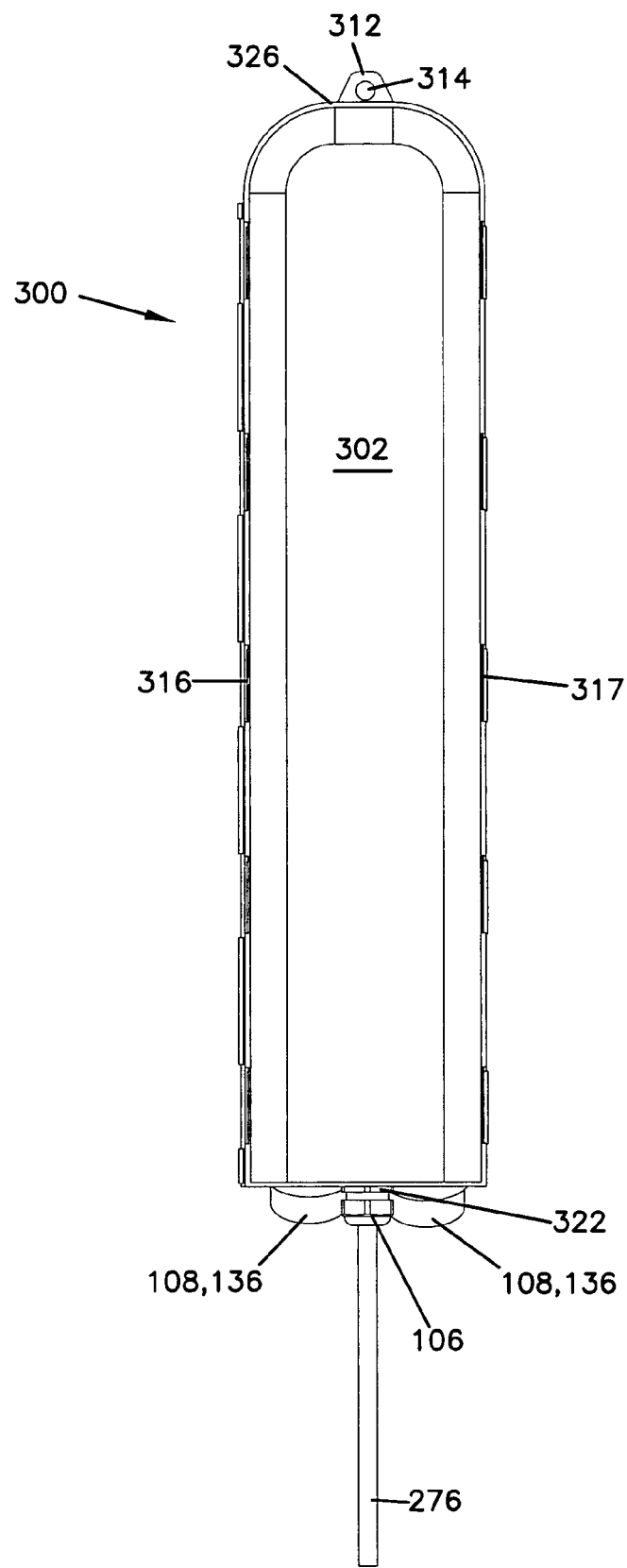
FIG. 27 is a front view of a third embodiment of a fiber access terminal according to the present invention, with a fiber distribution cable entering the terminal through a base.
Figure 28:
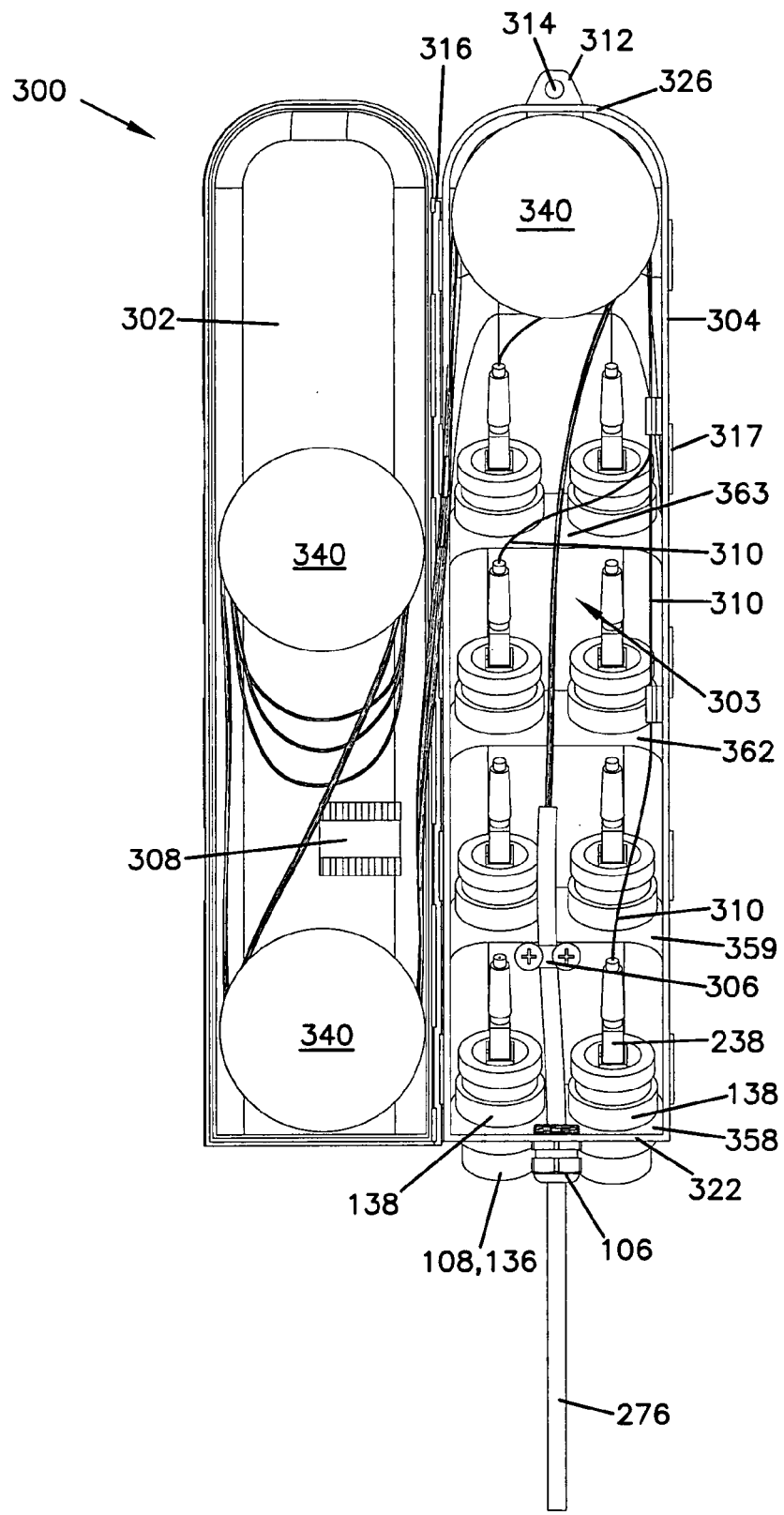
FIG. 28 is a front view of the terminal of FIG. 27, with the cover open and the fiber distribution cable extending within the interior of the terminal.
Figure 29:
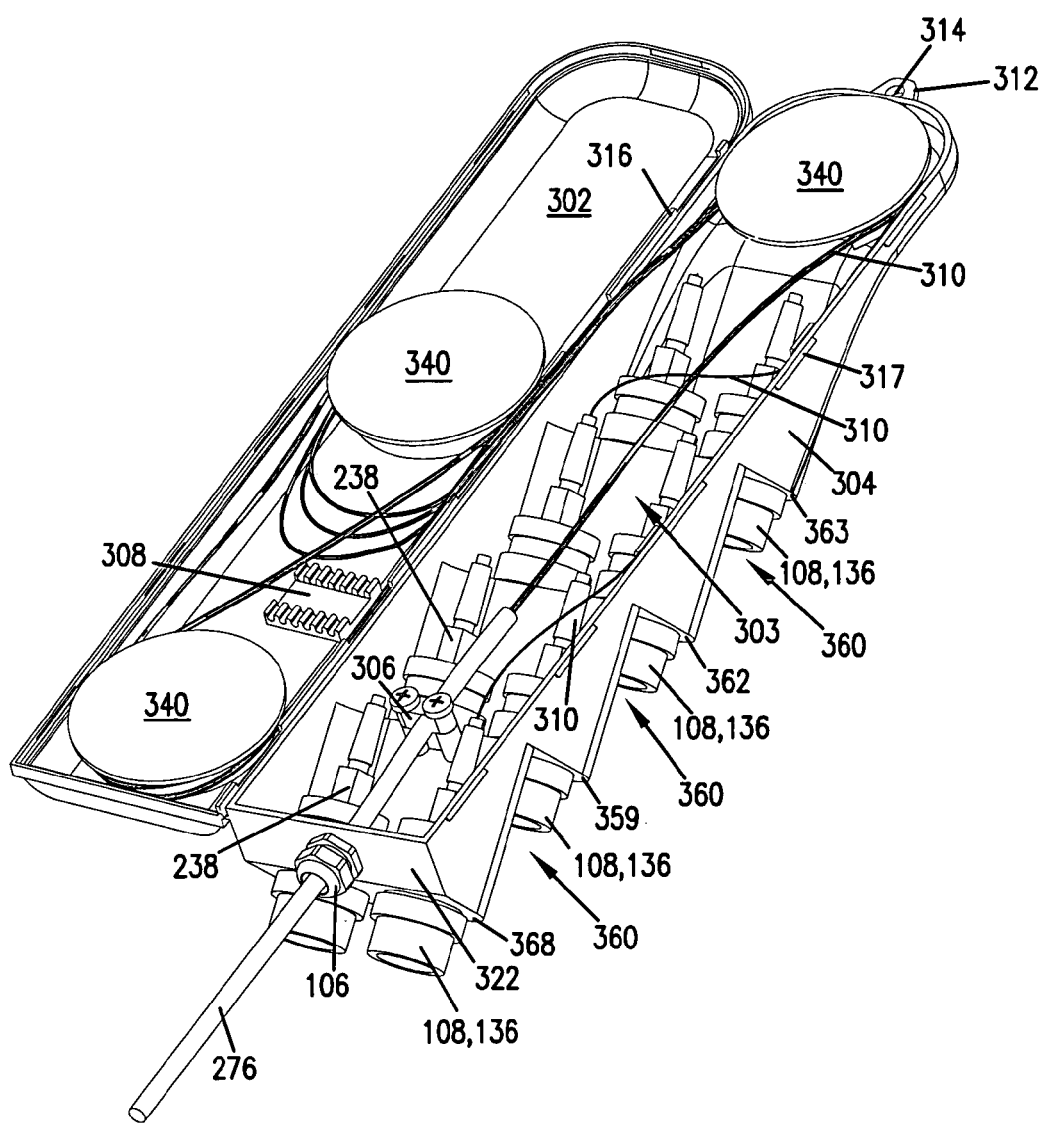
FIG. 29 is a perspective view of the terminal of FIG. 28.

FIGS. 27 to 29 illustrate a third alternative embodiment 300 of a fiber access terminal according to the present invention, with a fiber distribution cable 276 extending through fitting 106 in a base 322. Terminal 300 includes a cover 302 and a housing 304 defining an interior 303 when closed about a hinge 316, as shown in FIG. 27. As shown in FIGS. 28 and 29, cover 302 has been rotated about hinge 316 to expose interior 303. A catch 317 may be included along a side opposite hinge 316 to releasably hold cover 302 to housing 304 about interior 303. Mounted within interior 303 on cover 302 are several cable guides 340 for providing bend radius protection and cable slack storage, and a cable splice holder 308. Mounted within interior 303 on housing 304 is a cable tie-off or strain relief 306 to receive and anchor fiber distribution cable 276. Cable 276 is a multi-strand cable broken out into individual optical fiber cables 310 which are routed about cable guides 340 and are terminated with cable connectors 238 and connected to inner ends 138 of connectors 108.

It is anticipated that cable 276 may have more optic fibers than connectors 108 of terminal 300. These additional fibers may or may not pre-terminated and may be broken out and kept available within interior 303. These additional fibers would then be available to use as a replacement connection should one of the other fiber cables 310 or cable connectors 238 be damaged. If these additional fibers are not pre-terminated with connectors 238, they can be field spliced to a connector 238. Splice block 308 is provided within interior 303 to hold and protect such splices if they are needed.

Figure 30:
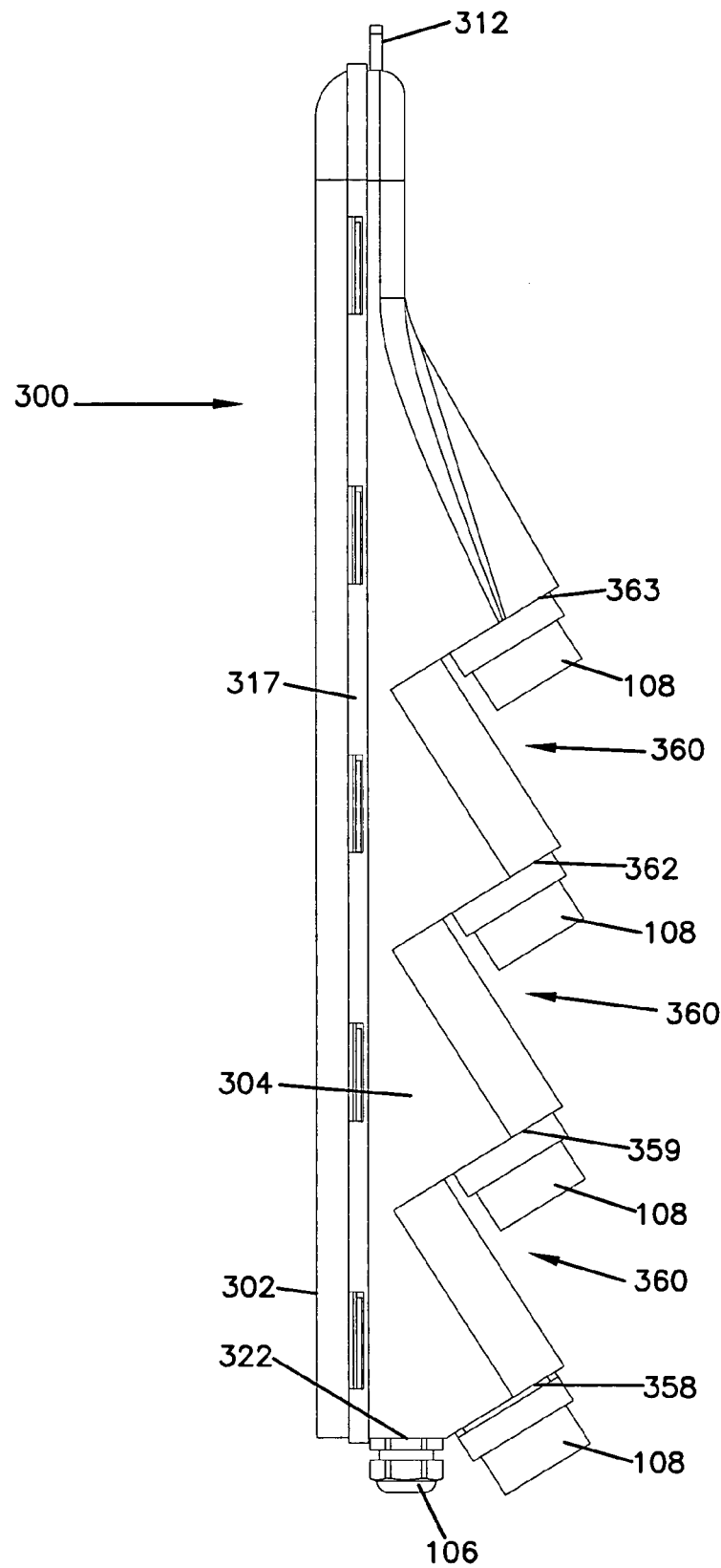
FIG. 30 is a side view of the terminal of FIG. 27, offset approximately ninety degrees from the side view of FIG. 27, without the fiber distribution cable.
Figure 33:
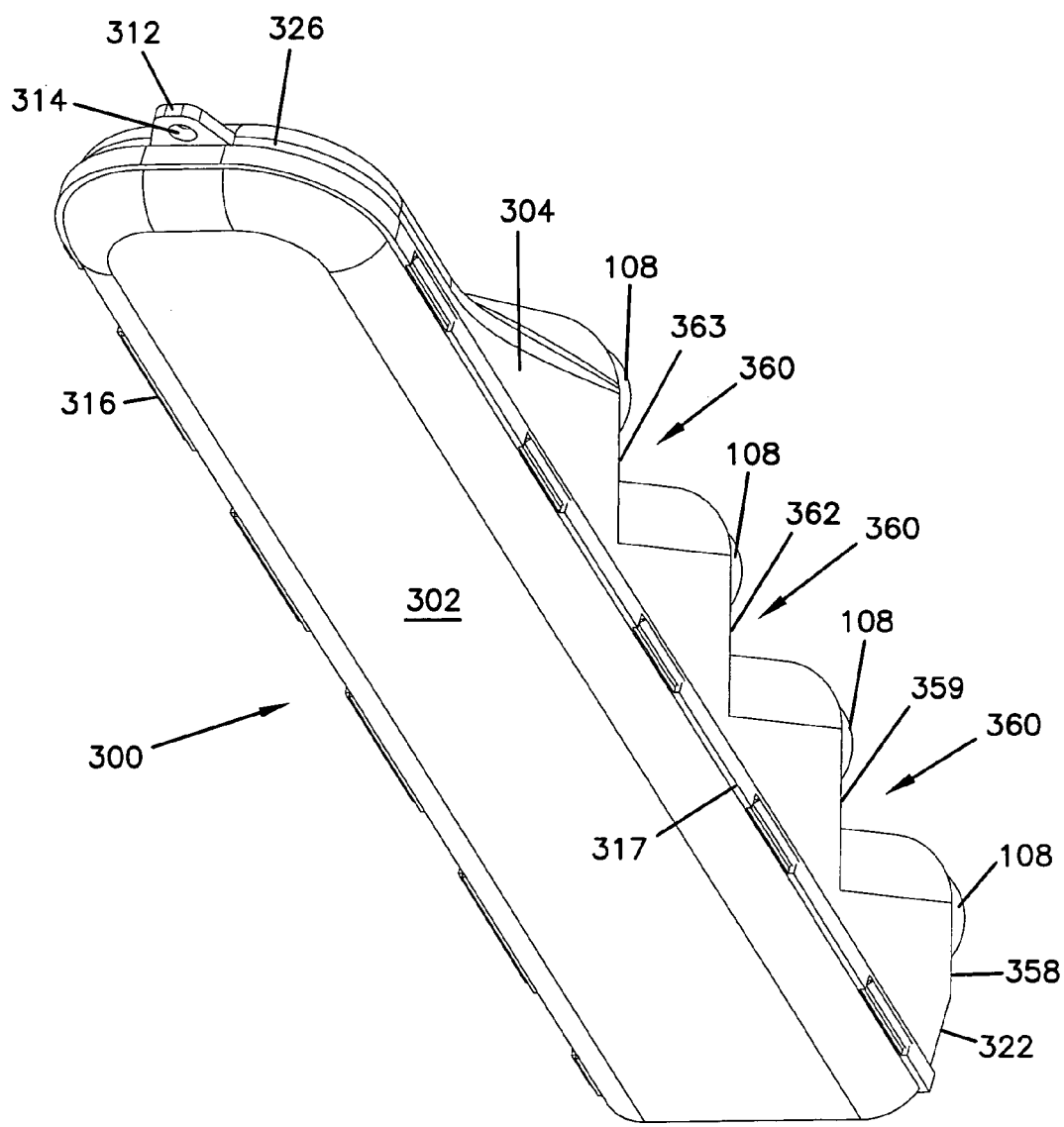
FIG. 33 is a perspective view of a back of the terminal of FIG. 30.
Figure 34:
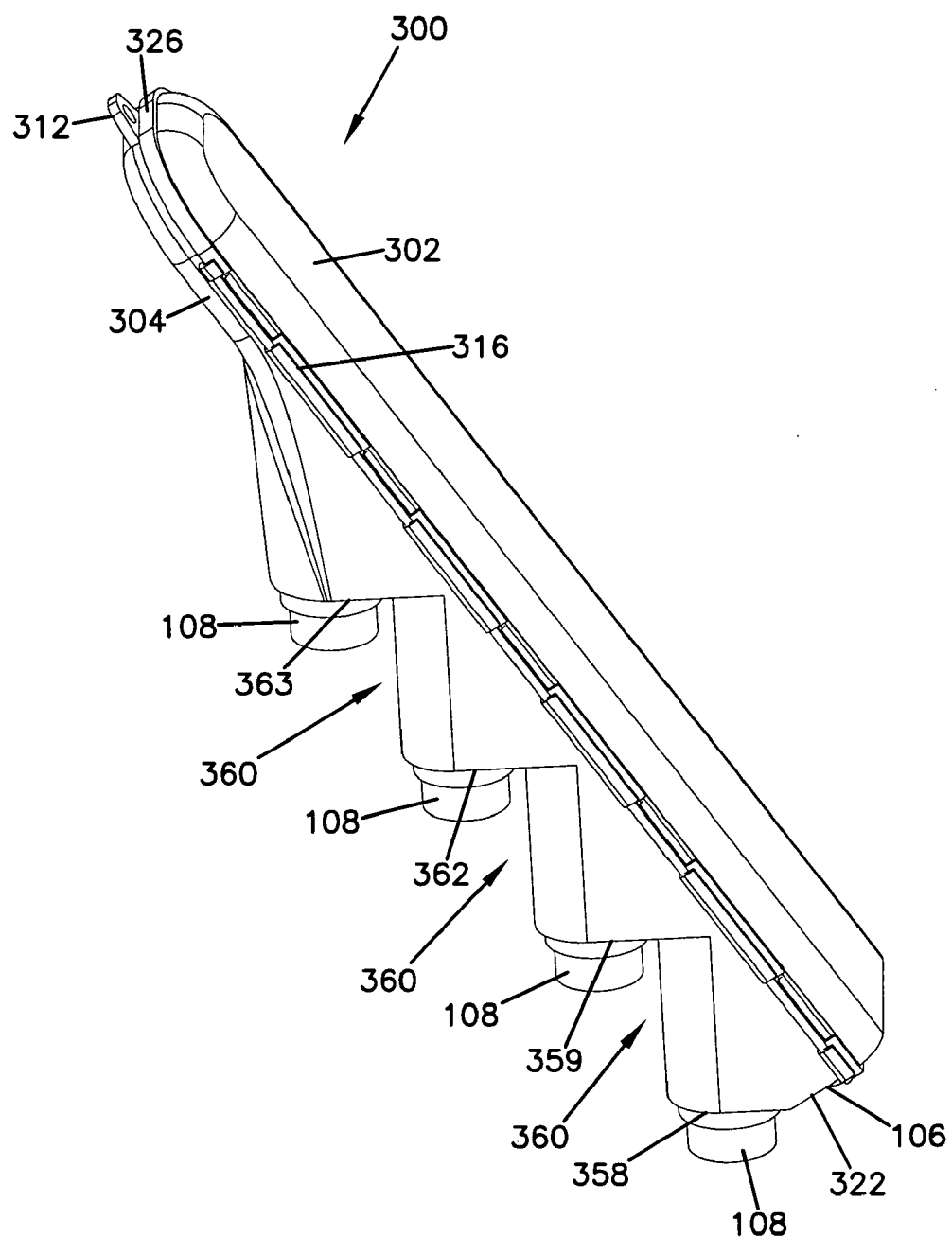
FIG. 34 is a perspective view of the side of the terminal of FIG. 30.
Figure 35:
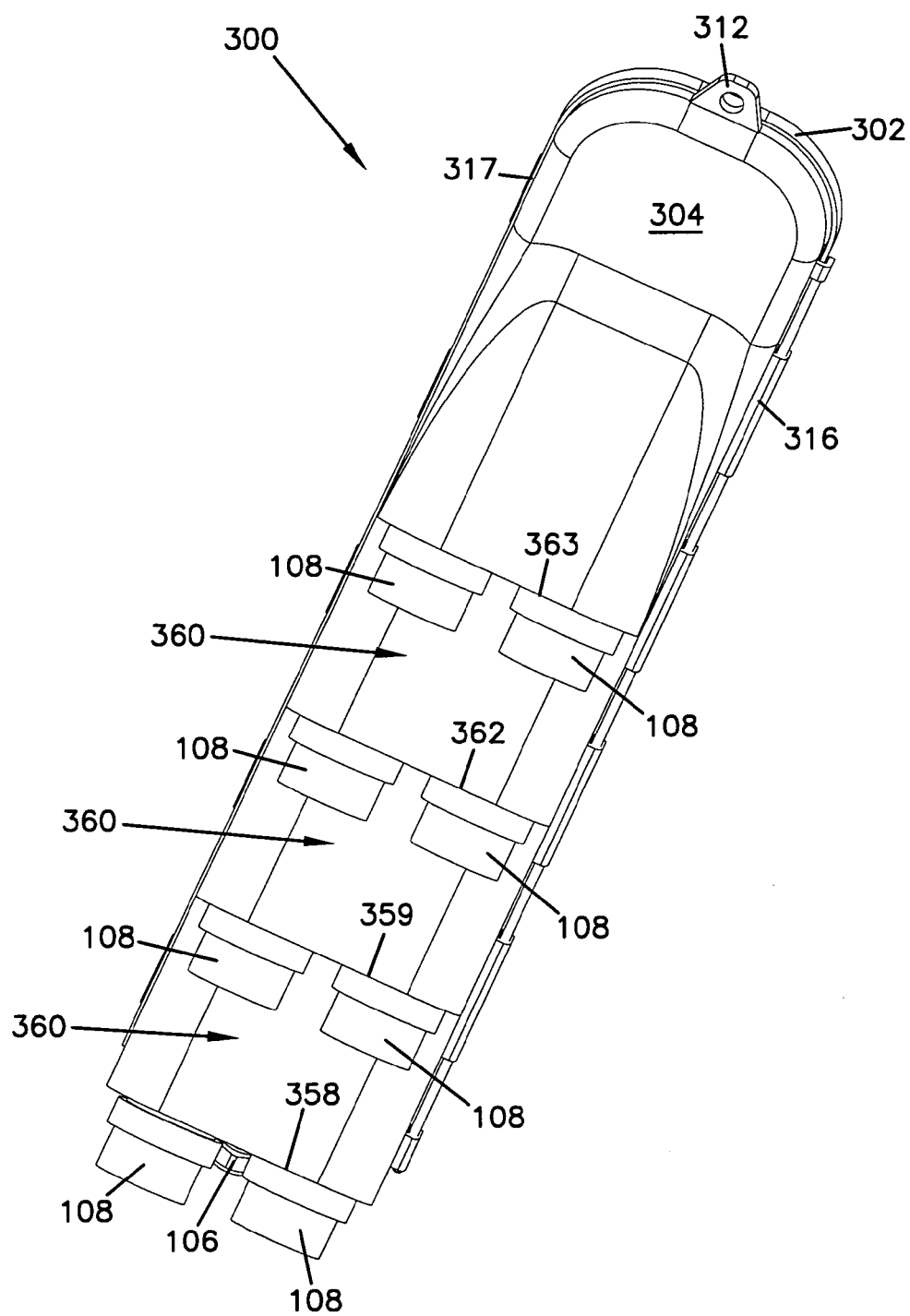
FIG. 35 is a perspective view of the front of the terminal of FIG. 30.
Figure 36:
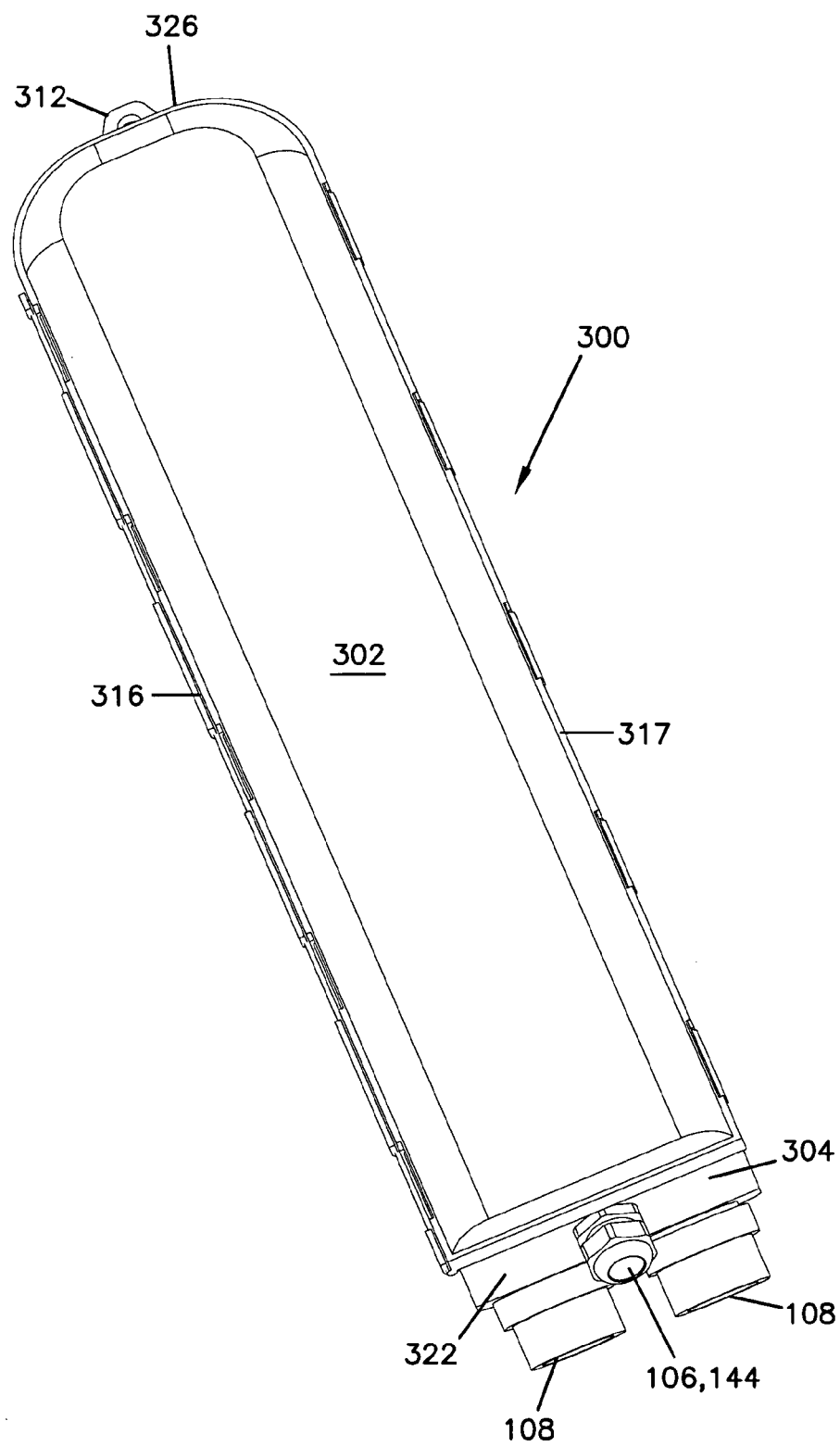
FIG. 36 is a second perspective view of the back of the terminal of FIG. 33.
Figure 37:
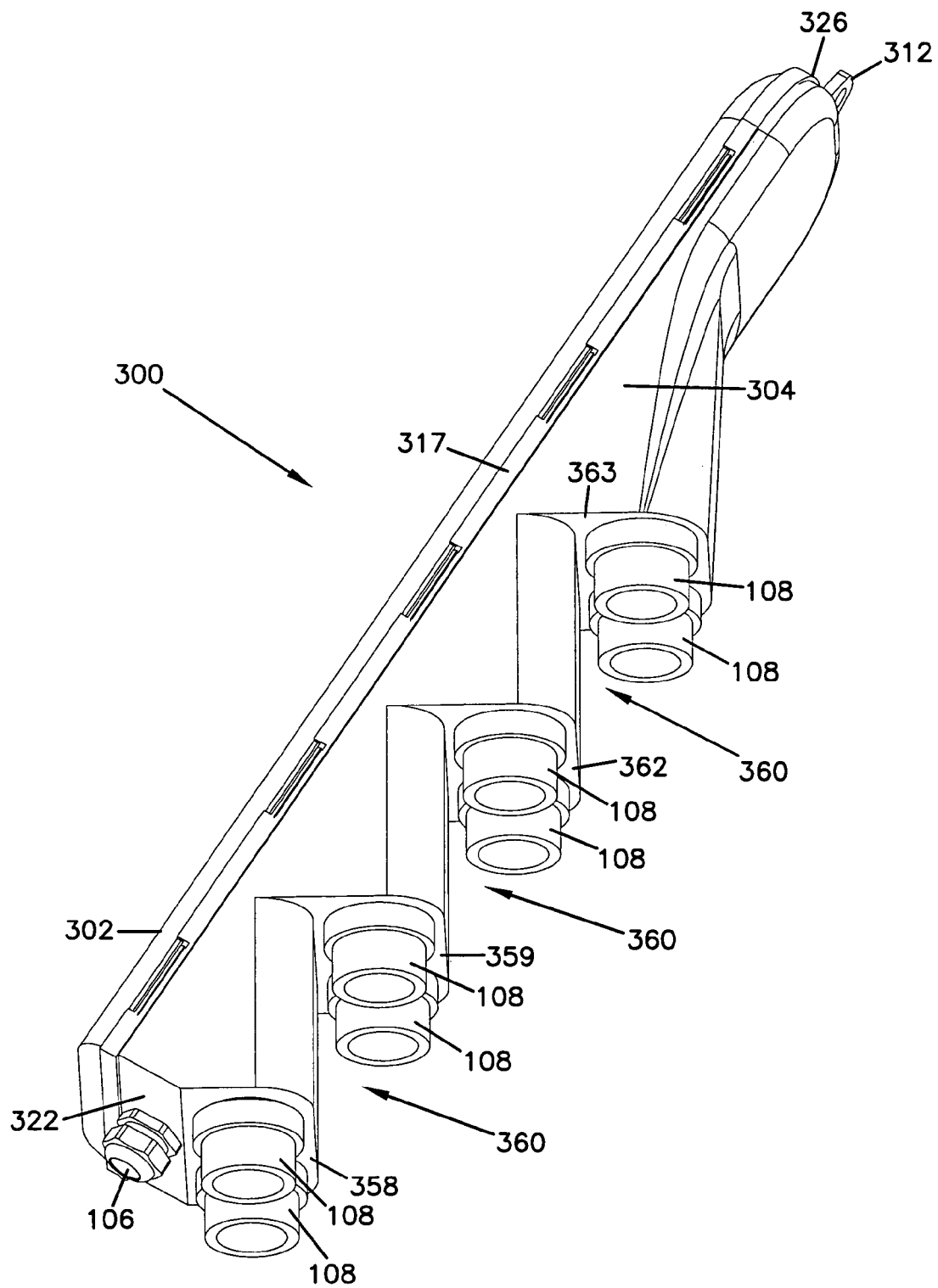
FIG. 37 is a perspective view of a second side of the terminal of FIG. 30.
Figure 38:
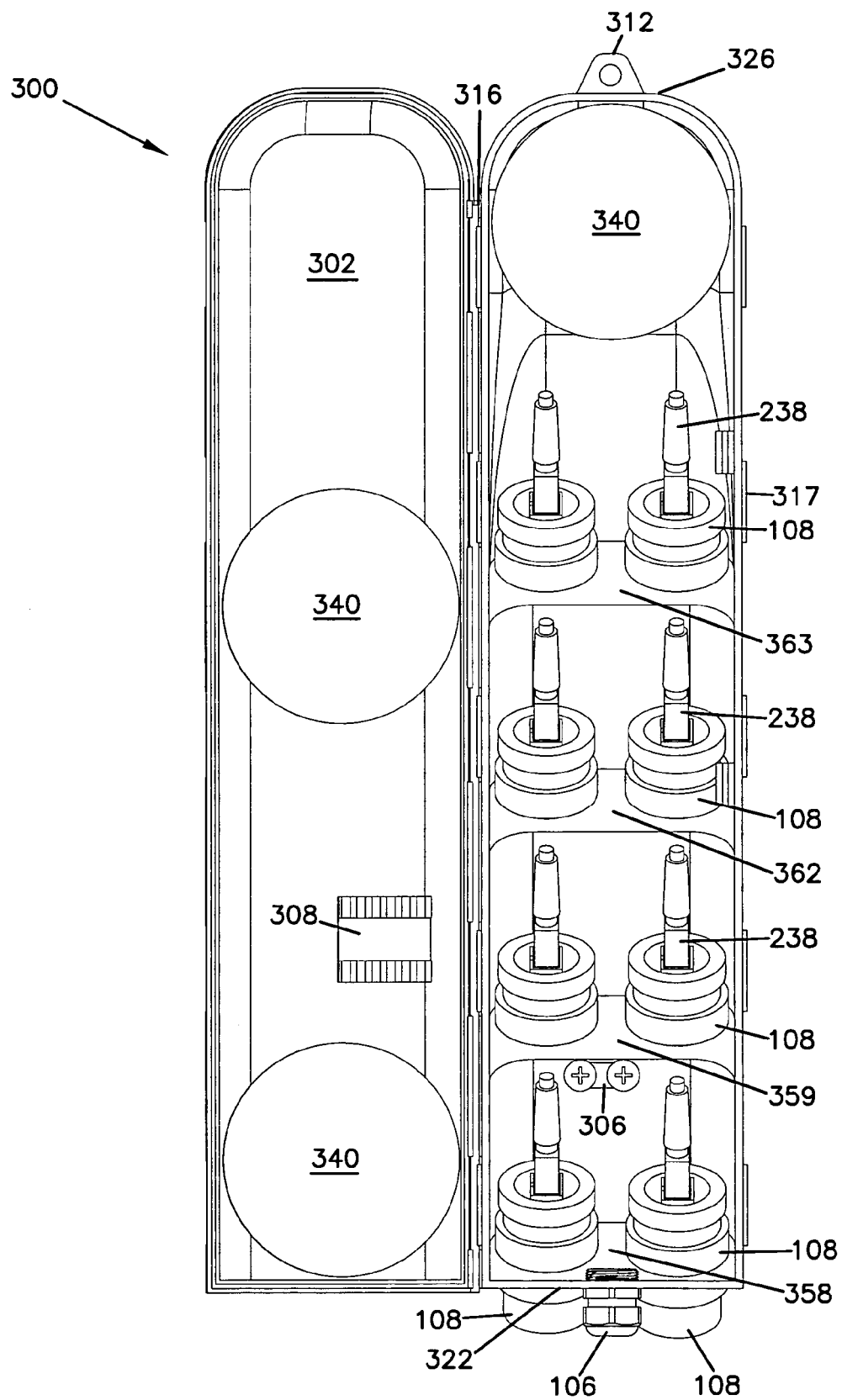
FIG. 38 is a front view of the terminal of FIG. 30, with the cover open to show the interior of the terminal.
Figure 39:
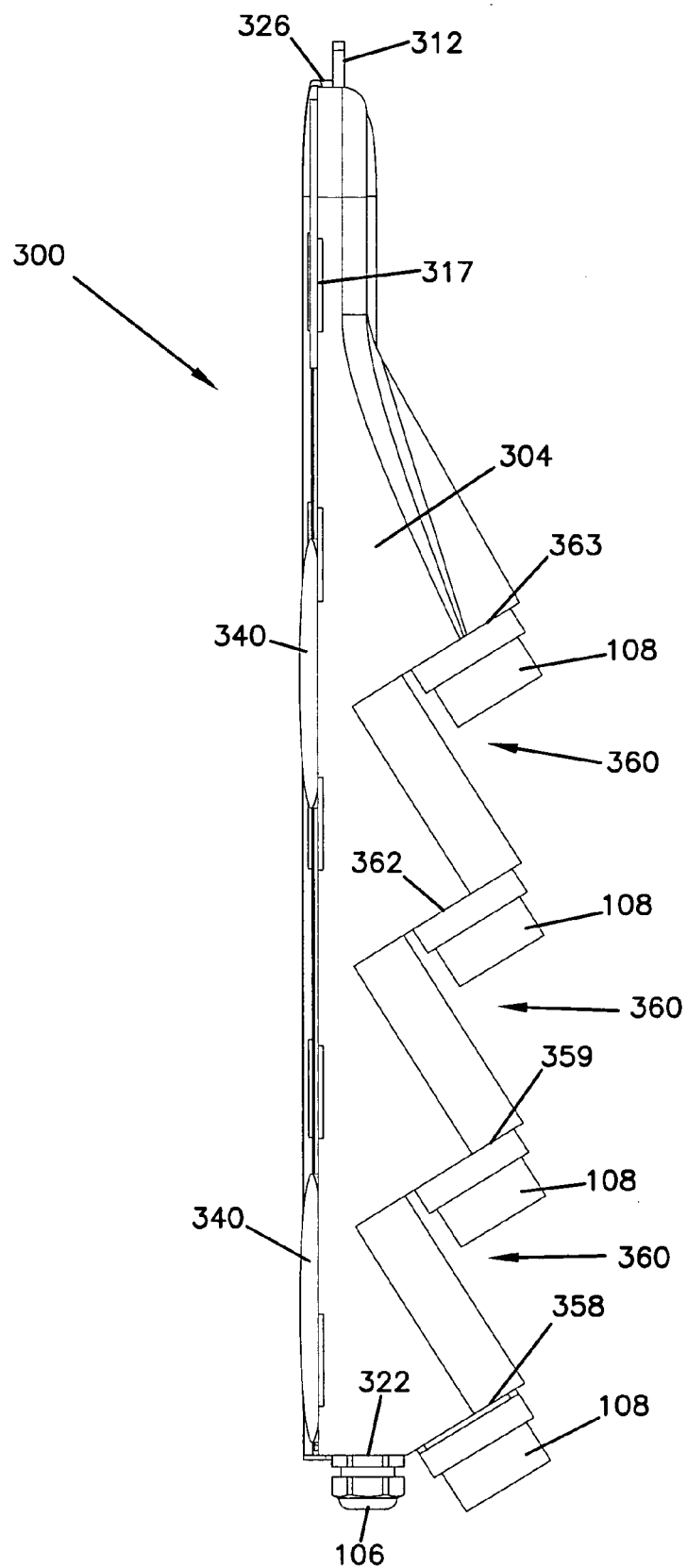
FIG. 39 is a side view of the terminal of FIG. 38.
Figure 40:
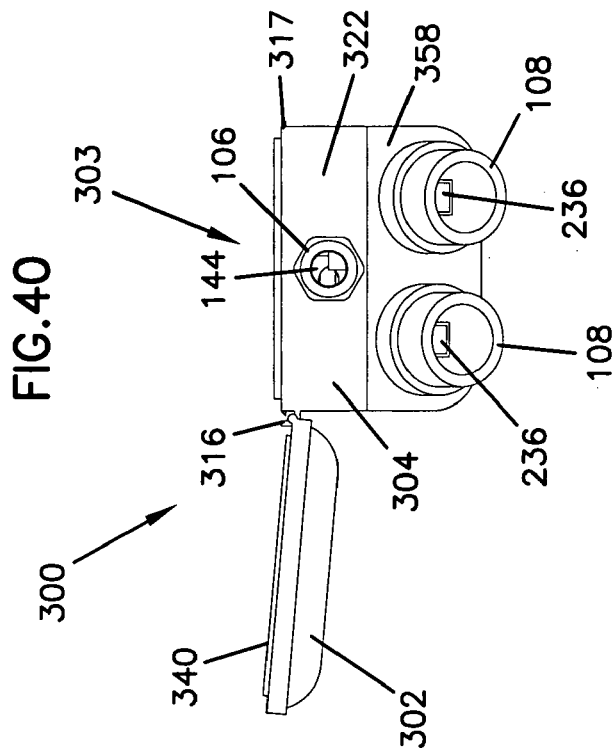
FIG. 40 is an end view of the base of the terminal of FIG. 38.
Figure 41:
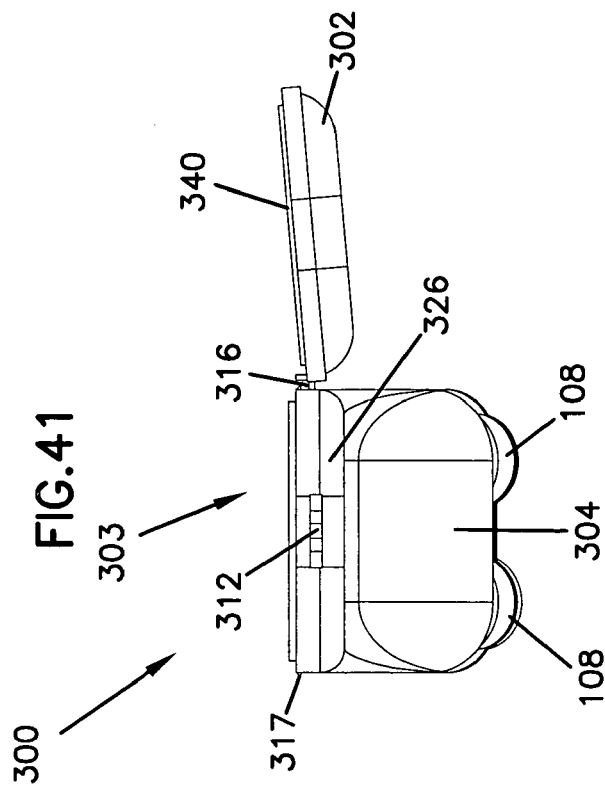
FIG. 41 is an end view of the top of the terminal of FIG. 38.

At a top end 326 of terminal 30 may be formed a tab 312 with an opening 314. Tab 312 is similar to tab 112, described above, and provides a tie-off for attaching a line to pull terminal 300 through a buried conduit from a fiber distribution terminal to a fiber access terminal mount similar to mount 270, shown above. Referring now also to FIG. 30, housing 304 includes a plurality of mounting faces 358, 359, 362 and 363, for mounting connectors 108. Between the mounting faces are narrowed waist areas 360 which serve a similar role to waist area 260, described above. Connectors 108 are angled out with respect to fitting 106 but are similarly configured to terminal 200, pointed down to receive cables 278.

Figure 42:
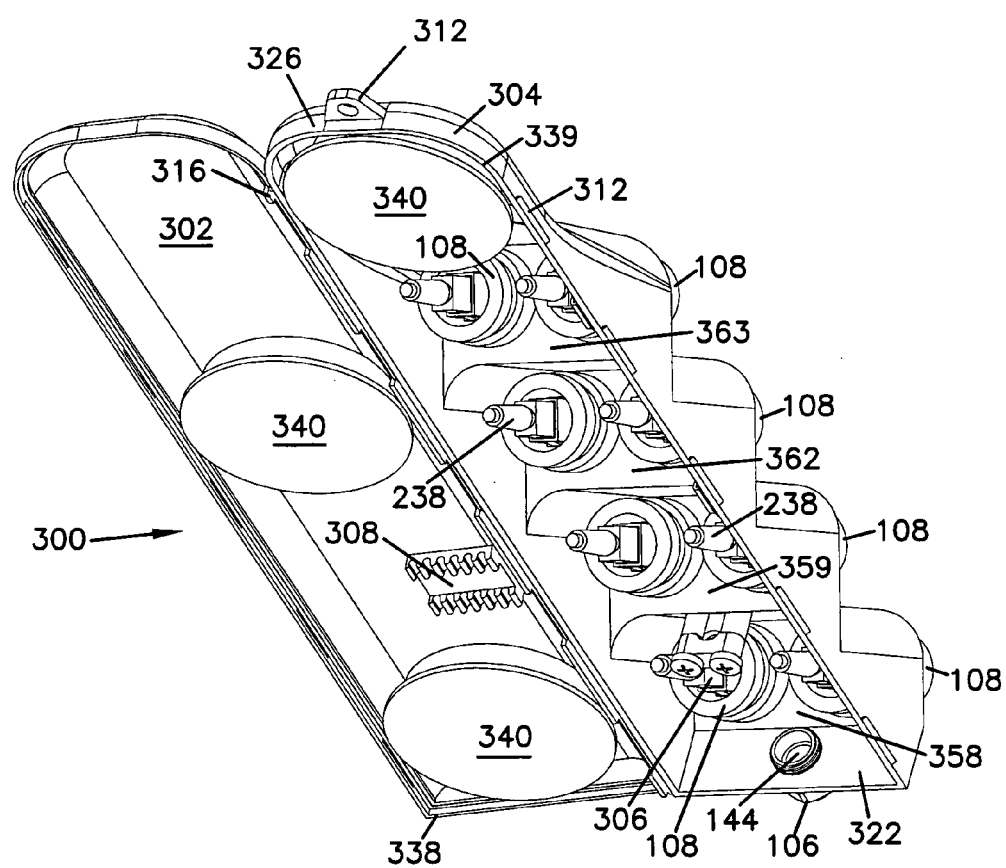
FIG. 42 is a front perspective view of the terminal of FIG. 38.
Figure 43:
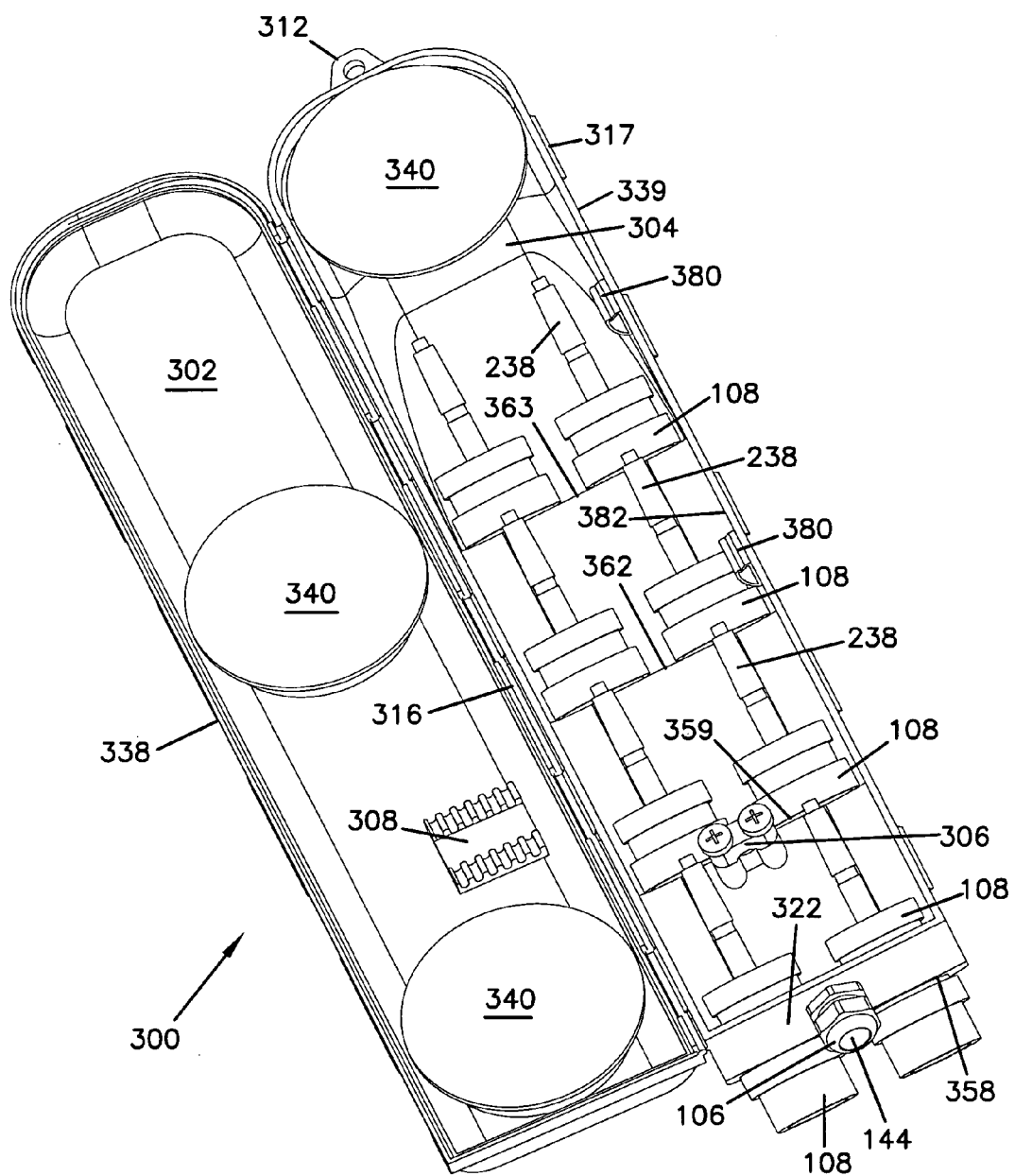
FIG. 43 is a second front perspective view of the terminal of FIG. 38.
Figure 44:
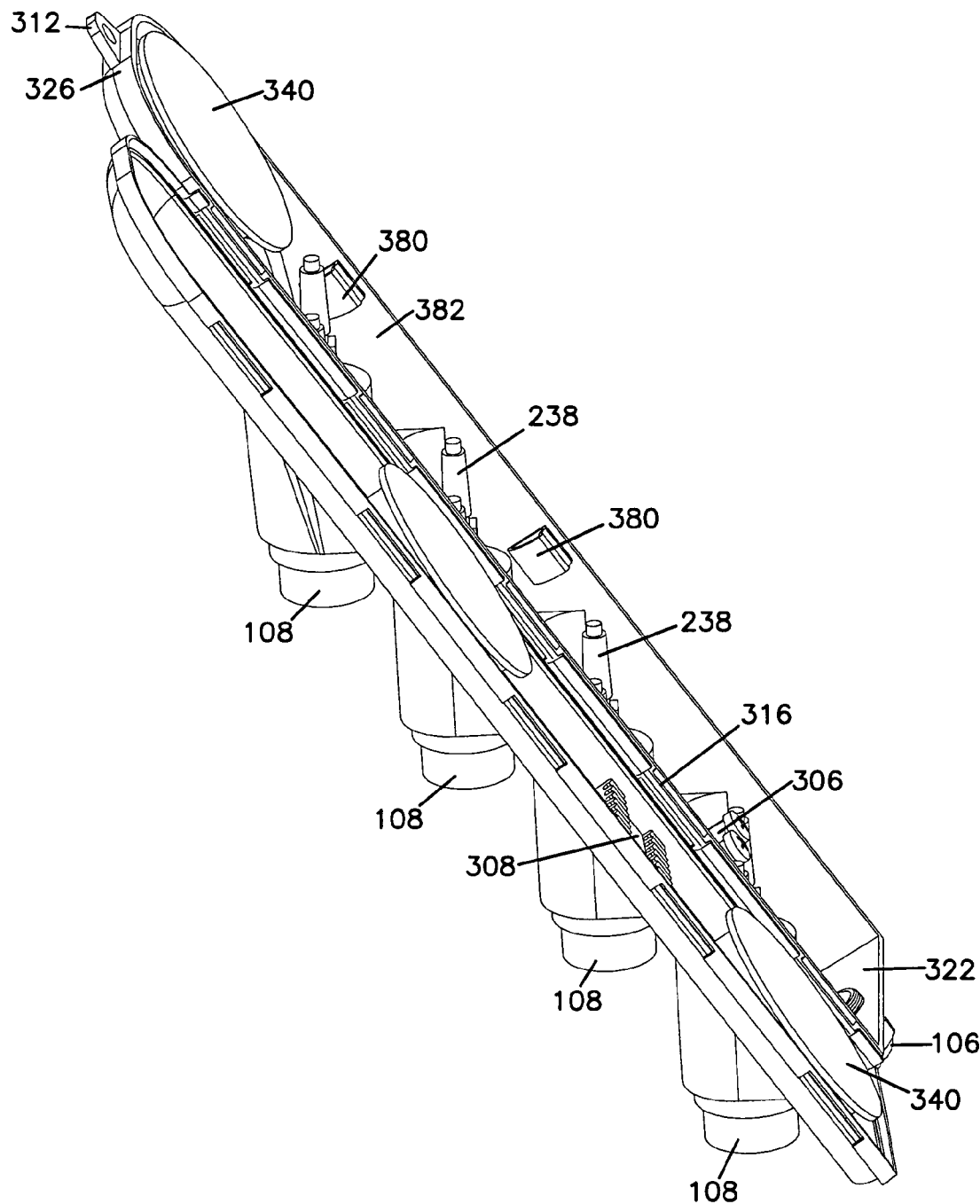
FIG. 44 is a side perspective view of the terminal of FIG. 38.
Figure 45:
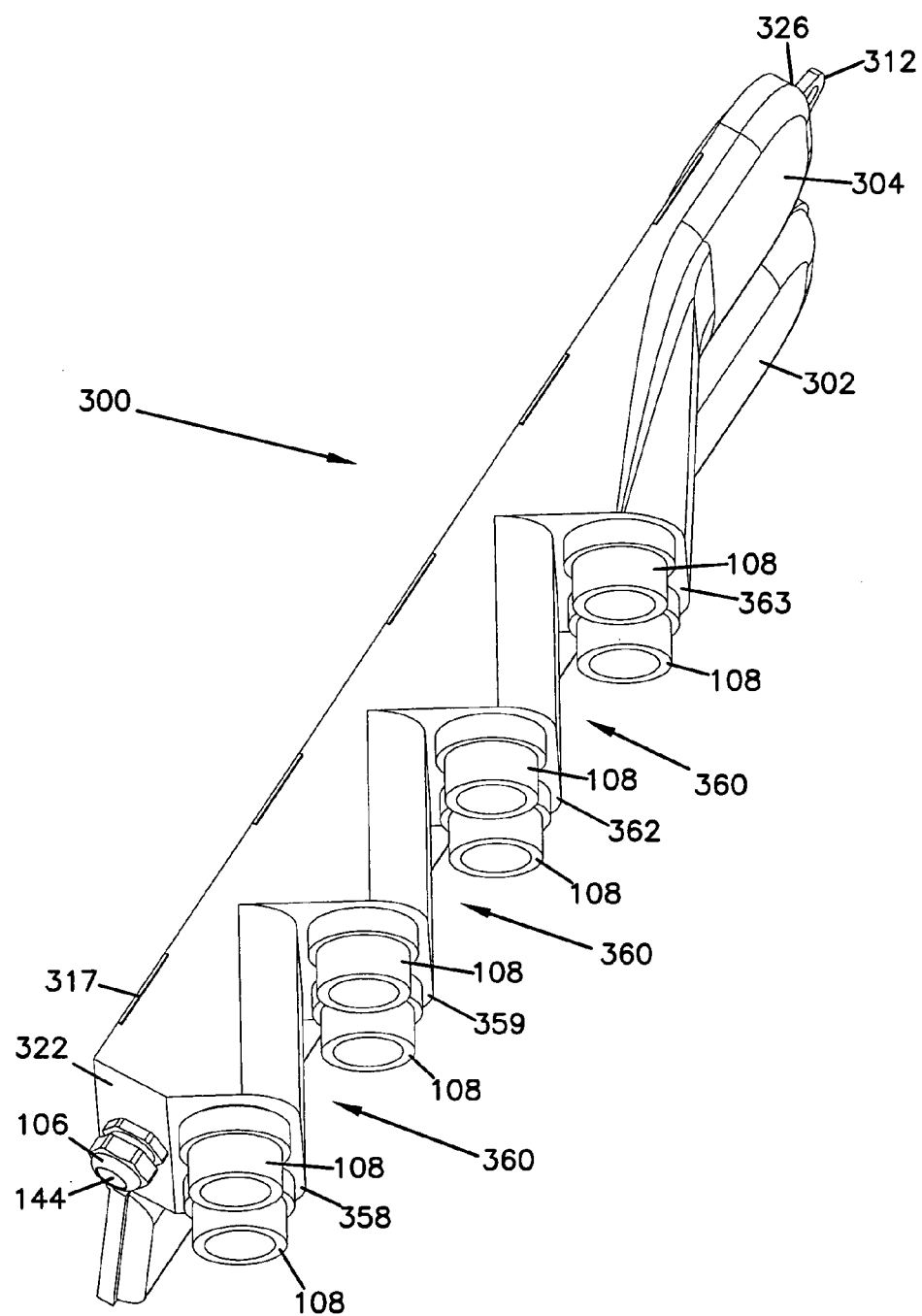
FIG. 45 is a second side perspective view of the terminal of FIG. 38.
Figure 46:
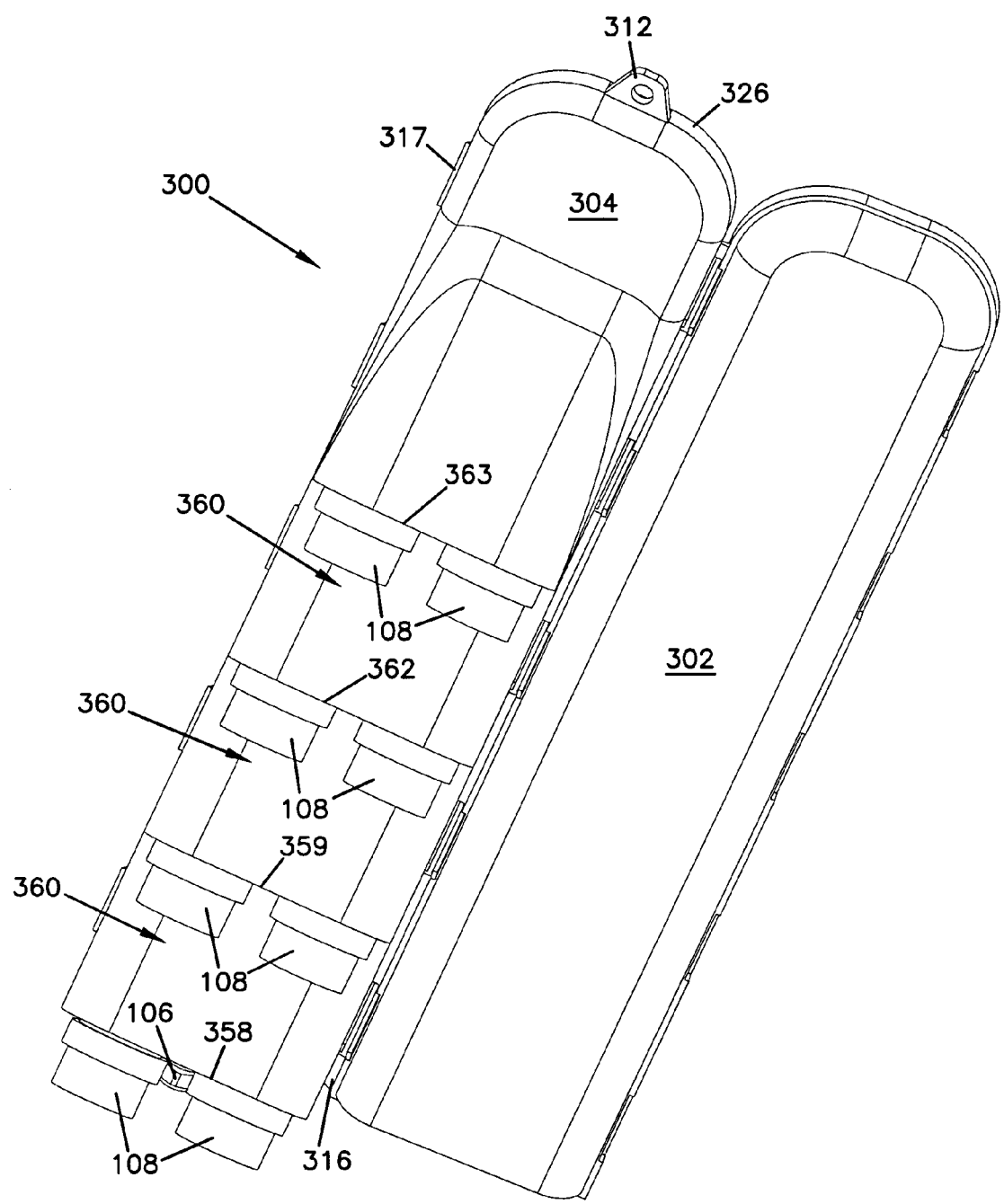
FIG. 46 is a back perspective view of the terminal of FIG. 38.

Referring now FIGS. 31 and 32, the two connectors 108 nearest base 322 occlude the remaining six connectors 108, when viewed from base end 322, while the two connectors 108 closest to top end 326 occlude the remaining connectors 108 when viewed from top end 326. Mounting surfaces 358, 359, 362 and 363 cooperate with waist areas 360 to ensure that outer ends 136 of connectors 108 may be angled out and accessible along housing 304 while not unduly increasing the size of terminal 300. FIGS. 33 to 37 provide additional views of terminal 300 with cover 302 and housing 304 closed about interior 303. FIGS. 38 to 46 provide additional views of terminal 300 with cover 302 hinged open about hinge 316. Referring to FIG. 42, cover 302 may include a recess 338 about an inner edge and housing 304 includes a upper edge 339. Recess 338 and edge 339 cooperate to create a seal between cover 302 and housing 304 when terminal 300 is closed about interior 303. A seal such as an o-ring or a gasket may be positioned within recess 338 to improve the seal. Referring to FIGS. 43 and 44, a pair of cable retainers 380 may be provided along an inner wall 382 of housing 304 to releasably hold cables 310 which might be included within distribution cable 276 but not initially connected to one of the connectors 108. Alternatively, cable retainers 380 might be used to aid in the routing of cables 310 which are connected with one of the connectors 108, as desired or required by a particular installation.

Figure 47:
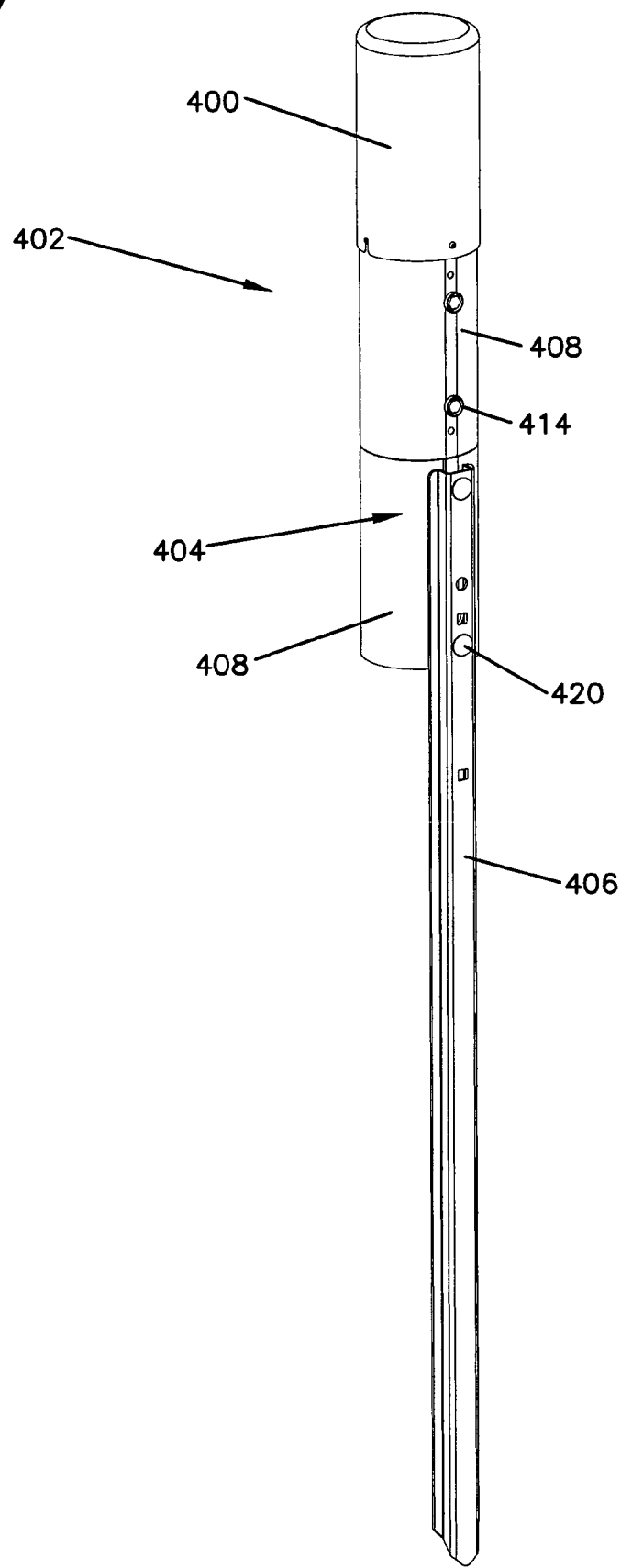
FIG. 47 is a perspective view of a fourth alternative embodiment of a fiber access terminal according to the present invention, including pedestal mounting.
Figure 50:
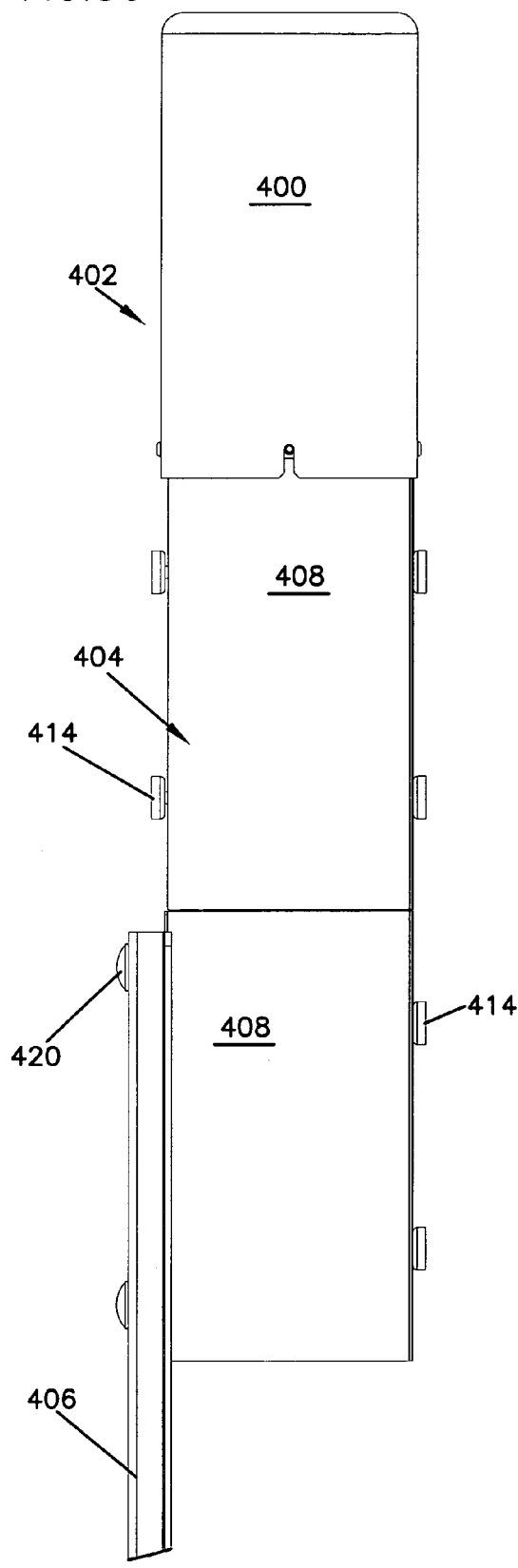
Figure 51:
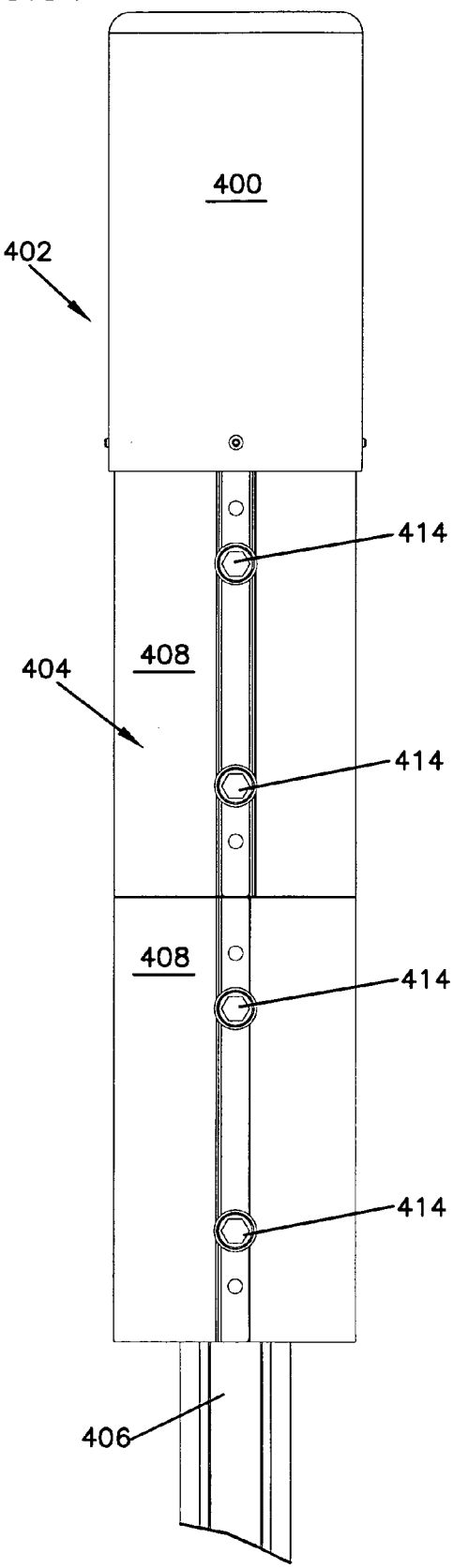
Figure 52:
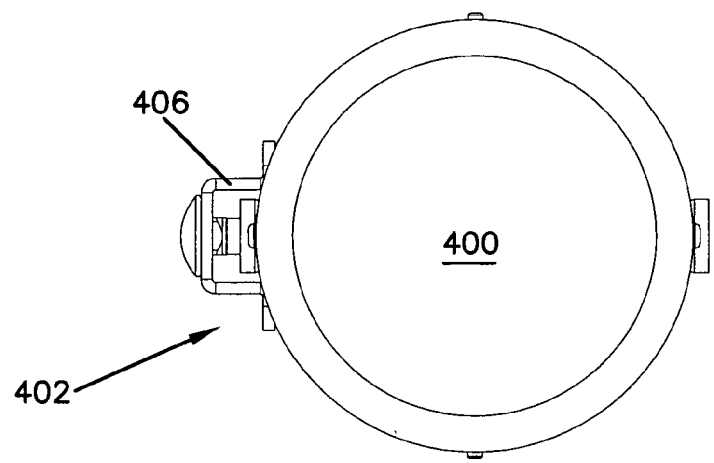
FIG. 52 is a top view of the fiber access terminal and pedestal of FIG. 47.

FIG. 47 illustrates a fourth alternative embodiment fiber access terminal and pedestal unit 402, including a fiber access terminal 400 and a pedestal assembly 404. Terminal and pedestal unit 402 also includes a stake 406 and a pair of lower access door pairs 408. Stake 406 allows unit 402 to be used as a pedestal for mounting fiber access terminal 400 adjacent to the customer locations without the need for a separate pedestal assembly. Terminals 100, 200 and 300, shown above, are configured to be mounted within a separate pedestal structure, as shown in FIG. 25, although they may also be configured similar to unit 402 to provide a common fiber access terminal and pedestal mounting unit. Lower access door pairs 408 allow terminal 400 to be mounted above ground level for environmental protection, and still protect the fiber distribution and customer drop cables that may be connected to terminal 400.

FIGS. 48 to 54 show additional views of terminal and pedestal unit 402. Access door pairs 408 are held to a pair of internal support channels 410 and 412 by fasteners 414 which include security features to deter unauthorized access to unit 402 and terminal 400. As shown, the security feature is a can washer 416 positioned about each threaded fastener 414 which prevents use of standard wrenches or sockets to remove the fasteners. Each access door pair may preferably include a pair of identical doors 418, although non-identical doors may also be used. An upper portion of stake 406 extends above the ground when stake 406 is positioned in the field. A pair of fasteners 420 extend through upper portion 422 to mount internal support channel 412 to stake 406.

In use, terminal 400 might be preconfigured to terminate a fiber distribution cable, as described above with regard to terminals 100, 200 and 300. The distribution cable would be extended from a fiber distribution terminal or pedestal to a position adjacent one or more current or future customer locations. Typically the distribution cable would be trenched and buried but other arrangements may also be used. At the desired position, stake 406 may be driven into the ground to a depth required to protect against frost heave or environmentally caused movement, accidental movement or deliberate vandalism. The lowest mounted access door pair 408 would preferably be in contact or have its lower edge recessed beneath ground level.

To connect a customer to terminal 400, a pre-terminated and connectorized customer drop cable would be extended to a customer premises and trenched to a point adjacent unit 402. One or both of the access door pairs may be removed to provide access to terminal 400. From the trench, the drop cable would be extended to the base of terminal 400 and the connector of the cable mated with one of the connectors in the base of terminal 400. This will optically connect the customer drop cable with one of a plurality of fiber strands of the fiber distribution cable, providing fiber optic connectivity to the customer. The access door pairs would then be reinstalled to unit 402 about the fiber distribution cable and any customer drop cables to protect the cables and the connectors in the base of terminal 400.

Figure 53:
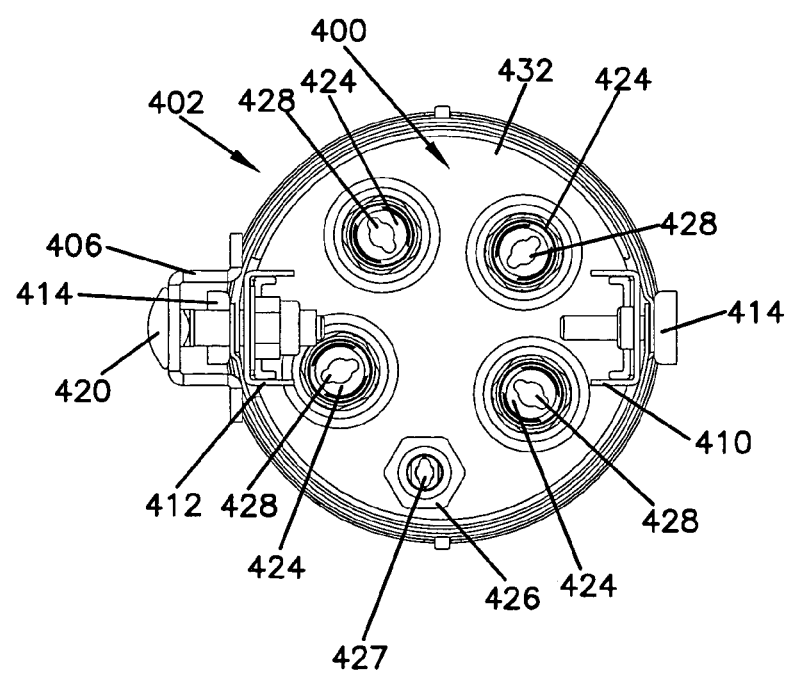
FIG. 53 is a bottom view of the fiber access terminal and pedestal of FIG. 47.
Figure 54:
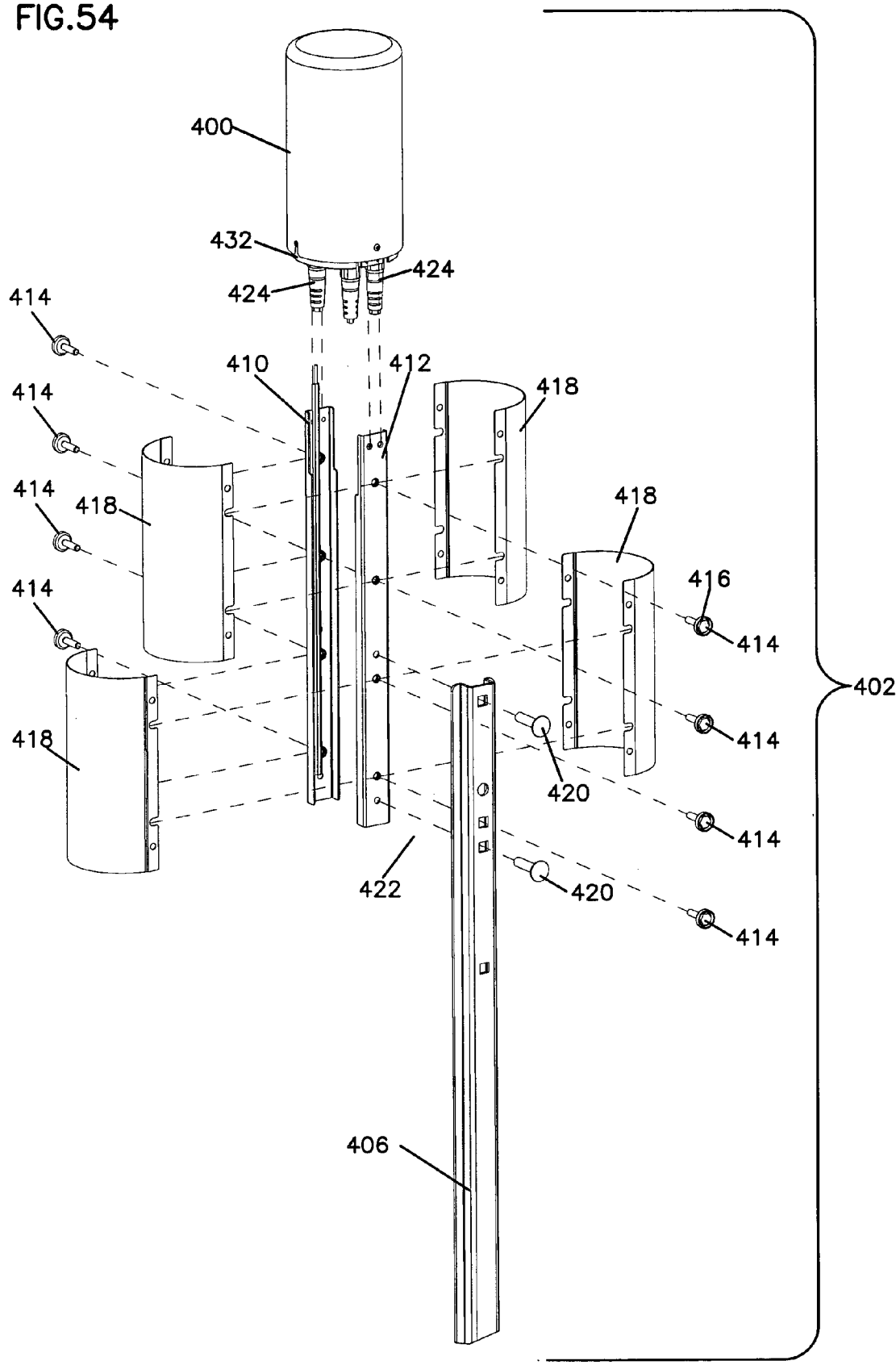
FIG. 54 is an exploded perspective view of the fiber access terminal and pedestal of FIG. 47.
Figure 55:
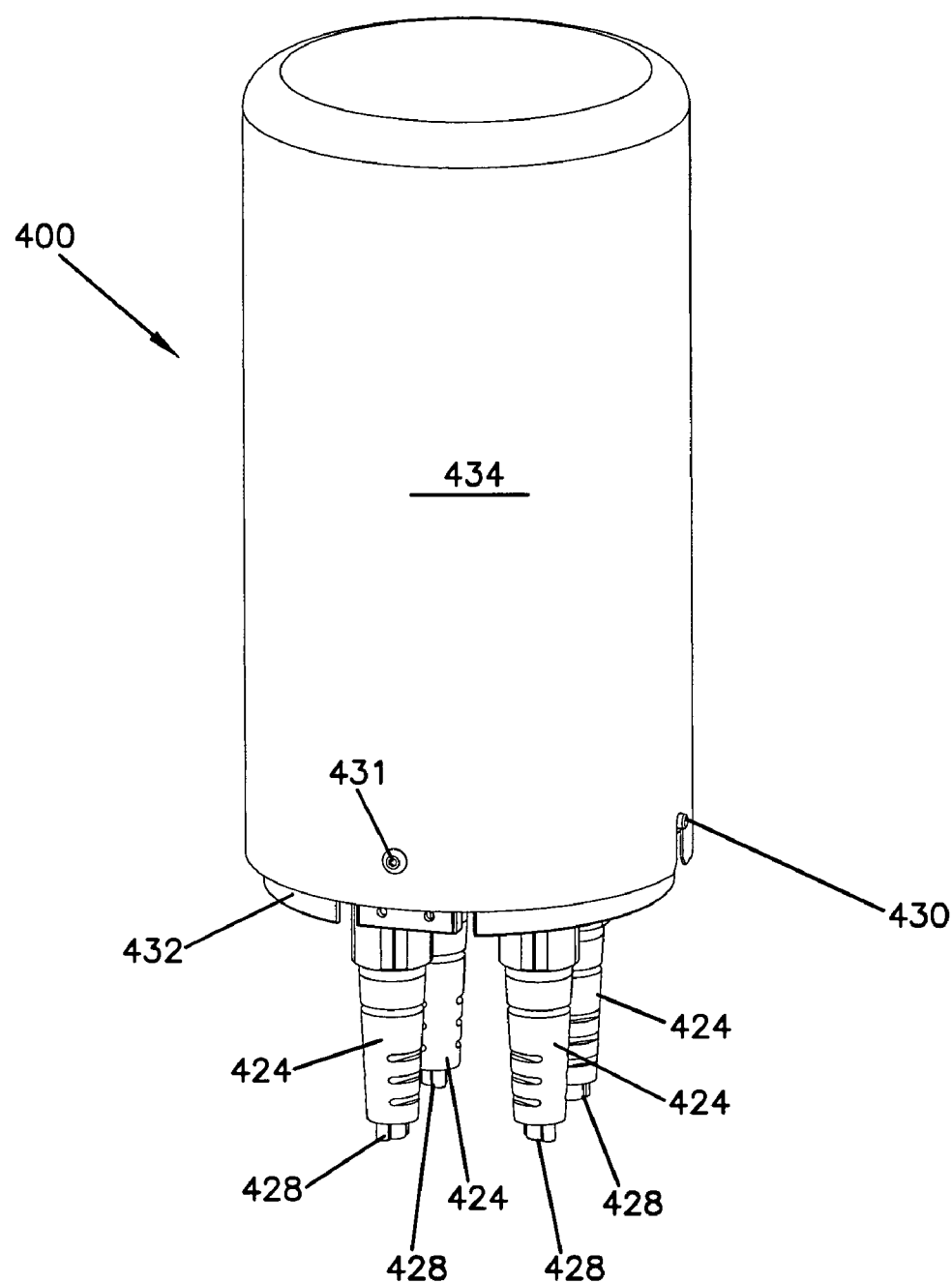
FIG. 55 is a perspective view of the fiber access terminal of FIG. 47, removed from the pedestal.
Figure 56:
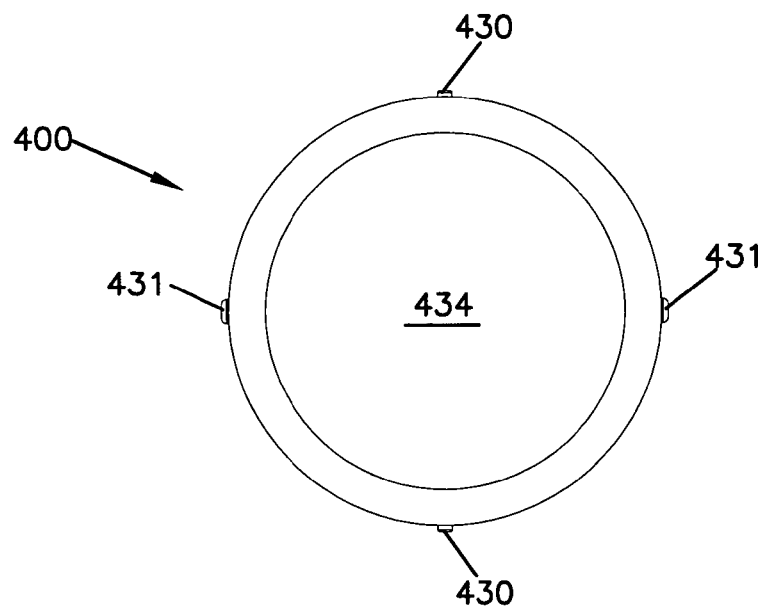
FIG. 56 is a top view of the fiber access terminal of FIG. 55.
Figure 57:
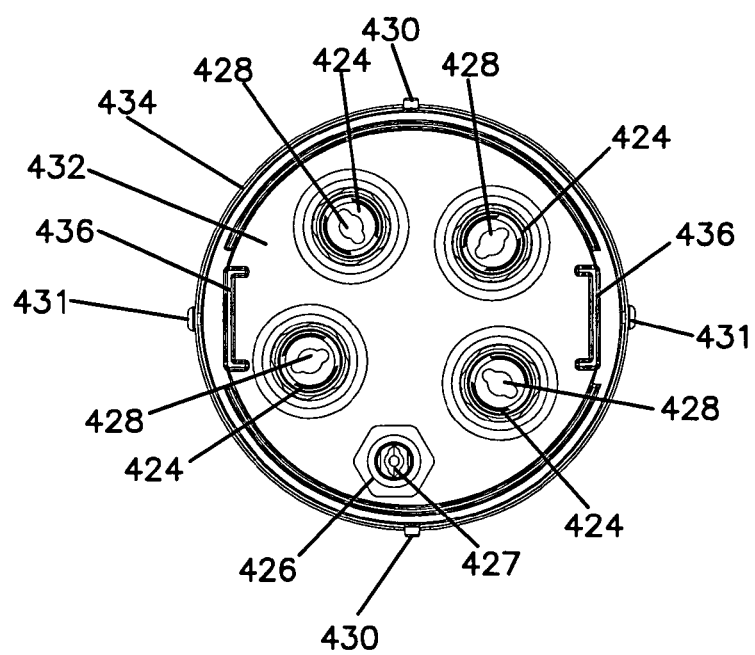
FIG. 57 is a bottom view of the fiber access terminal of FIG. 55.

Referring now to FIG. 53, on a base 432 of terminal 400 are a plurality of fiber optic cable connectors 424 which terminate fiber optic drop cables 428, and a distribution cable entry fixture 426 through which a distribution cable 427 extends. Connectors 424 and drop cables 428 are part of customer drop cables to permit connection of customer premises equipment to optical fiber within distribution cable 427. Connectors 424 are shown as Corning Optitap connectors. It is anticipated that other types and styles of drop cable connectors may be used which provide some degree of environmental sealing.

FIGS. 55 to 62 show terminal 400 including a cover 434 mounted to base 432 and held in place by fasteners 431 extending through openings 452 (see FIG. 62) in cover 434 and received within openings 458 in base 432. Alignment pins 430 are also included in base 432 and are received within slots 450 in cover 434. A pair of brackets 436 extend from base 432 to be attached to an upper end of channels 410 and 412. The connection of channels 410 and 412 to base 432 ties pedestal assembly 404 to terminal 400 to form unit 402.

Figure 62:
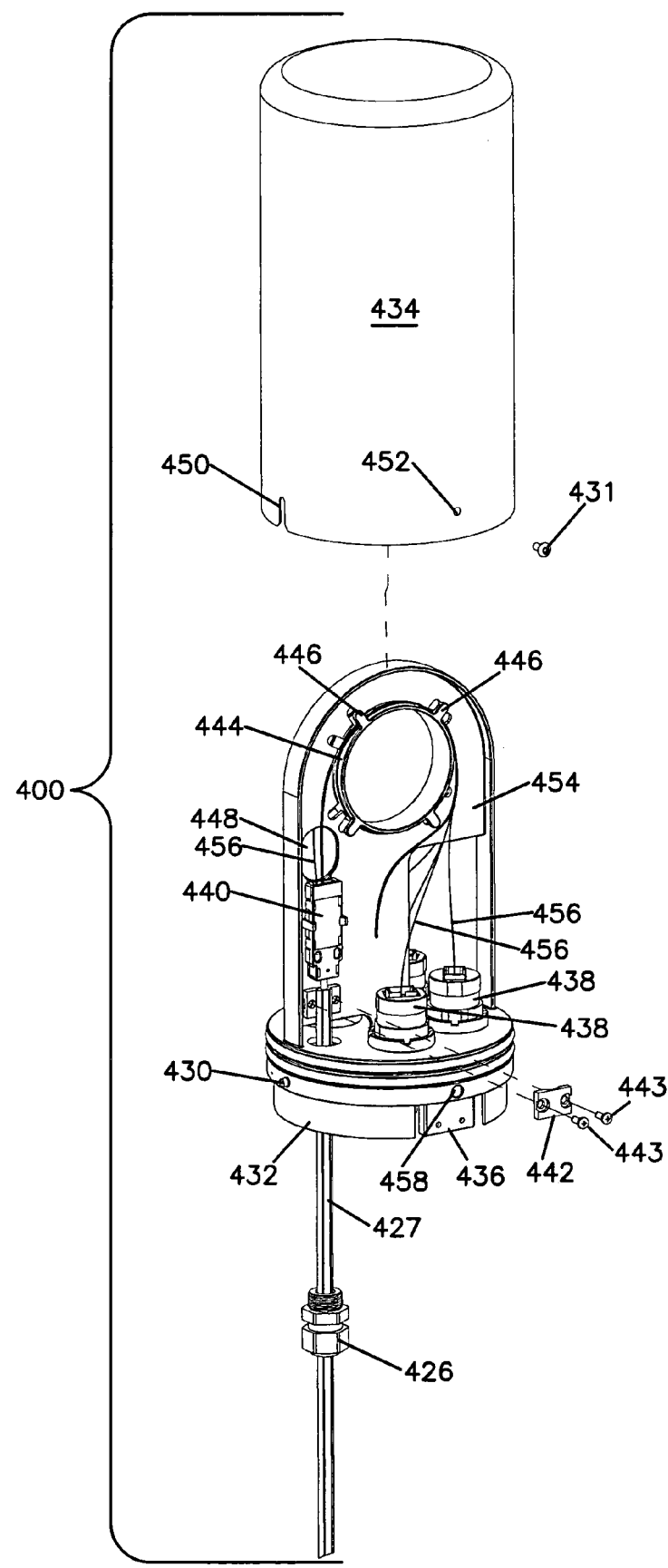
FIG. 62 is an exploded perspective view of the fiber access terminal of FIG. 55, with a multi-fiber communications cable entering the bottom of the fiber access terminal and individual optical fibers directed to each of the optical fiber drop connectors.

Referring now to FIG. 62, mounted atop base 432 and extending within cover 434 is an inner structure 454 including a cable slack storage spool 444 extending from both sides of structure 454. A cable fanout 440 is mounted to inner structure 454 adjacent cable entry fixture 426. Distribution cable 427 includes a plurality of optical fibers. Once distribution cable 427 has passed through cable entry fixture 426, a cable clamp 442 is provided to tie off cable 427 and any linear strength members included in cable 427 to inner structure 454. Within distribution cable 427 are a plurality of individual optical fiber cables 456 which are separated out from distribution cable 427 within fanout 440. Each spool 444 is sized to provide bend radius protection to optical fiber cables 456 extending to each of a plurality of inner connector fittings 438. Connectors 424 of drop cables 428 attach to an outer end of inner connector fittings 438 to optical connect to optical fiber cables 456 fanned out from distribution cable 427. A plurality of cable guides 446 are positioned about each spool to help retain cables 456 about spools 444.

A pass-through opening 448 is positioned in inner structure 454 above fanout 440 to permit optical fiber cables 456 to be directed to either spool 444 on either side of inner structure 454. This permits cables 456 to be directed to the side of inner structure 454 most appropriate based on the particular inner connector fitting 438 to which the cable 456 will attach. Cable entry fitting 426 is a compression fitting configured to fit closely about cable 426 and seal against entry water or other contaminants through base 432 when cover 434 is in place.

Figure 63:
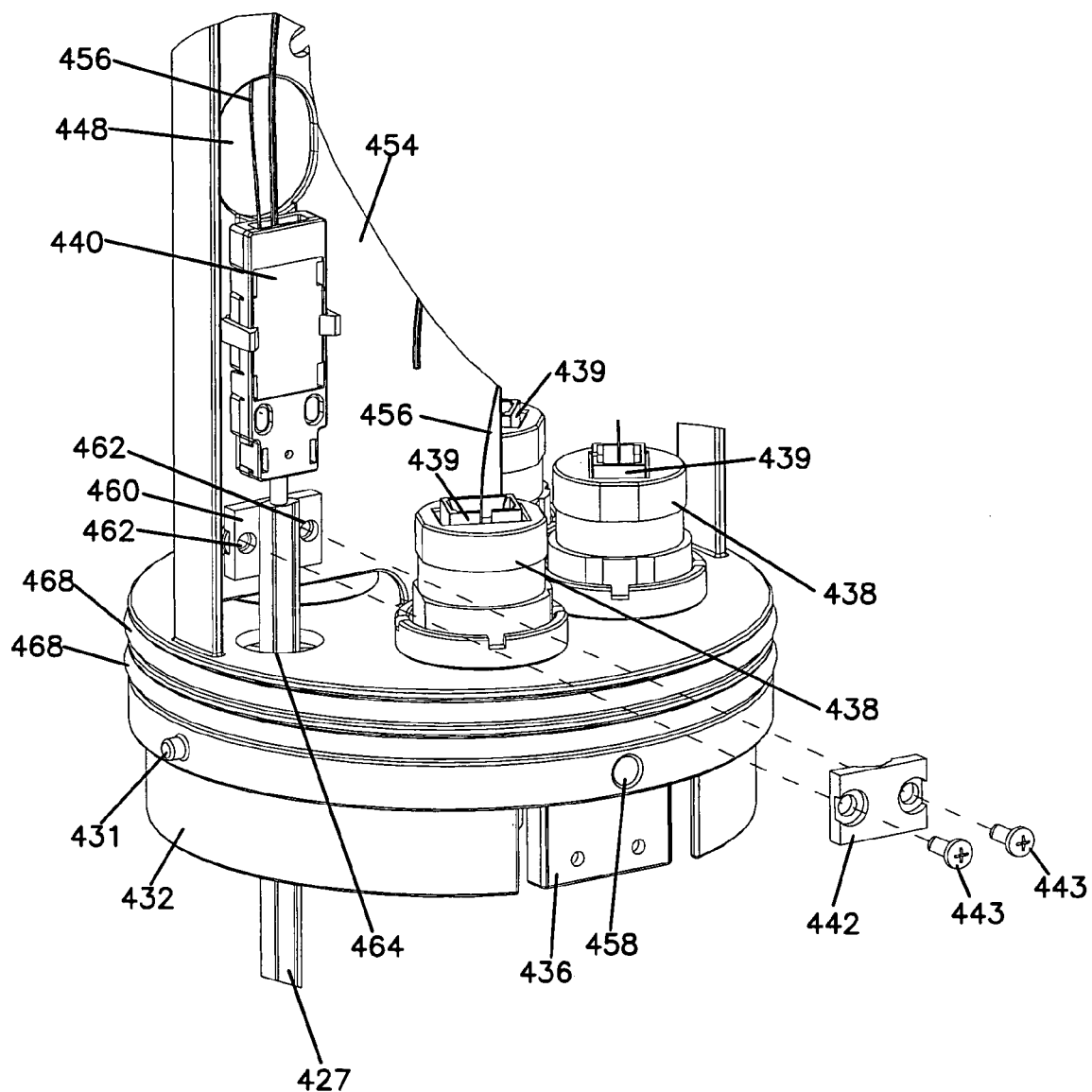
FIG. 63 is a closer view of the multi-fiber communications cable entering the bottom of the fiber access terminal of FIG. 62.
Figure 68:
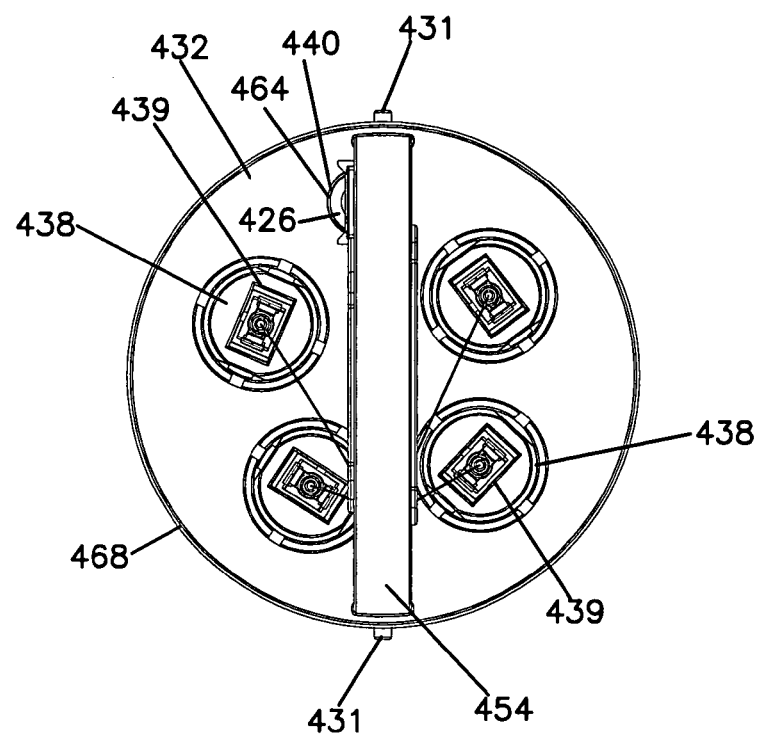
FIG. 68 is a top view of the fiber access terminal of FIG. 62 with the cover removed.
Figure 69:
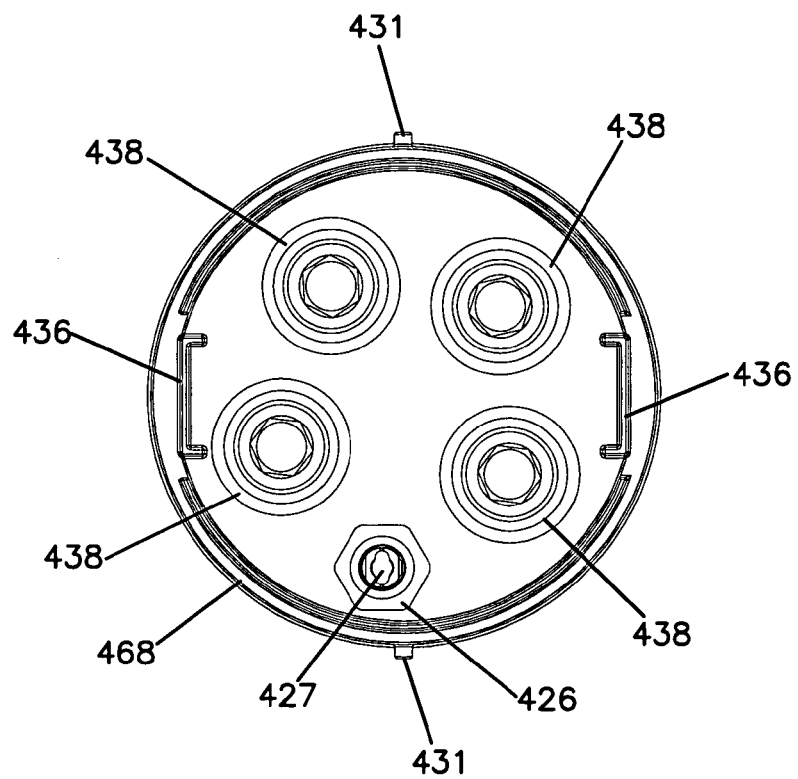
FIG. 69 is a bottom view of the fiber access terminal of FIG. 62 with the cover removed.
Figure 71:
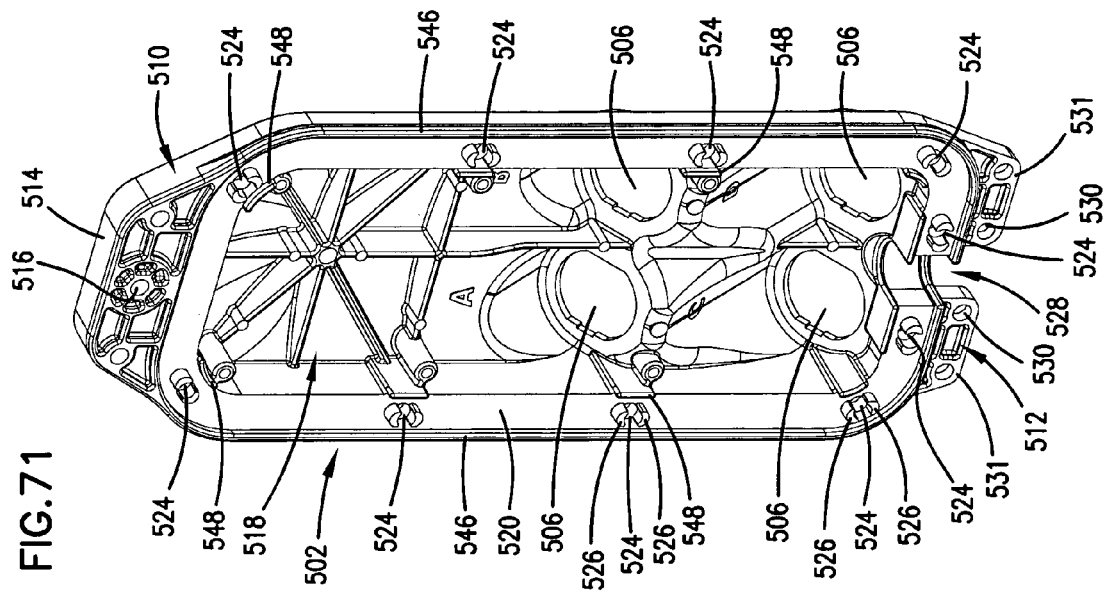
FIG. 71 is a second perspective view of the fiber access terminal housing of FIG. 70.
Figure 70:
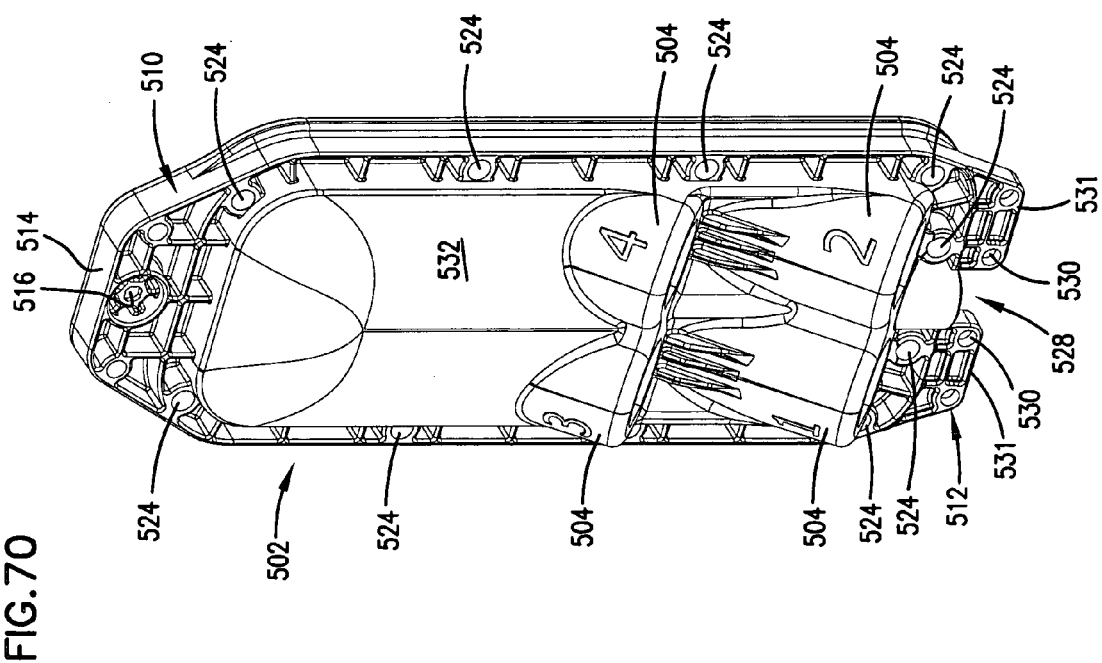
FIG. 70 is a first perspective view of a fiber access terminal housing of a fifth alternative embodiment of a fiber access terminal according to the present invention.
Figure 72:
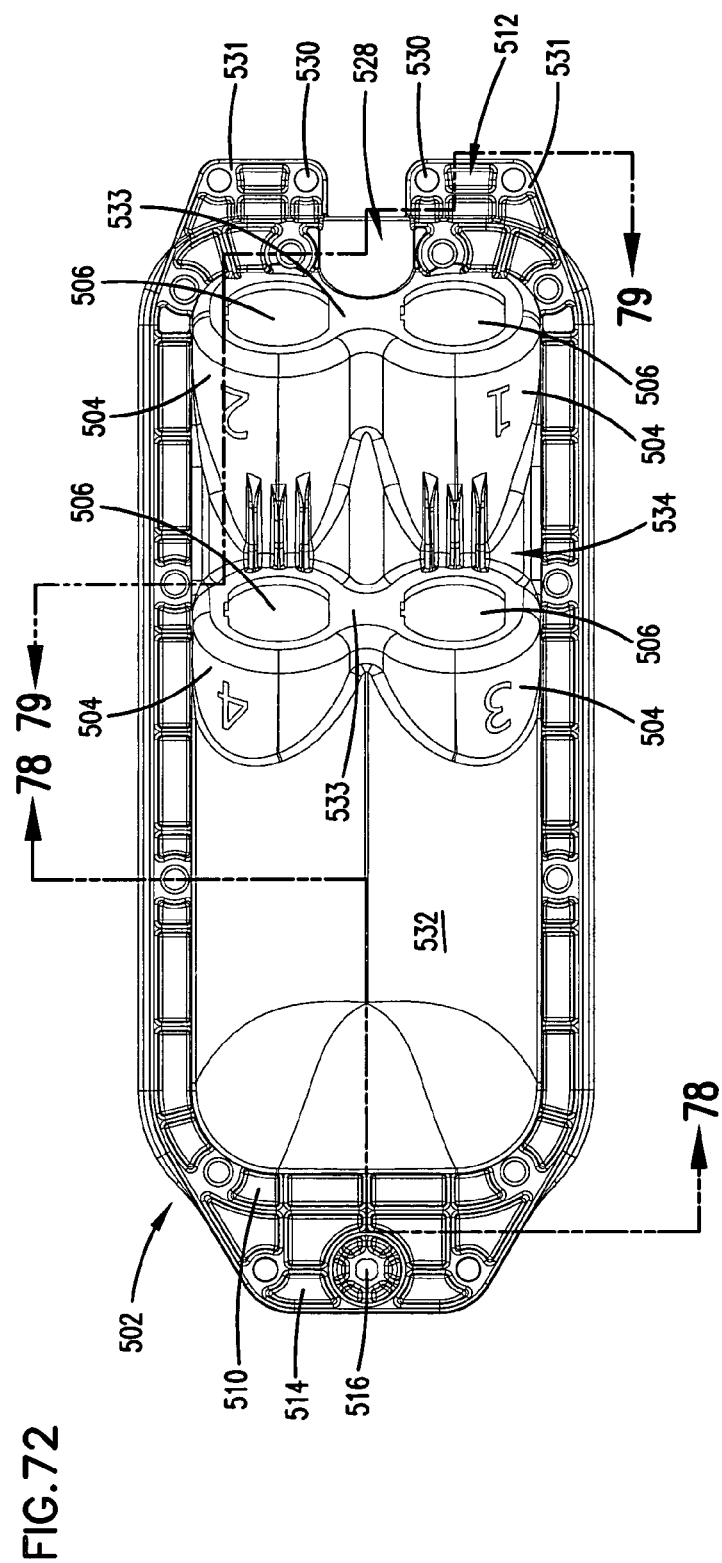
FIG. 72 is a view of an exterior back of the fiber access terminal housing of FIG. 70.
Figure 73:
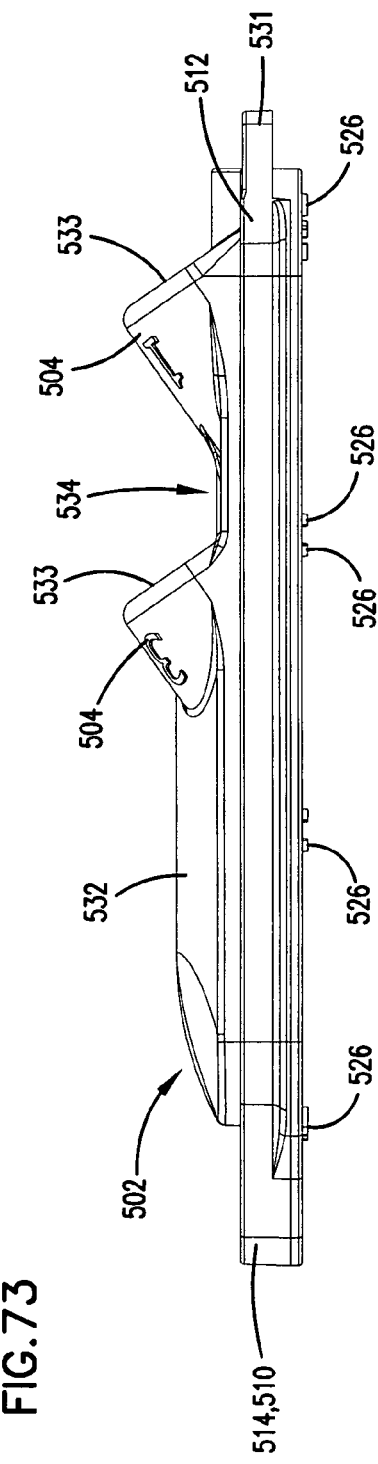
FIG. 73 is a side view of the fiber access terminal housing of FIG. 70.

Referring now to FIG. 63, a pair of O-rings 468 are positioned about base 432 to engage a lower edge of cover 434 and provide an environmental seal about the junction between base 432 and cover 434. Cable clamp 442 mates with a cable clamp fitting on inner structure 454 about distribution cable 427 below fanout 440. Screws 443 extend through cable clamp 442 and are received within openings 462 in clamp fitting 460. Within each inner connector fitting 438 is a fiber optic adapter 439. While not shown in FIG. 63, each of the fiber optic cables 456 would preferably be terminated by a fiber optic connector. The fiber optic connectors terminating each of the cables 456 would be received within the inner end of adapter 439 and positioned to be optically connected with a customer drop cable 428 of a connector 424 when connector 424 is connected to inner connector fitting 438. Cable entry opening 464 through base 432 for cable 427 is sized to receive and be closed off by cable entry fitting 426.

FIGS. 64 to 69 illustrate additional views of terminal 400 with cover 434 removed. An open portion of inner structure 454 is provided above base 432 opposite the location of fanout 440 to permit passage of cables 456 from spools 444 on either side of inner structure 454 to any of the adapters 439 on terminal 400.

It is anticipated that terminals 100, 200, 300 and 400 could be configured with fewer connectors 108 similarly positioned within respect to the respective top ends and bases of the terminals. Terminal 300 could be configured with fewer mounting surfaces if six or fewer connectors 108 are desired. Alternatively, any of the terminals could be configured with openings or mounting surfaces for the number of connectors shown in the FIGS., above, but without the full number of connectors 108 mounted, so that additional connectors 108 could be added in the field as needed for a particular installation. Terminal 100 could be configured with connectors 108 angled outward with respect to fitting 106. If fiber distribution cable 276 has the same number of fibers as there are connectors 108 in any of the terminals 100, 200 or 300, a splice holder such as splice holder 308 may not be included in that terminal. However, it is also anticipated that a splice holder can be included within any of the terminals 100, 200 or 300. Tie-off or strain relief 306 of terminal 300 could be included in either of terminals 100 or 200.

Referring now to FIGS. 70 to 102, components of a fifth embodiment 500 of a fiber access terminal according to the present invention are shown, including a housing 502 and a mating cover 505. Cover 505 and housing 502 may be assembled to form an enclosure of terminal 500 which is similar to terminal 300, with certain differences as may be described below. It is anticipated that certain features of terminal 300 may be incorporated into terminal 500 and vice versa.

Figure 89:
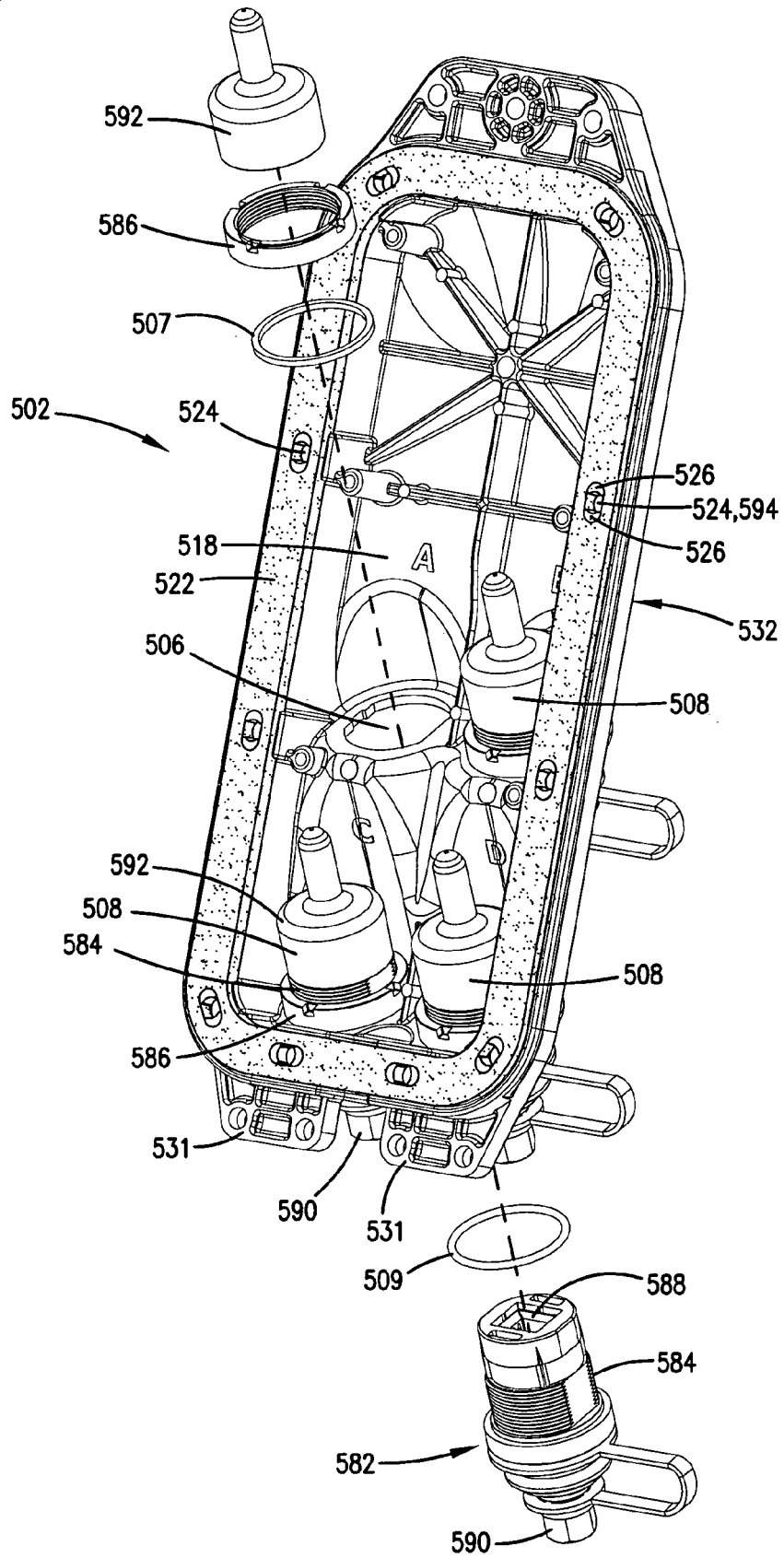
FIG. 89 is a perspective view of the interior front of the fiber access terminal housing of FIG. 70, with three ruggedized fiber connectors mounted within mounting openings of the housing and a fourth fiber connector exploded from another mounting opening.
Figure 90:
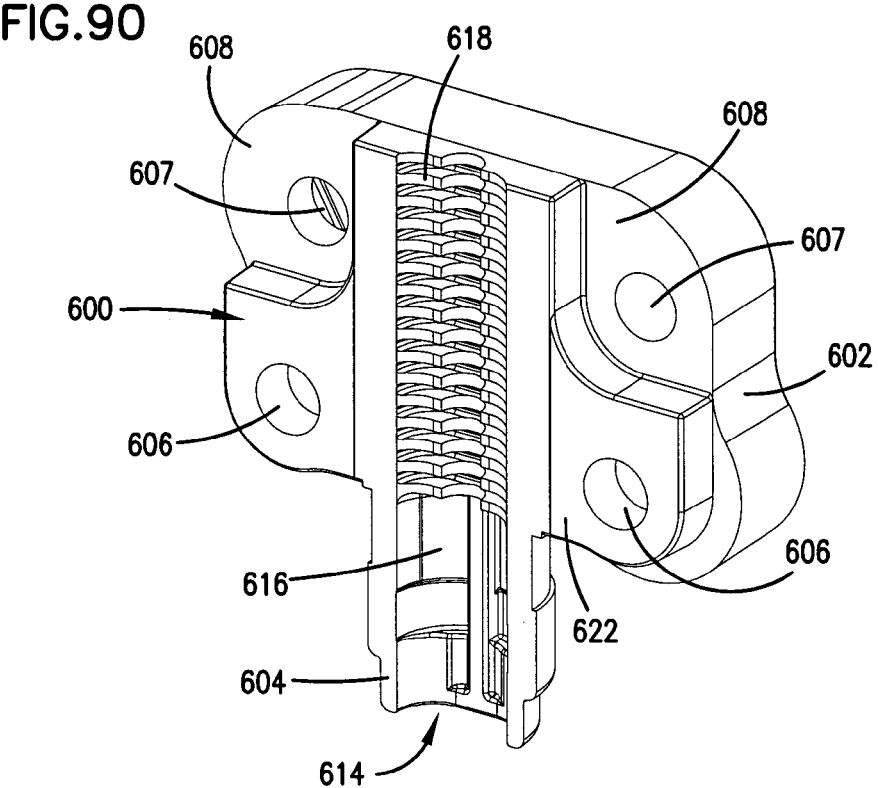
FIG. 90 is a first perspective view of a cable clamp halve for use with the fiber access housing of FIG. 70 and the cover of FIG. 80.
Figure 91:
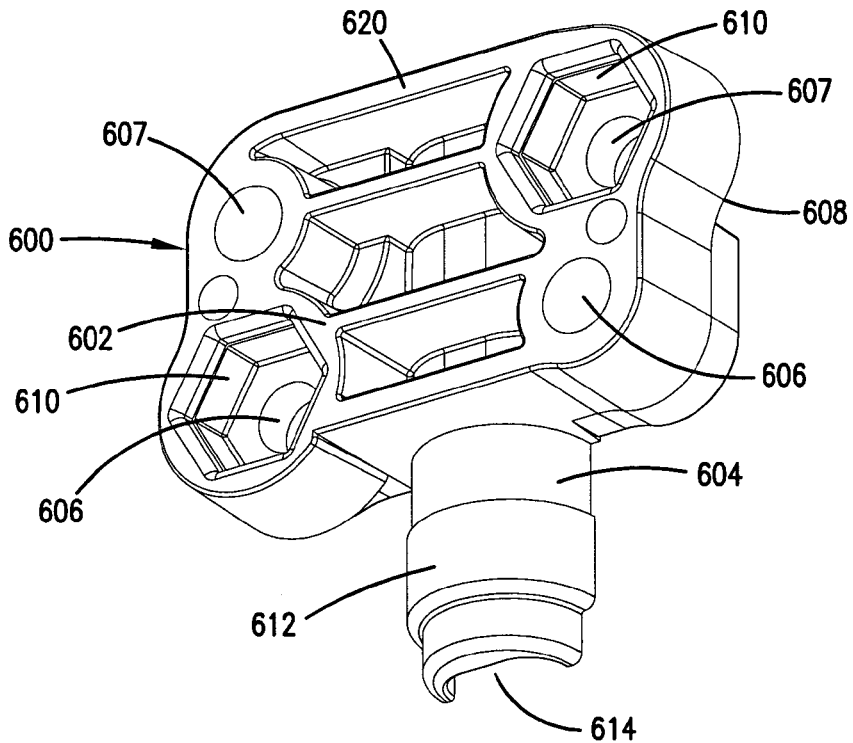
FIG. 91 is a second perspective view of the cable clamp of FIG. 90.
Figure 94:
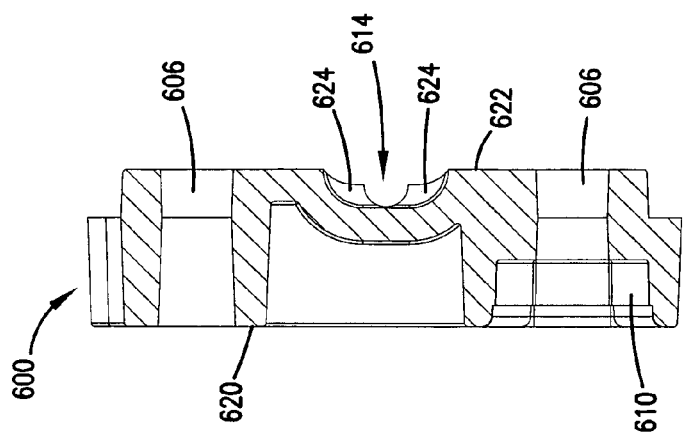
FIG. 94 is an end cross-sectional view of the cable clamp of FIG. 90, taken along line 94-94 of FIG. 92.
Figure 92:
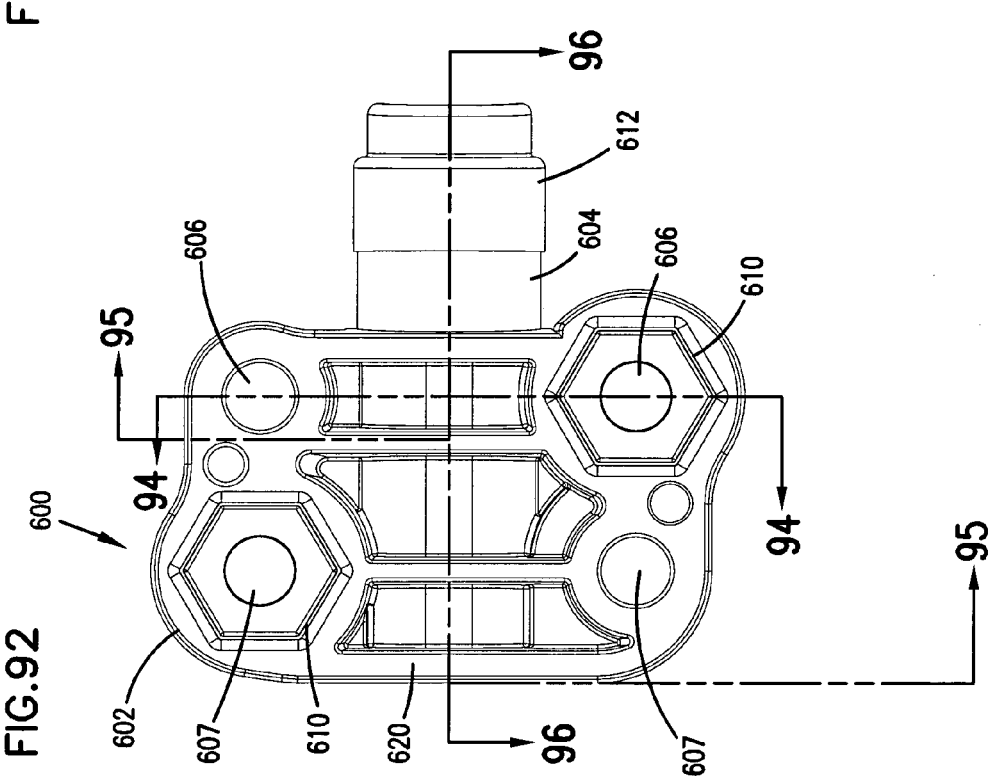
FIG. 92 is a side view of an outer side of the cable clamp of FIG. 90.
Figure 95:
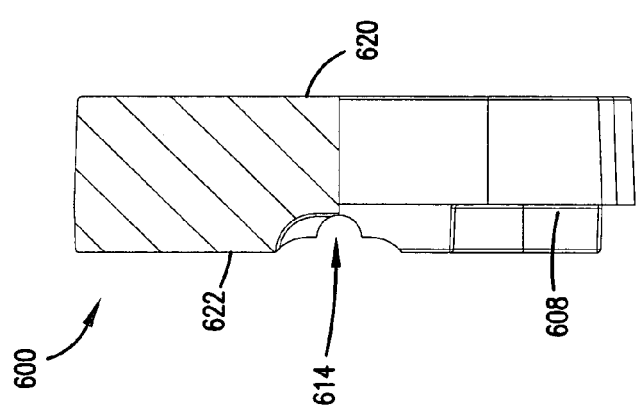
FIG. 95 is an end partial cross-sectional view of the cable clamp of FIG. 90, taken along line 95-95 of FIG. 92.
Figure 99:
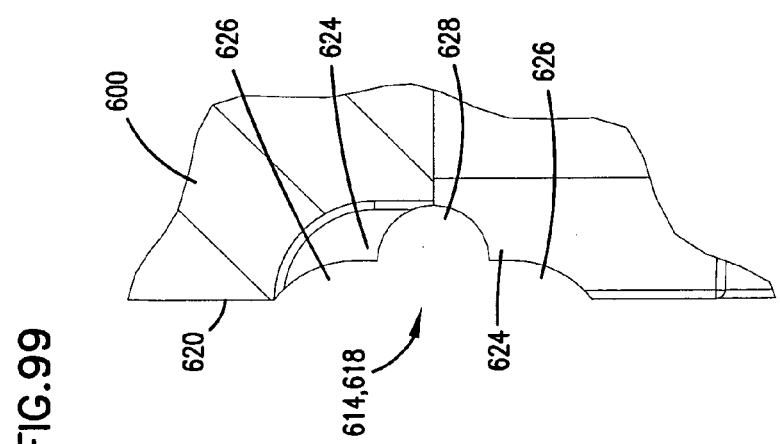
FIG. 99 is a closer view of a cable routing channel of the cable clamp of FIG. 95.
Figure 97:
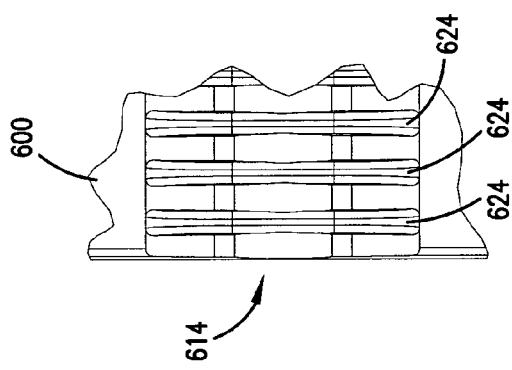
FIG. 97 is a closer view of an outer sheath clamping area of the cable clamp of FIG. 93.
Figure 98:
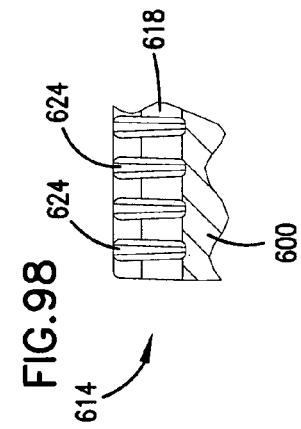
FIG. 98 is a closer view of the outer sheath clamping area of the cable clamp of FIG. 96.
Figure 93:
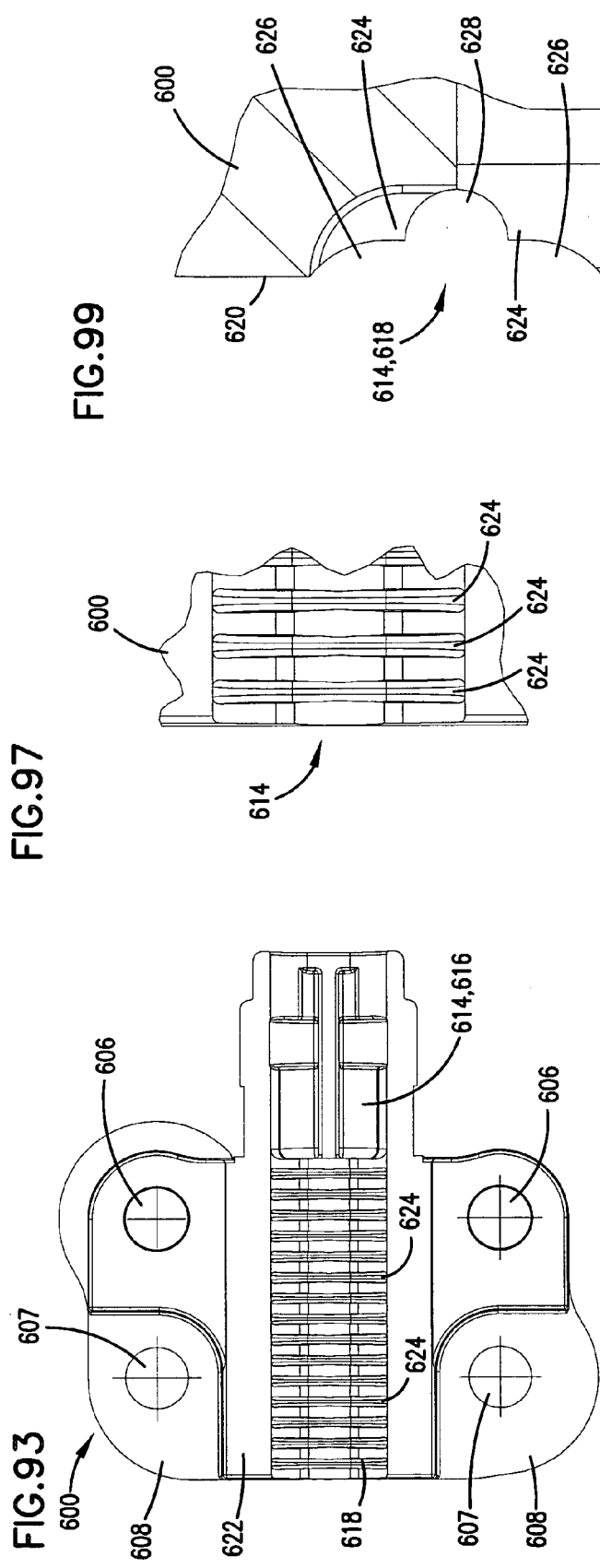
FIG. 93 is a side view of an inner side of the cable clamp of FIG. 90.
Figure 96:
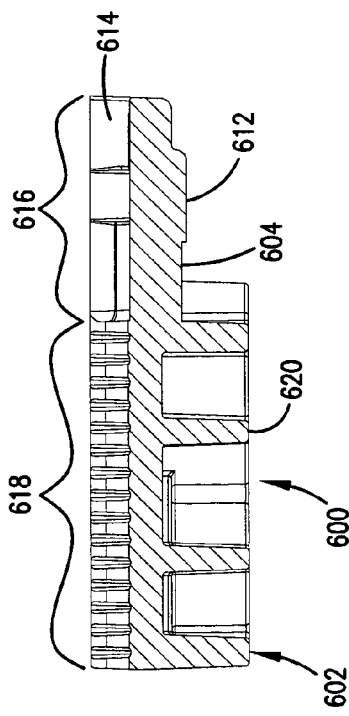
FIG. 96 is a cross-sectional view of the cable clamp of FIG. 90, taken along line 96-96 of FIG. 92.
Figure 105:
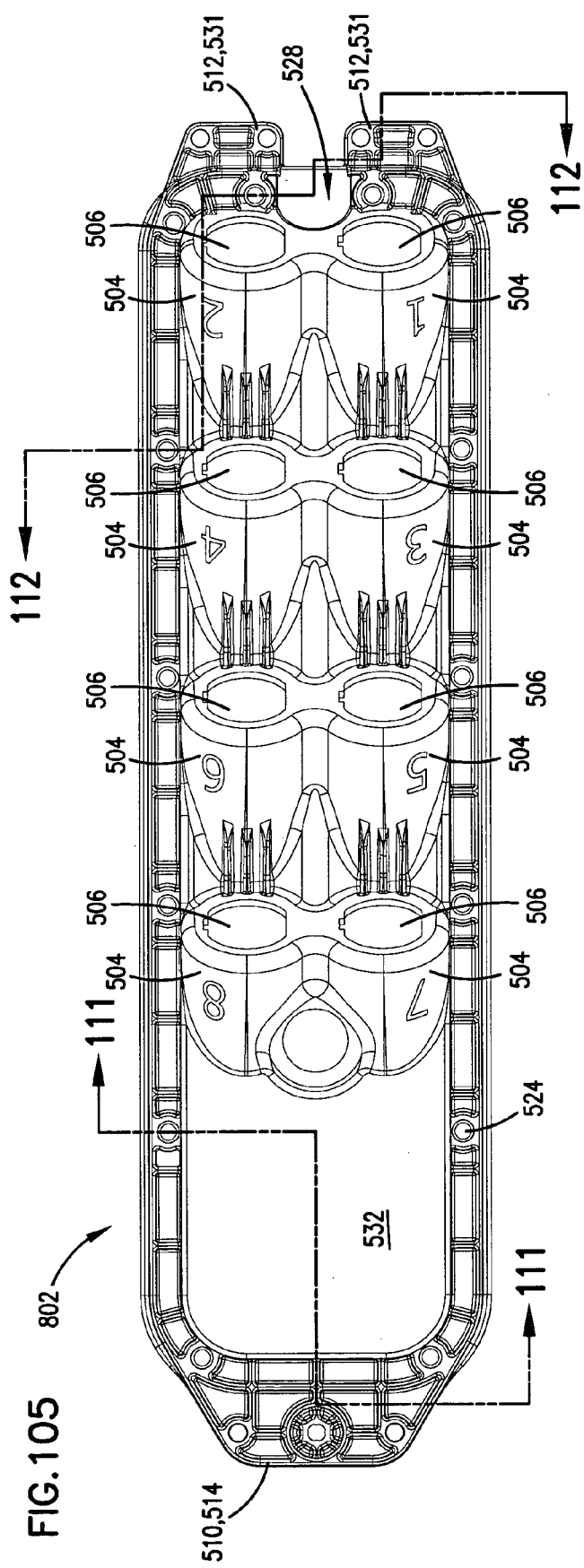
FIG. 105 is a view of an exterior back of the fiber access terminal housing of FIG. 103.
Figure 106:
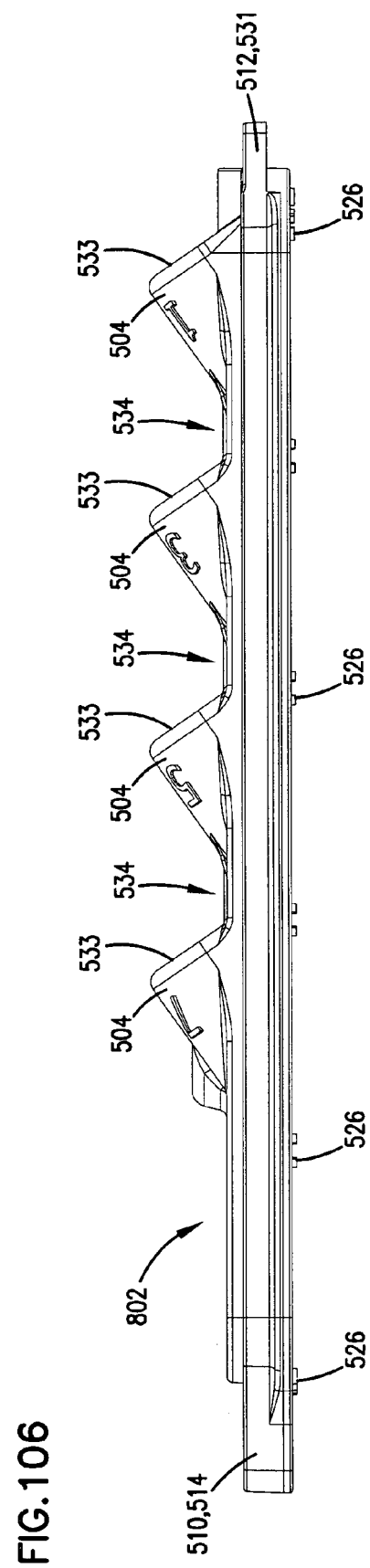
FIG. 106 is a side view of the fiber access terminal housing of FIG. 103.

Referring now to FIGS. 70 to 79 and 89, housing 502 of terminal 500 includes a plurality of angled mounting projections 504 each having an opening 506 for receiving a ruggedized optical fiber cable connection 508. As shown in FIG. 89, connections 508 are Corning Cable Systems Opti-Tap Connector, which includes an adapter for mating two terminated optical fibers. Other ruggedized or environmentally sealed optical fiber connection systems may also be used with the present invention. Housing 502 includes a top 510 and a base 512, and at top 512 is a pull-through tab 514 with an opening 516 to attaching a pull-through line. As noted above, it is anticipated that terminal 500 might be pre-mounted to a fiber distribution cable such as cable 276 and pulled through a conduit to a point where desired for connection to a customer drop cable. At base 512, a cable entry opening 528 is flanked by a pair of fastener openings 530 for mounting a cable clamp, such as shown in FIGS. 90 to 99, below. Fastener openings 530 are in a pair of lower tabs 531 of base end 512 which are positioned generally centered with the desired cable entry path through cable entry opening 528.

Figure 123:
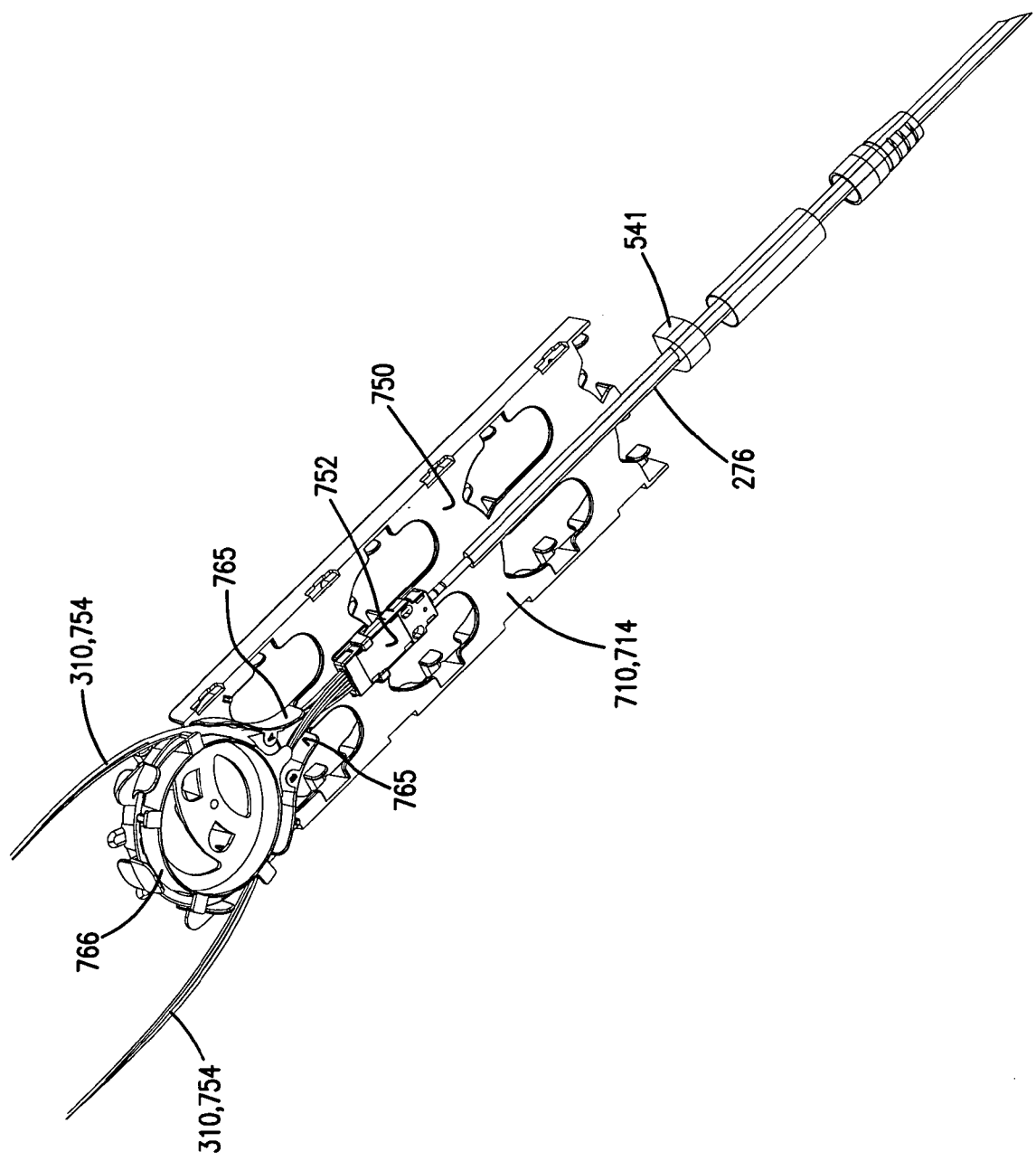
FIG. 123 is a perspective view of the cable routing and management insert of FIG. 119, with a multi-fiber fiber optic cable partially installed and routed about the insert.

Housing 502 includes an interior side 518 which will form a portion of an interior 503 when joined up with mating cover 505 shown in FIGS. 80 to 85, below. About a perimeter of interior side 518 is a recess 520 for receiving a flat gasket 522 (shown in FIG. 89). It is desirable that terminal 500 be configured to withstand weather extremes and environmental exposure that may occur from being mounted below ground level or in a damp environment. The use of flat gasket 522 may provide improved resistance to water or other contaminant intrusion that might be caused by exposure to multiple freeze-thaw cycles. A plurality of fastener openings 524 are positioned about the same perimeter extending through gasket 522. Fasteners such as screws may be extended through openings 524 to secure a cover to housing 502. Adjacent each opening 524 are a pair of spacers 526 to set the desired maximum compression of gasket 522 and prevent over tightening which may compromise the integrity of the seal. It is anticipated that gasket 522 will extend across cable entry opening 528 and provide a seal against a plug or insert which is positioned about an entering fiber distribution cable, such as cable 276, above. This plug is shown in FIG. 123, below.

On an exterior side 532 of housing 502, mounting projections 504 extend at an angle, as shown by the angling of mounting axes 536 with regard to a longitudinal axis 538 of housing 502. Each pair of adjacent mounting locations 504 defines a mounting face 533 which is angled toward base end 512. A narrow waisted area 534 is defined between the longitudinally separated pair of mounted projections 504. As can be seen from the base view of housing 502 in FIG. 77, angling of mounting projections 504 allows each successive row of projections 504 to be hidden behind the adjacent rows. As shown in the FIGS. below, different alternative embodiments of fiber access terminals similar to terminal 500 may be configured with more mounting projections without increasing the base area of the terminal.

Figure 74:
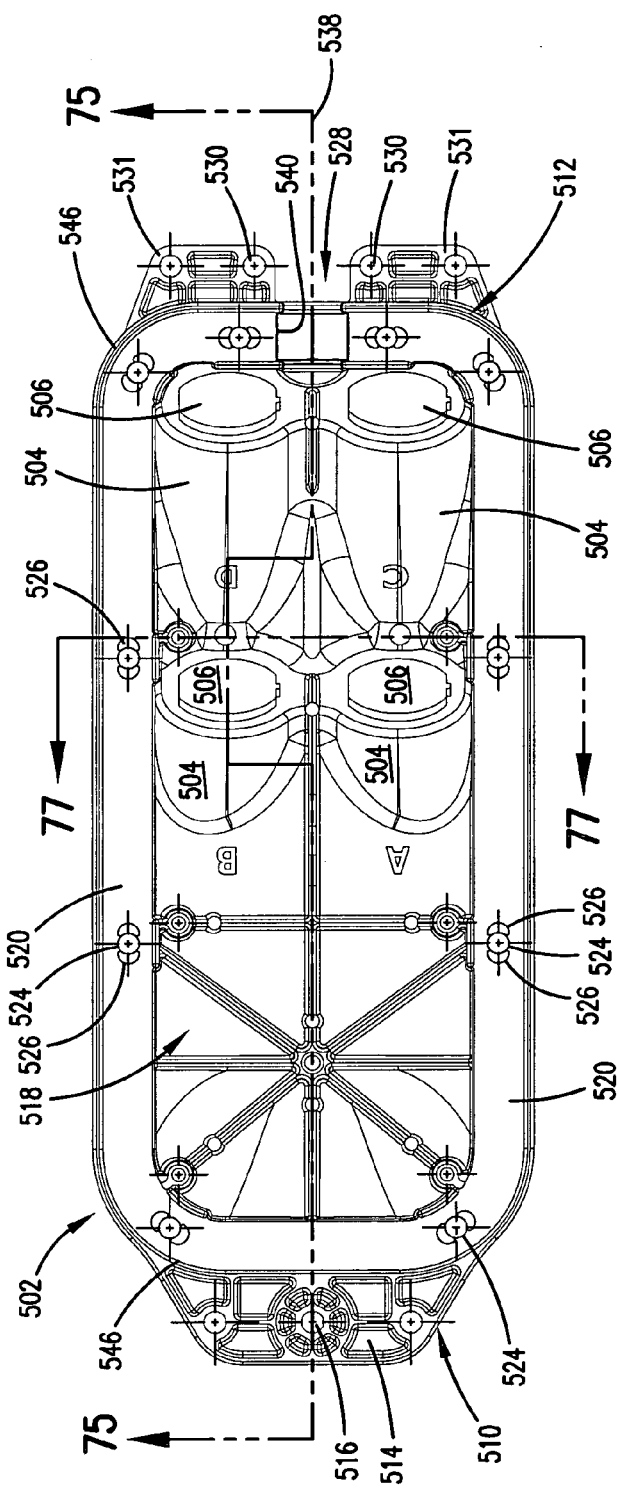
FIG. 74 is a view of an interior front of the fiber access terminal housing of FIG. 70.
Figure 75:
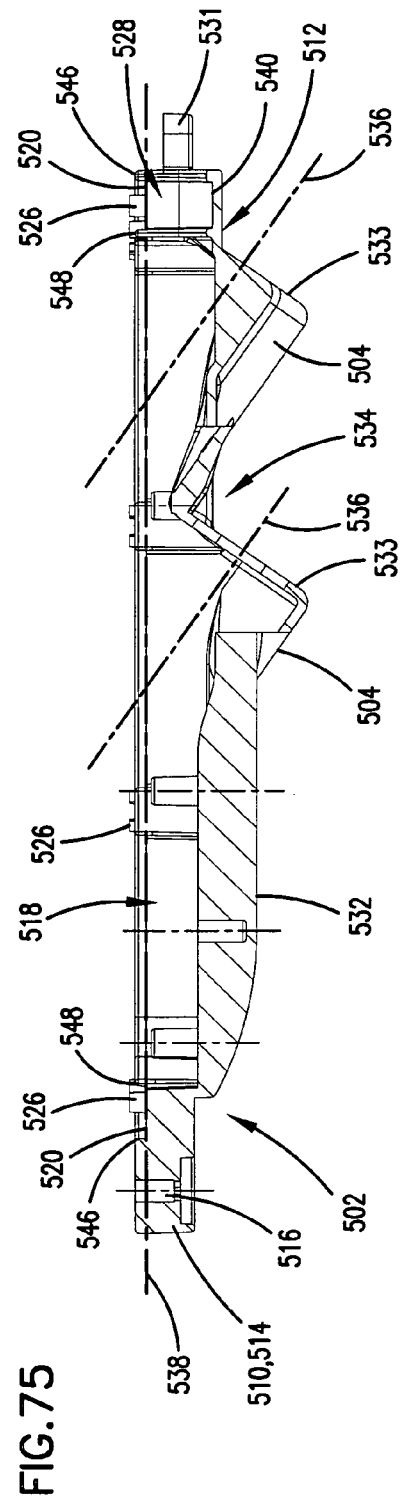
FIG. 75 is a cross-sectional view of the fiber access terminal of FIG. 70, taken along line 75-75 of FIG. 74.
Figure 76:
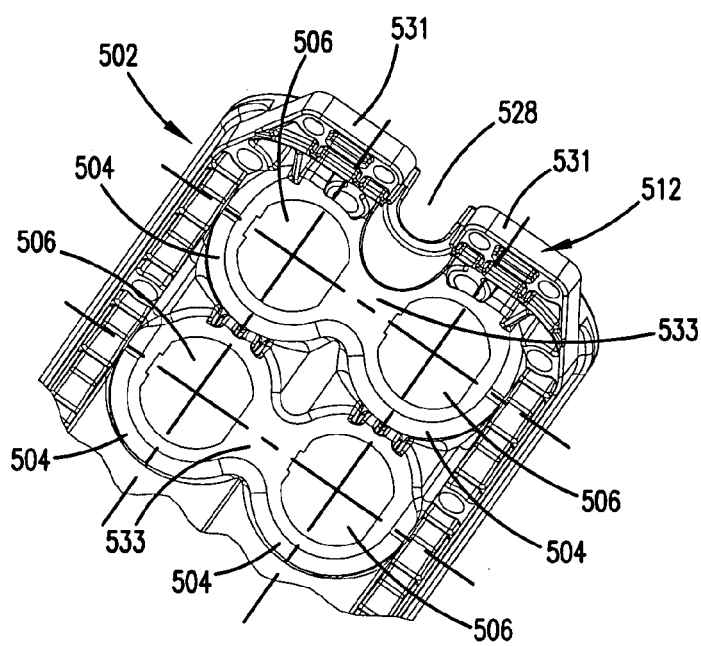
FIG. 76 is a closer view of connector mounting locations of the fiber access terminal housing of FIG. 70.
Figure 77:
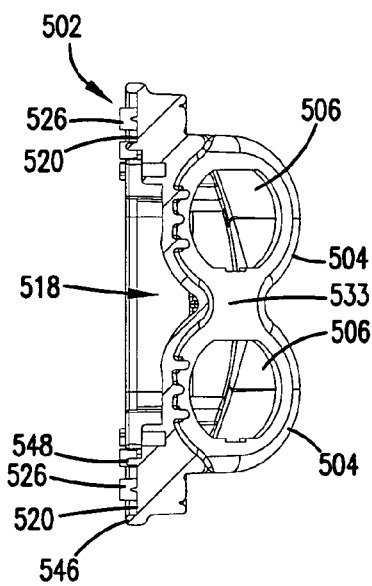
FIG. 77 is a base end cross-sectional view of the fiber access terminal housing of FIG. 70, taken along line 77-77 of FIG. 74.
Figure 78:
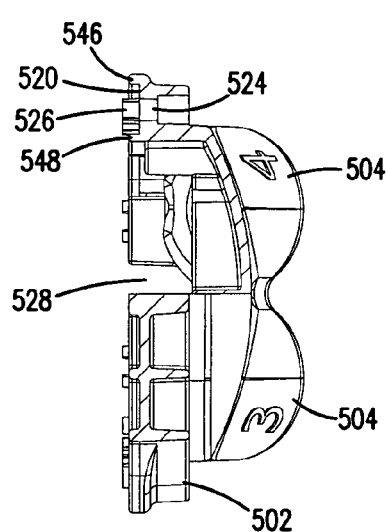
FIG. 78 is a top end view of the fiber access terminal housing of FIG. 70, with a partial cross-sectional view taken along line 78-78 in FIG. 72.
Figure 79:
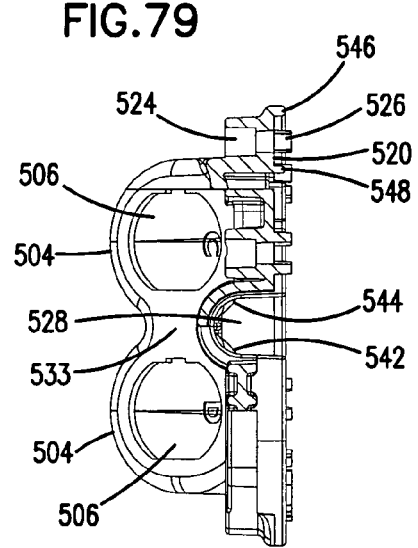
FIG. 79 is a base end view of the fiber access terminal housing of FIG. 70 with a partial cross-sectional view taken along line 79-79 in FIG. 72.
Figure 80:
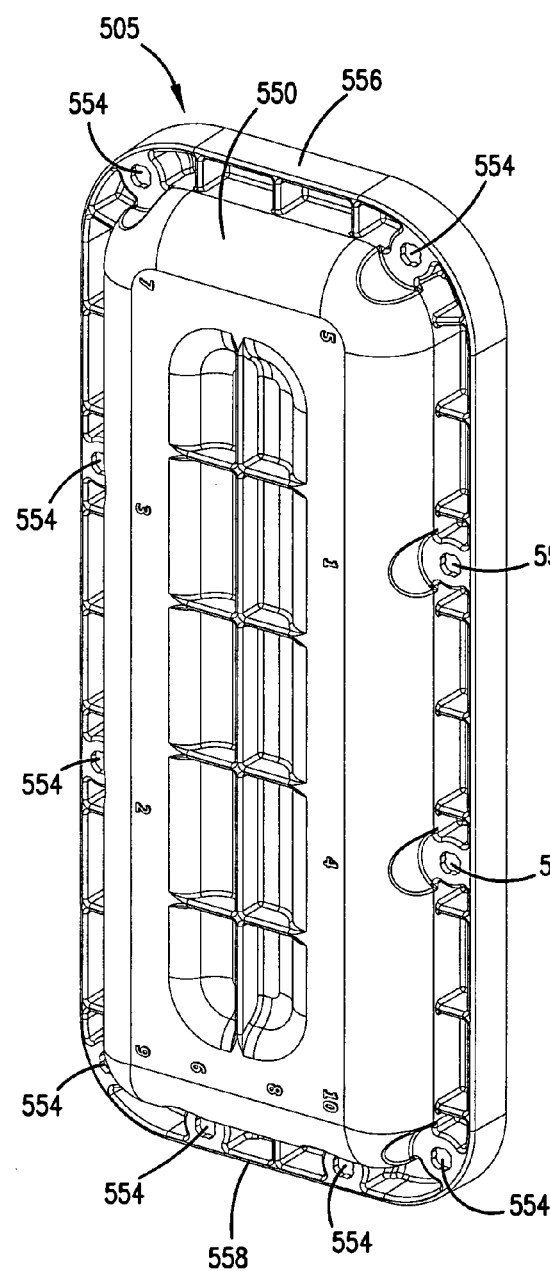
FIG. 80 is a first perspective view of a cover for use with the fiber access terminal housing of FIG. 70.
Figure 81:
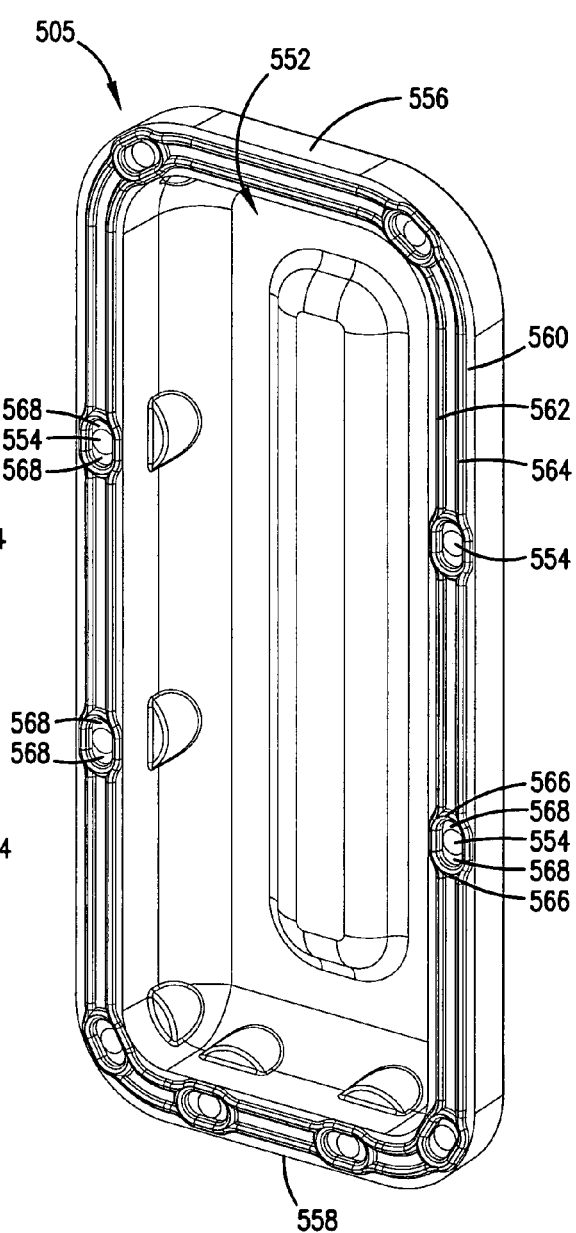
FIG. 81 is a second perspective view of the cover of FIG. 80.
Figure 85:
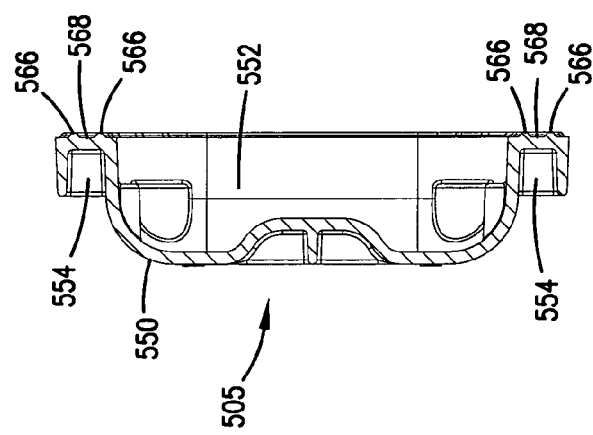
FIG. 85 is a cross-sectional base end view of the cover of FIG. 80, taken along line 85-85 in FIG. 84.
Figure 84:
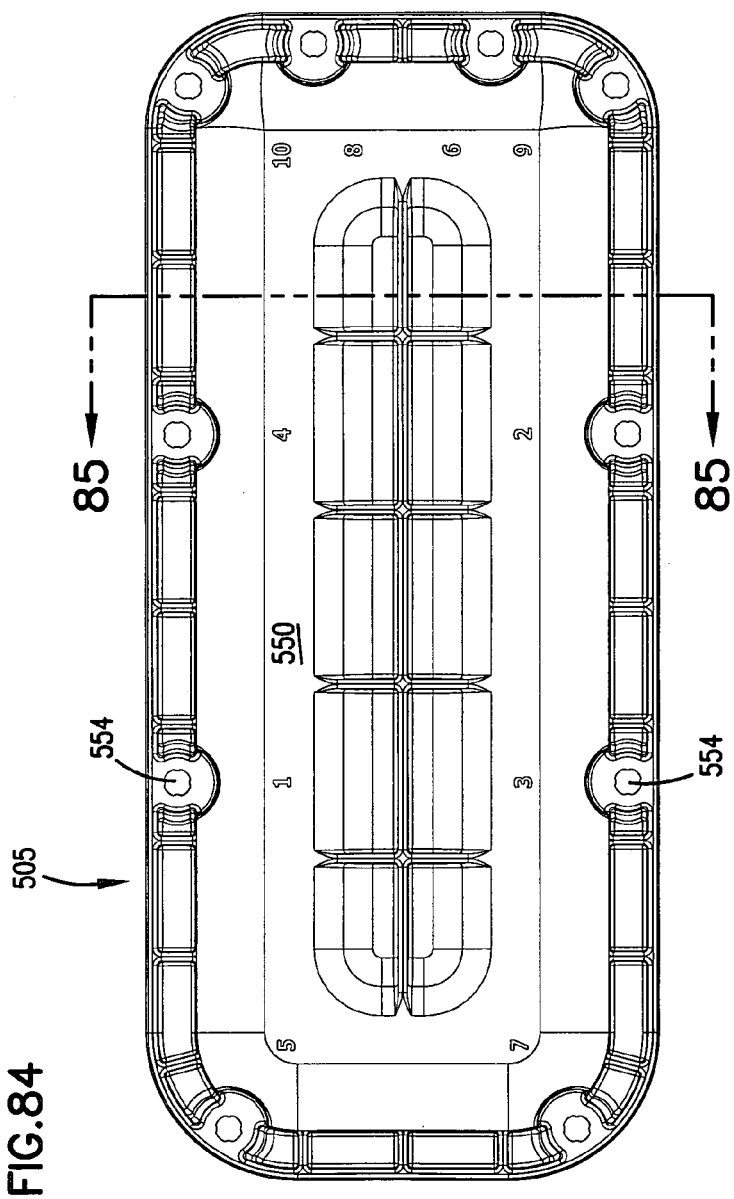
FIG. 84 is a view of an exterior back of the cover of FIG. 80.

Referring now to FIGS. 74 and 75, a recess 540 within cable entry opening 528 includes an outer lip 542 and an inner lip 544. The lips cooperate with a plug or insert 541 (shown in FIG. 123, below) to provide a environmental seal within opening 528 and cooperate with gasket 522 to complete the seal between cover 505 and housing 502. Referring now to FIGS. 71, 74, 75, and 77 to 79, a generally continuous outer wall 546 define an outer limit of gasket recess 520 and a plurality of spaced apart inner wall segments 548 cooperate to define an inner limit of gasket recess 520.

Referring now to FIGS. 80 to 85, cover 505 includes an interior side 550, an exterior side 552, a top 556 and a base 558. A plurality of fastener openings 554 are positioned about a perimeter of cover 505 to correspond with fastener openings 524 of housing 502. Interior side 552 cooperates with interior side 518 of housing 502 to form interior 503 when cover 505 is mounted to housing 502. Also along the perimeter of cover 505, on interior side 552 is a gasket seal surface 560 which corresponds to the location of gasket recess 520 of housing 502. On gasket surface 560 are a pair of ridges or gasket seals, an inner ridge 562 and an outer ridge 564. These ridges join to form a fastener seal 566 about each fastener opening 554. Within fastener seal 566 are a pair of recesses 568 which are sized to receive spacers 526 and provide a surface for spacers 526 to bottom out against. The engagement of recesses 568 and spacers 526 set the appropriate amount of compression of gasket 522. The engagement also sets the appropriate amount of deformation of gasket 522 by ridges 562 and 564. This set amount of deformation provides an enhanced seal against intrusion of water or other contaminants between cover 505 and housing 502.

Figure 86:
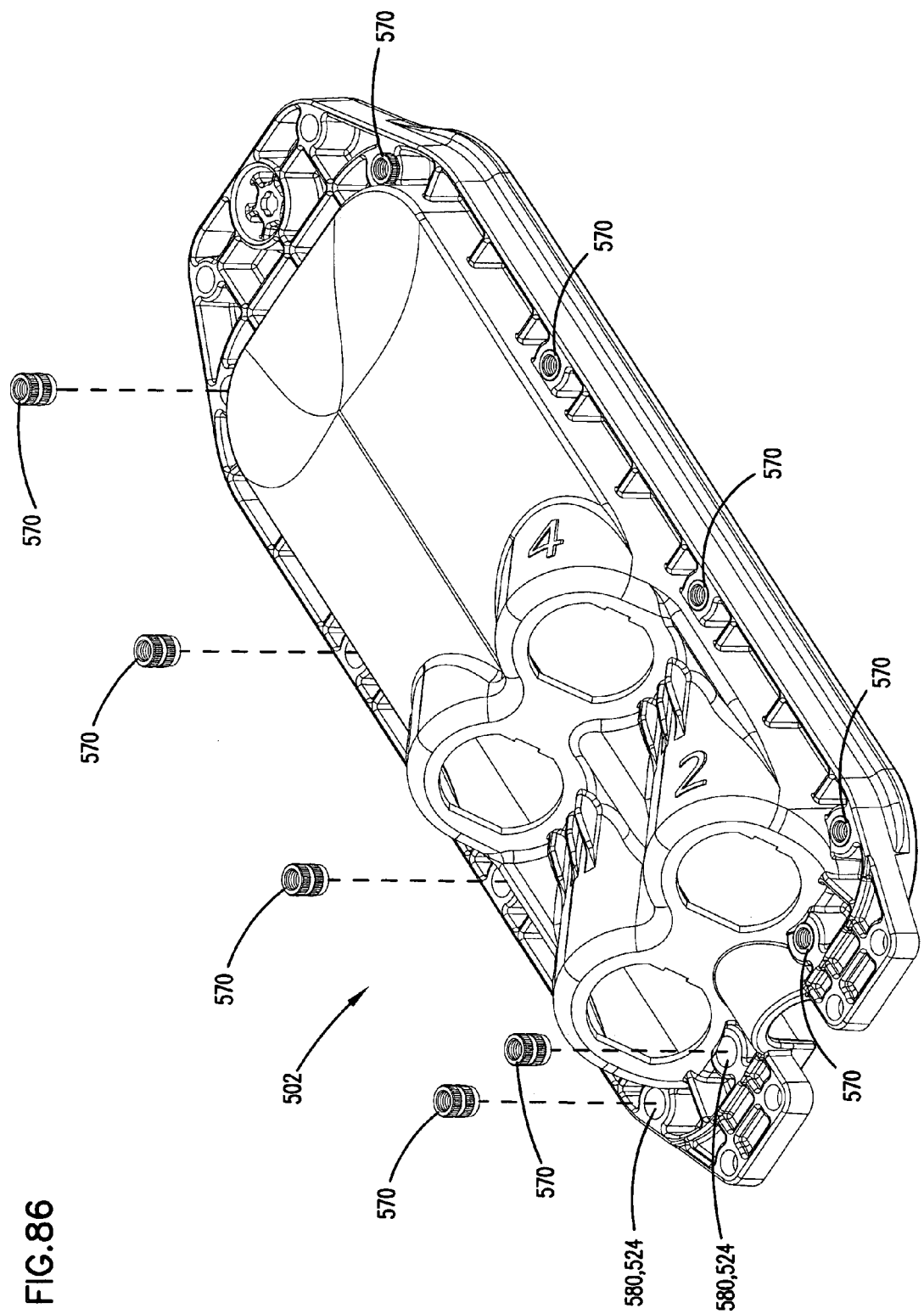
FIG. 86 is a partially exploded view of the fiber access terminal housing of FIG. 70, with a portion of the threaded fastener inserts exploded.
Figure 88:
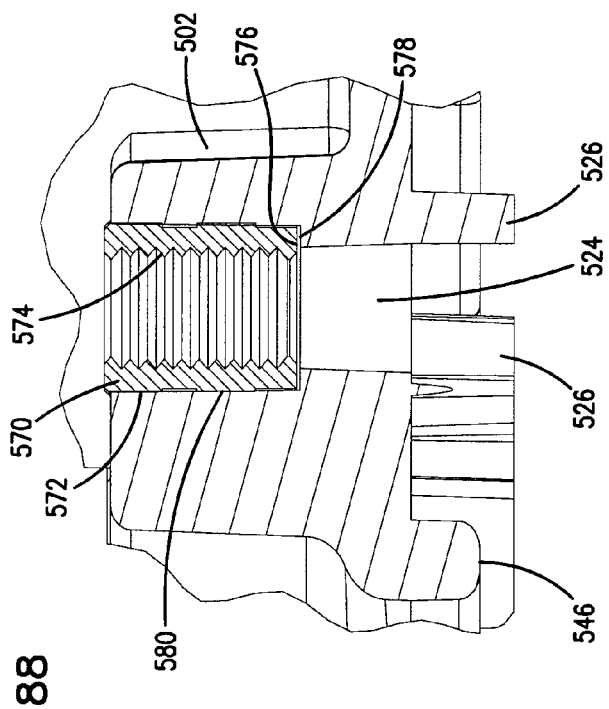
FIG. 88 is a cross-sectional view of one of the threaded fastener inserts positioned within an opening of the fiber access terminal housing of FIG. 86.
Figure 87:
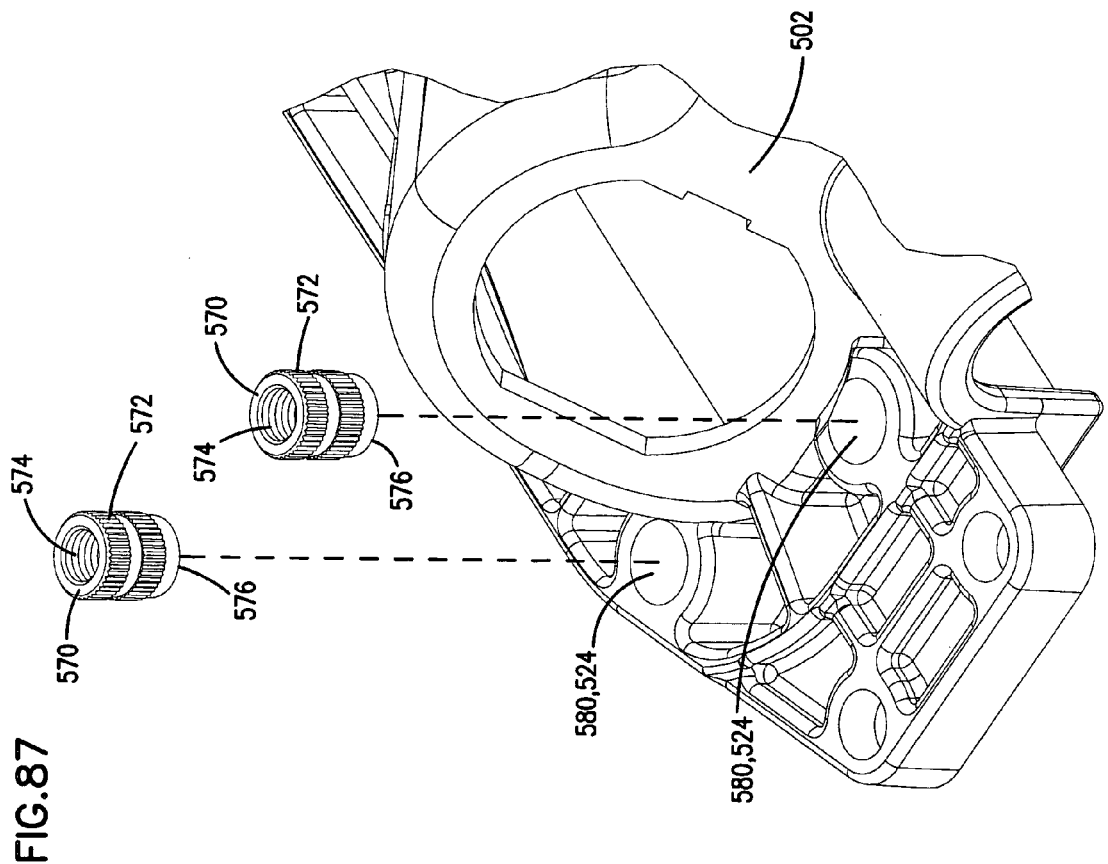
FIG. 87 is a closer view of one end of the fiber access terminal of FIG. 86, showing two of the threaded fastener inserts exploded.

Referring now to FIGS. 86 to 88, a threaded insert 570 may be used to reinforce openings 524 of housing 502 to provide enhanced strength and durability. It is anticipated that housing 502 may be constructed of a molded and/or machined polymeric material for reasons of economy and materials properties. Such materials may not be well suited for forming and maintaining sharp edges such as are needed to receive and secure removable fasteners such as screws within openings 524. Threaded inserts 570 may be made of a metallic or other durable material and inserted within openings 524 to provide a sharper and more durable thread 574 to engage a screw inserted through opening 524 from opening 554 of cover 505. A knurled surface 572 may be provided along an exterior of each inserted 570 to aid in retention of inserts 570 within an enlarged or countersunk portion 580 or opening 524. Inserts 570 may have a shoulder 576 which engages a mating shoulder 578 at the base of enlarged portion 580 within opening 524. Engaging insert 570 with a screw extending from one of openings 554 of cover 505 and tightening will tend to draw insert 570 deeper within enlarged portion 580 until shoulders 576 and 578 engage, preventing deeper insertion of insert 570. The screw can then be torqued sufficiently bring spacers 526 into engagement with recesses 568 and set the desired degree of compression and deformation of gasket 522.

FIG. 89 illustrates housing 502 with three ruggedized connections 508 positioned within openings 506 and extending from interior side 518 through to exterior side 532. A fourth connection 508 is shown exploded from its position within the remaining opening 506. Connections 508 are composed of a plurality of components and permit closing off and sealing of openings 506 from environmental and contaminant intrusion. Among these components are an inner seal 507 and an outer o-ring 509. An outer body assembly 582 includes a threaded portion 584 about which is positioned outer seal 509. Threaded portion 584 is inserted through opening 506 and is engaged by inner seal 507 and a threaded ring 586. Threaded ring 586 is used to draw outer body assembly 582 firmly within opening 506 so that outer seal 509 engages exterior side 532 and inner seal engages interior side 518. An adapter 588 is included within outer body assembly 582 and is accessible from interior side 518 to be engaged by interior fiber connector 592. When interior connector 592 is used to terminate an optical fiber cable, such as a fiber 10, within interior 503 of terminal 500, adapter 588 positions the optical fiber for optical connection with a fiber held by a connector configured mate with an outer opposite end of adapter 588 and outer body assembly 582. Alternatively, as shown, an outer seal cap 590 can be positioned in the outer opposite end of outer body assembly 582 to seal adapter 588 from external environmental intrusion. Gasket 522 is in place in gasket recess 520 and includes openings 594 about each fastener opening 524 to accommodate spacers 526.

FIGS. 90 to 99 illustrate a cable clamp half 600 for use with terminal 500. As shown in FIGS. 70 to 75, lowers tab 531 is positioned on either side of cable entry opening 528. A pair of cable clamp halves 600 are placed about fiber distribution cable 276 on base end 512. Each cable clamp half includes a body 602 and an extension 604 extending from one end of the body. Two pairs of fastener openings 606 and 607 extend through body 602. On an end of body 602 opposite extension 604 are recesses 608 which are sized and shaped to receive a corner of tabs 531 adjacent cable entry opening 528. A fastener positioned through one of the openings 607 will also extend through opening 530 of tab 531 and then into opening 607 of the second cable clamp half 600. This will secure cable clamp halves 600 to tabs 531 and thus to housing 502 and to terminal 500. One of each pair of openings 606 and 607 includes a hex-shaped recess on an outer surface 620. When assembled about cable 276, an inner face 622 of each cable clamp half 600 will rest against the inner face 622 of the other half 600.

Extension 604 includes a collar 612 and a pair of halves 600 may define a generally continuous collar. Collar 612 may be used to attached strain relief boots or other similar devices about cable 276 passing through a cable recess 614 formed in inner face 622. Cable recess 614 includes a first section 616 which may sized to fit about a fiber distribution cable but not fit too closely and provide a transition for the cable into a second section 618. Within second section 618 are a plurality of ribs 624 which extend into opening 614. Ribs 624 may cooperate to form a pair of first linear channel portions 626 on either side of a main channel portion 628. Portions 626 are sized to fit closely about linear strength members which may extend along one or both sides of cable 276. Portion 628 is sized to fit closely about a central tube of cable 276 where the fibers are carried. Passage through cable recesses 614 of a pair of cable clamp halves 600 attached to terminal 500 correctly positions cable 276 for entry into opening 528 and into interior 503. The closeness of fit of the shapes of portions 626 and 628 about cable 276 may also provide cable securing or tie-off to terminal 500, although it is anticipated that other cable clamping or tie-off elements may be provided in terminal 500.

Referring now to FIGS. 100 to 102, a cable routing and management insert 700 for positioning within interior side 518 of housing 502, the insert including a top end 702 and a base end 704. A pair of side wall 706 and 708 extend from one side of a base frame 710 to define a cable routing side 712, with an opposite side 714 of frame 710 including structure for receiving distribution cable 276 and directing the fibers 10 within that cable to routing side 712. Cable receiving side 714 includes a pair of brackets 716 for holding a cable mounted device, such as fanout or a splitter mounted to the end of cable 276. From there fibers within cable 276 are separated from each other and directed into an upper portion 718 of side 714 where the fibers are directed to adjacent one of side 706 or 708 and routed through fiber pass-throughs 720 from side 714 to side 712 as the fibers extend toward top end 702.

Once on side 712, fibers are routed through an upper portion 722 of cable routing structures of side 712 and redirected toward base end 704. The fibers may then be directed within a cable routing and slack storage path 724 of side 712 adjacent top end 702 defined within upper portion 722 between an inner wall 726 and outer containment structures 728. As the fibers extend within path 724 toward base end 704, path 724 becomes defined between side walls 706 and 708, and inner walls 730 and 732, respectively. Retention tabs 734 positioned about path 724 aid the retention of fibers within path 724 between tabs 734 and frame 710.

Outside of upper portion 722, a central wall 740 extends from frame 710 on side 712, dividing a lower portion 742 into two cavities, 736 and 738, which correspond to the number of rows of openings 506 in housing 502. Central wall 740 may also provided structural rigidity or strength to insert 700 to resist deflection. Within each cavity 736 and 738, are openings 744, corresponding in position to the location of connections 508. Fibers may pass from cable path 724 into one of openings 744 so that a connector mounted to the end of such fiber may be connected to connection 508 accessible through the opening 744. Fibers may pass about a circular path of upper portion 718 of side 714 or about cable path 724 of side 712 multiple times as necessary for the amount of excess length of slack in the fiber between fiber distribution cable 276 and the particular connection 508.

Referring now to FIGS. 103 to 112, a housing 802 of a seventh alternative embodiment 800 of a fiber access terminal according to the present invention is shown. Terminal 800 is similar in most respects to terminal 500 except that terminal 800 accommodates up to eight connections 508 in eight openings 506 in angled mounting locations 504. Aside from the length of housing 802 required to accommodate two additional pairs of mounting locations 504 and openings 506, housing 504 is generally the same as housing 502. Each of the pairs of mounting locations 504 define a mounting face 533 angled toward base end 512 with narrow waisted areas 534 between each of the mounting faces 534 and the next adjacent pair of mounting locations 504.

Figure 109:
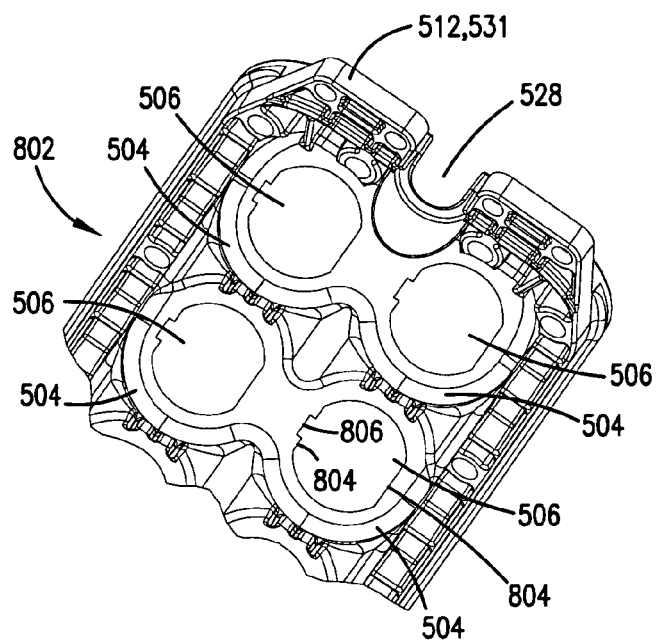
FIG. 109 is a closer perspective view of connector mounting locations of the fiber access terminal housing of FIG. 103.
Figure 110:
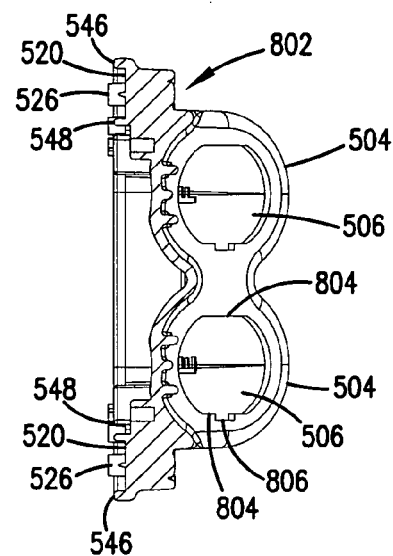
FIG. 110 is a base end view of the fiber access terminal housing of FIG. 103.
Figure 111:
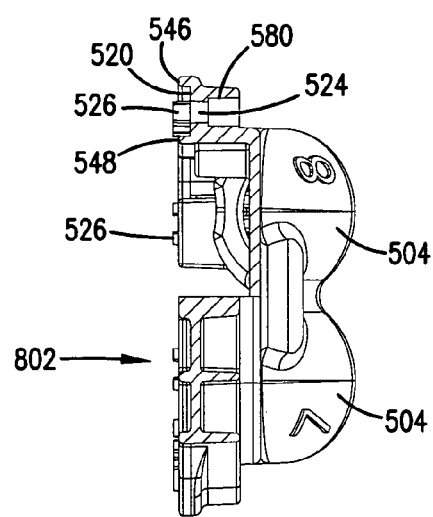
FIG. 111 is a top end view of the fiber access terminal housing of FIG. 103, with a partial cross-sectional view taken along line 111-111 in FIG. 105.
Figure 112:
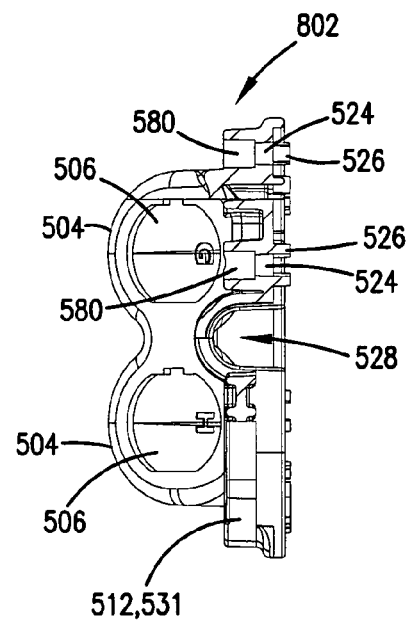
FIG. 112 is a base end view of the fiber access terminal housing of FIG. 103, with a partial cross-sectional view taken along line 112-112 in FIG. 105.
Figure 117:
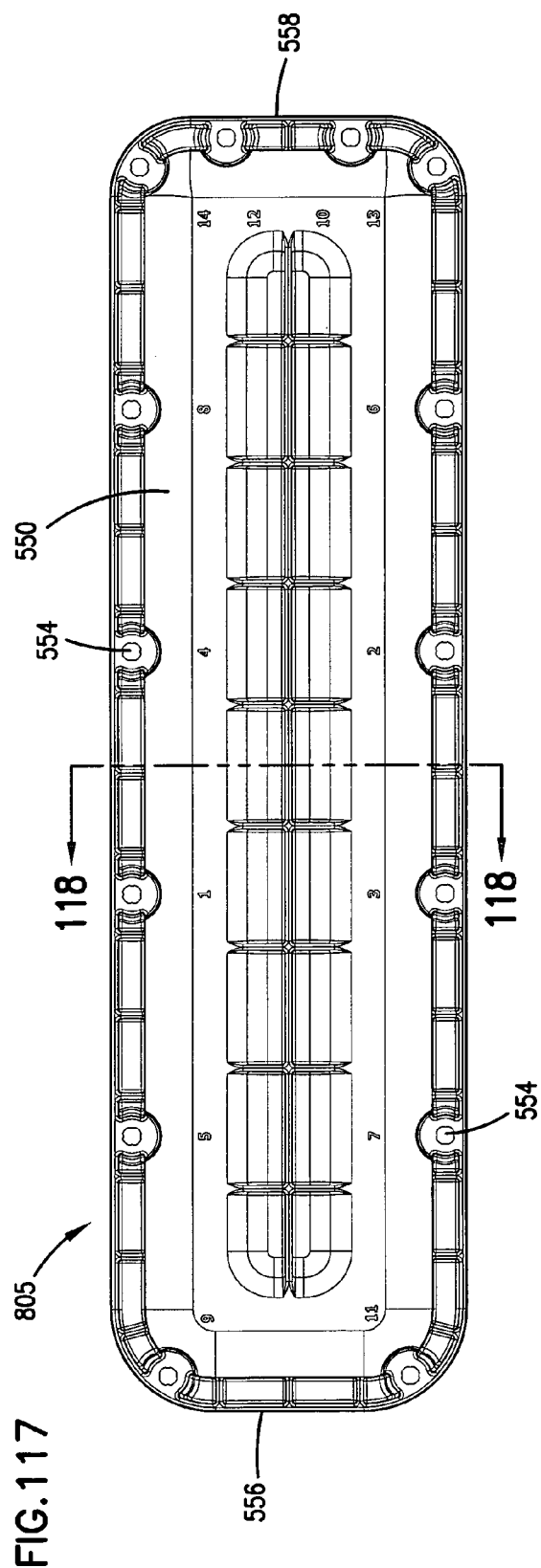
FIG. 117 is a view of an exterior back of the cover of FIG. 113.
Figure 118:
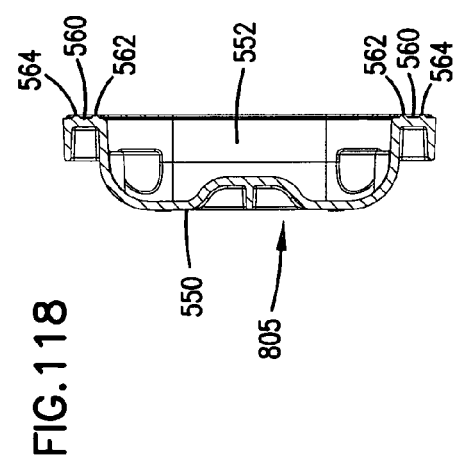
FIG. 118 is a cross-sectional base end view of the cover of FIG. 113, taken along line 118-118 in FIG. 117.

As is shown in FIGS. 109 and 110, mounting openings 506 include a pair of opposing flats 804 with one of the flats 804 including a key 806. Flats 804 and key 806 correspond to mating features of threaded portion 584 of connection 508 to correctly orient connection 508 within opening 506 and prevent connection 508 from twisting within opening 506. Similar features within opening 506 are shown in FIGS. 70 to 79, above, as well as in FIGS. 125 to 134, below.

Referring now to FIGS. 113 to 118, a mating cover 805 for joining with housing 802 to form an enclosure for fiber access terminal 800 is shown. Cover 805 is similarly configured to cover 505 except for being longer to accommodate the added length of housing 802 as compared to housing 502. Other than length, the remaining elements of cover 805 are essentially the same as cover 505.

Figure 119:
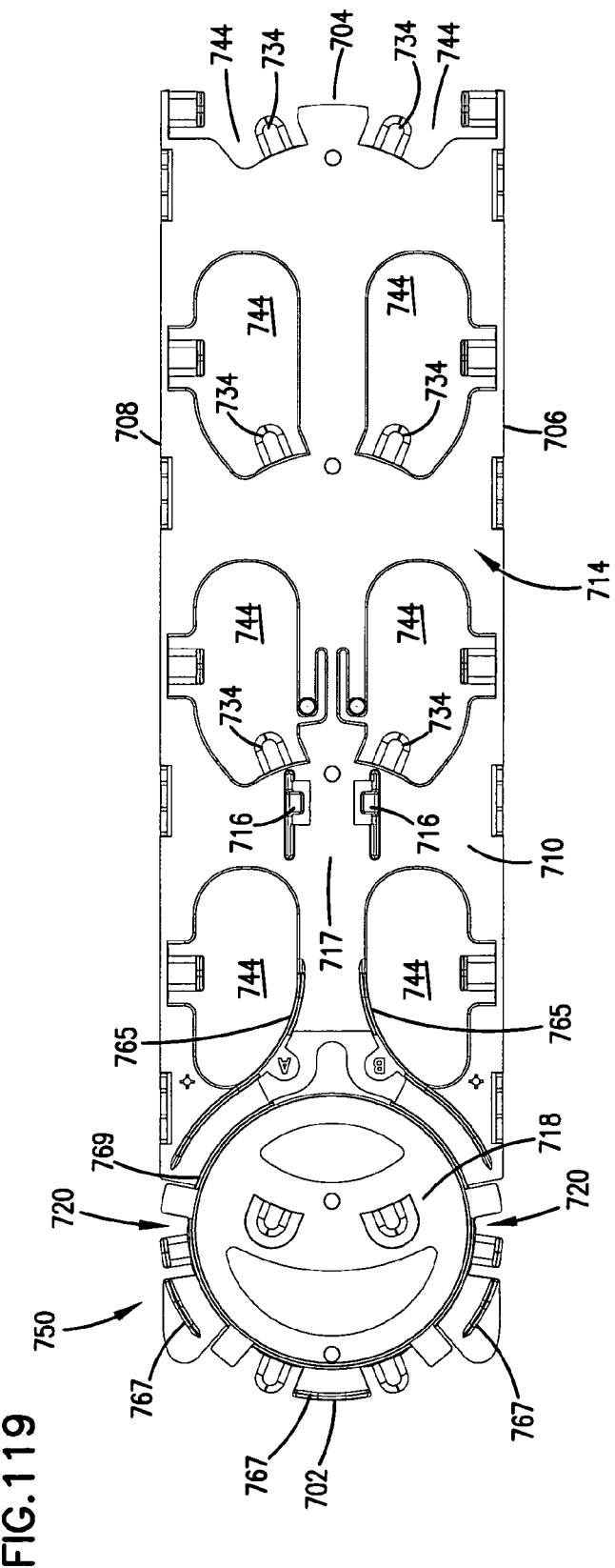
FIG. 119 is a is a perspective view of a cable routing and management insert for use with the fiber access housing of FIG. 103 and the cover of FIG. 113.
Figure 120:
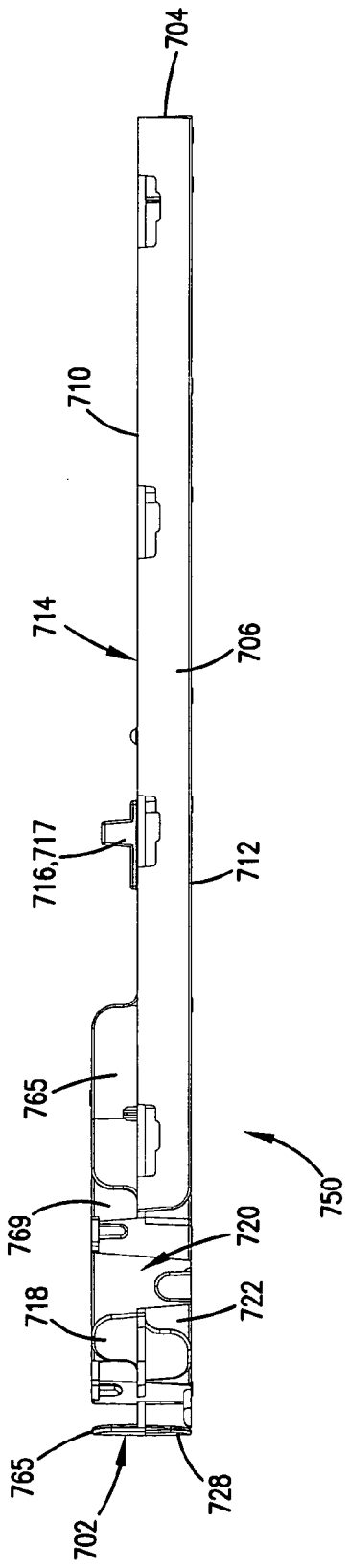
FIG. 120 is a first side of the cable routing and management insert of FIG. 119.

FIGS. 119 to 122 illustrate a cable routing and management insert 750 for use with housing 802 and cover 805. Insert 750 is similarly configured to insert 700, with the modification that it is elongated to fit within the longer housing 802 and to provide four additional openings 744 to permit fibers to extend to and connect with the four additional connections 508. FIG. 119 shows cable receiving side 714 is greater detail, which includes a device receiving area between brackets 716 for receiving the splitter, fanout or other device at the end of fiber distribution cable 276. A pair of outer walls 765 begin adjacent device receiving area 717 and are positioned toward top end 702 with respect to device receiving area 717. Outer walls 765 direct fibers from the device into upper portion 718 of side 714 and into a cable path 766 defined between outer walls 765 and a plurality of outer wall segments 767 and an inner wall 769. Pass-throughs 720 provide for fibers to be passed from path 766 on side 714 into path 724 on side 712.

Figures 121, 122:
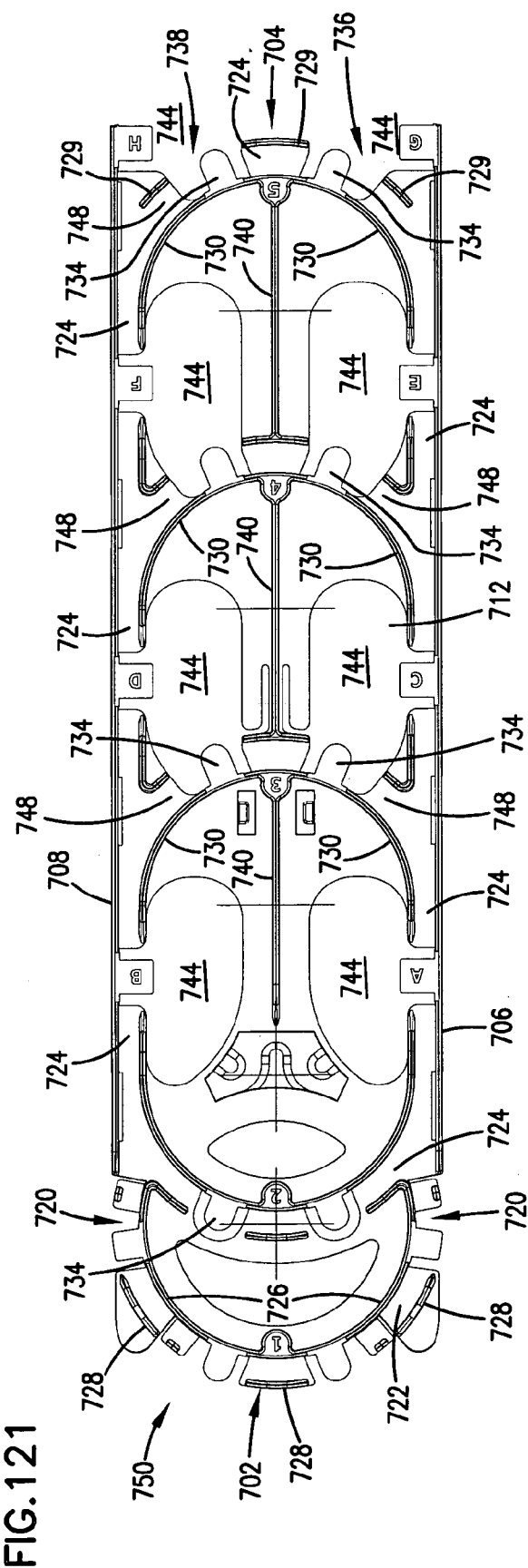
FIG. 121 is an edge view of the cable routing and management insert of FIG. 119.
FIG. 122 is a base end view of the cable routing and management insert of FIG. 119.

As shown in FIG. 121, cable routing side 712 is generally arranged similarly to side 710 of insert 700, with extension of cable path 724 to rout to and about four additional openings 744 for passing fibers from pat 724 to connections 508. To accommodate the need to route fibers to two additional pairs of connections 508, intermediate turnouts 548 along path 524 are provided so that different lengths of slack may be stored. Turnouts 548 provide additional cable slack storage and routing options which a single continuous loop about side 712 of insert 750 would not. Adjacent base end 704, additional outer wall segments 729 are included to define the outer boundary of path 724.

Figure 124:
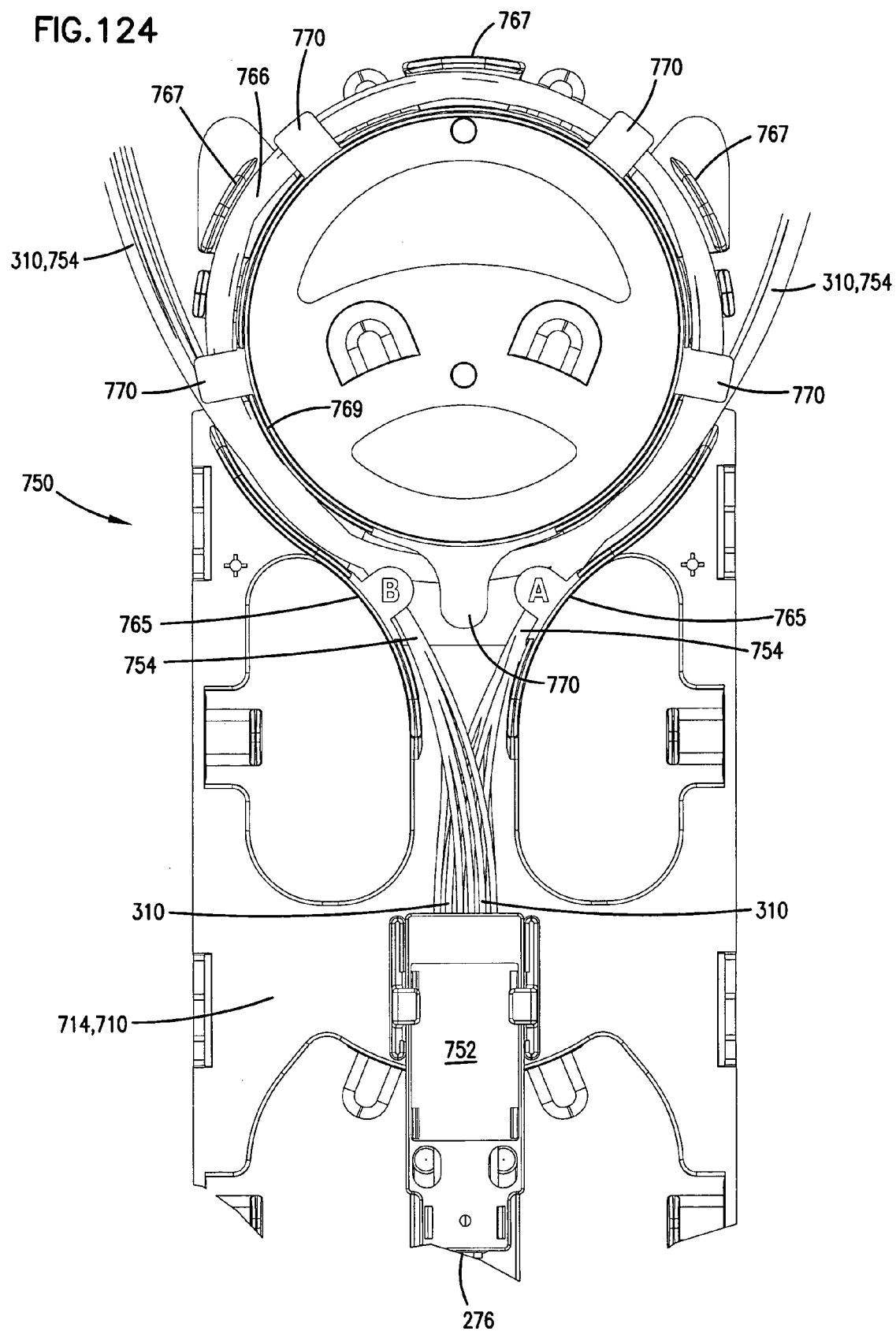
FIG. 124 is a closer view of a top end of the cable routing and management insert of FIG. 123, with a cable fanout mounted to the insert.
Figure 127:
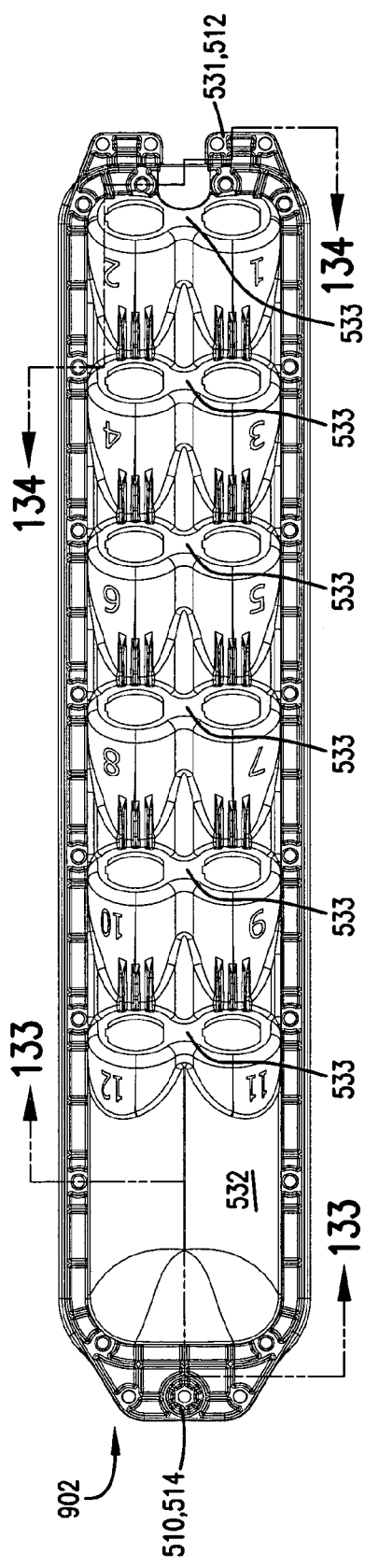
FIG. 127 is a view of an exterior back of the fiber access terminal housing of FIG. 125.
Figure 128:
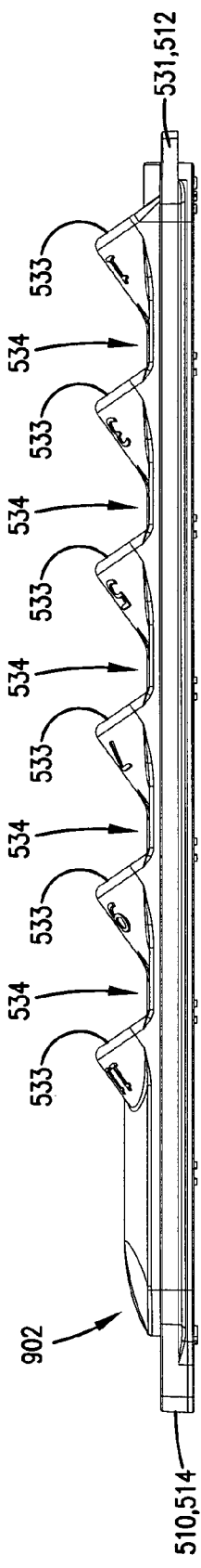
Figure 131:
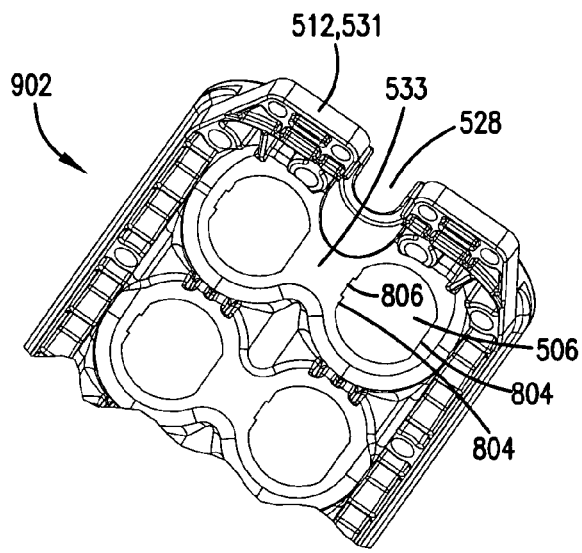
Figure 132:
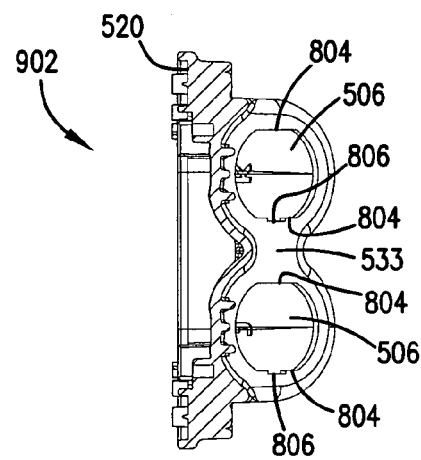
Figure 133:
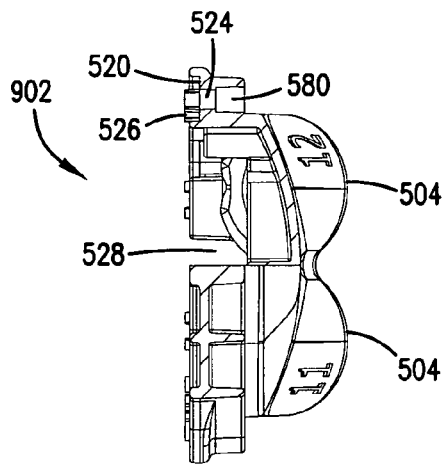
Figure 134:
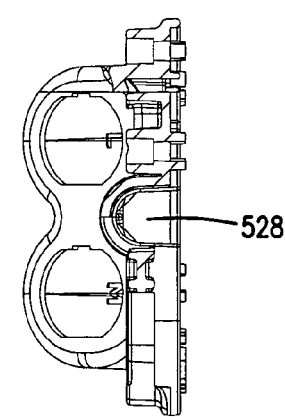
Figure 137:
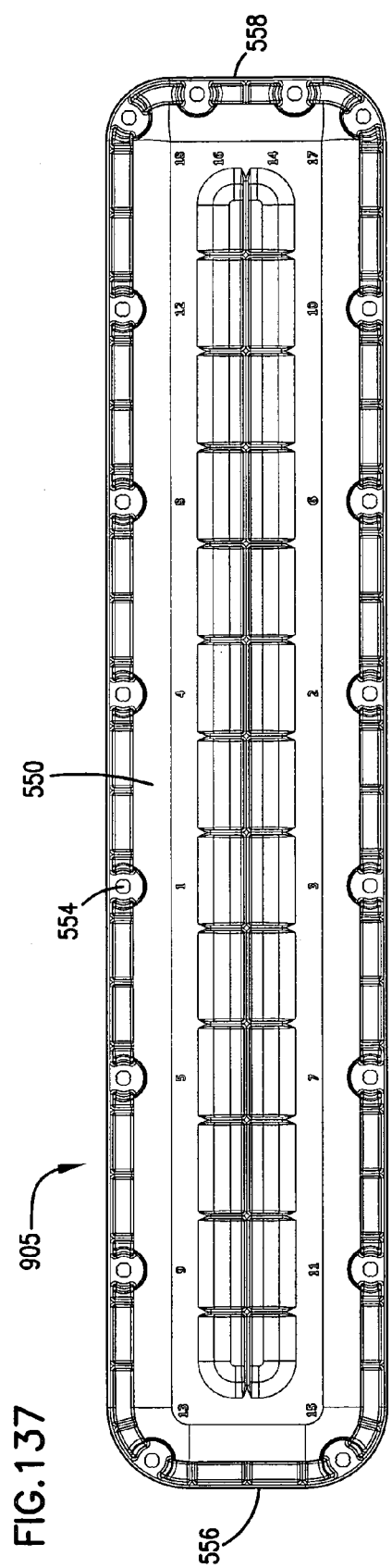
Figure 138:
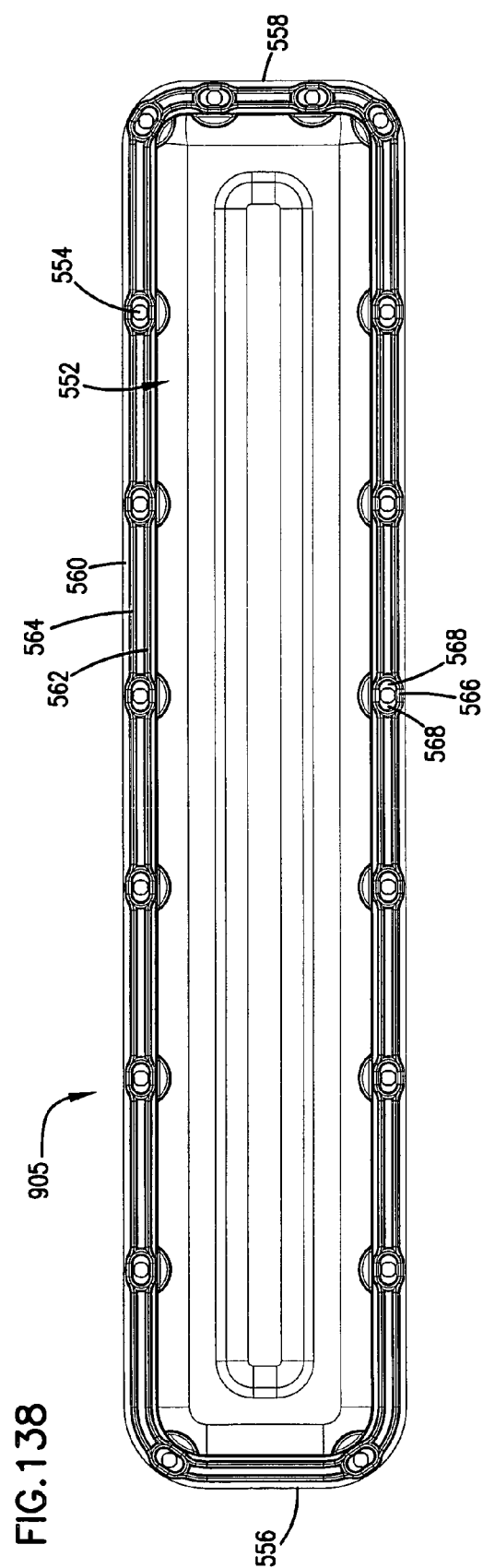

Referring now to FIGS. 123 and 124, insert 750 is shown with fiber distribution cable 276 extending across base end 704 to a fanout 752 positioned between brackets 716. A plurality of fibers 310 extend from fanout 752 and are split into two groups 754 of equal or similar numbers of fibers. One of these groups 754 is directed in path 766 clockwise about upper portion 718 and the other is directed in path 766 counter-clockwise. This split arrangement permits one half of the fibers 310 to be directed to connections 508 on one side or channel 736 of insert 750 and one half of the fibers 310 to be directed to connections 508 in the other channel 738. Once fibers 310 have been positioned within path 766, they may be routed multiple times about path 766 to store and manage excess cable length. A plurality of retention tabs 770 are positioned about path 766 to aid on the retention of fibers 310 within path 766.

FIGS. 125 to 140 illustrate an eighth alternative embodiment 900 of a fiber access terminal in accordance with the present invention. FIGS. 125 to 134 show a housing 902 which is consistent in design and function with housings 502 and 802, above. The differences between the two housings 502, 802 and 902 are the length of the housings and the number of mounting locations 504 and mounting openings 506 included in each embodiment. Otherwise, details of the layout of interior side 518 and exterior side 532 are essentially the same between the embodiments. Details regarding the arrangement of features and the mounting of connections 508 within openings 506 are unchanged.

Similarly, FIGS. 135 to 140 show a mating cover 905 for use with housing 902 to create terminal 900. Cover 905 is configured generally the same as covers 505 and 805, above, with the difference of being longer to mate with the longer housing 902. When mated, interior sides 518 and 552 face each other and define an interior 903 (not shown) within which cable 276 and fibers 310 are extended and directed to connections 508 mounted in openings 506. Cable 576 would pass into the interior through cable entry opening 528 in a similar fashion as described above.

Further, it is anticipated that a cable routing and management insert similar to 700 and 750 may be configured for use with terminal 900.

The embodiments of the inventions disclosed herein have been discussed for the purpose of familiarizing the reader with novel aspects of the present invention. Although preferred embodiments have been shown and described, many changes, modifications, and substitutions may be made by one having skill in the art without unnecessarily departing from the spirit and scope of the present invention. Having described preferred aspects and embodiments of the present invention, modifications and equivalents of the disclosed concepts may readily occur to one skilled in the art. However, it is intended that such modifications and equivalents be included within the scope of the claims which are appended hereto.

What is claimed is:

1. A fiber access terminal assembly comprising:
    a fiber optic distribution cable with a first end and a second end;
    an enclosure at the second end of the fiber optic distribution cable, the enclosure including a first piece and a second piece opposite the first piece, the first and second pieces cooperating to define an interior, a cable pass-through end, a non-pass-through end opposite the cable pass-through end, a front face, and a rear face opposite the front face;
    the first piece and second piece joined at an environmental seal;

the enclosure defining a plurality of mounting faces projecting outwardly on the front face and angled toward the cable pass-through end, and a plurality of openings disposed through the mounting faces and sized to receive fiber optic connections;

the enclosure including a tab integrally formed at the non-pass-through end of the enclosure that projects outwardly from the non-pass-through end, the tab including an attachment opening substantially perpendicular to an axis running from the non-pass-through end to the cable pass-through end;

the cable pass-through end of the enclosure including an opening through which the fiber optic distribution cable enters/exits the interior of the enclosure;

the fiber optic distribution cable including a plurality of optical fiber strands, the plurality of optical fiber strands separated from the fiber optic distribution cable within the interior and terminated with fiber optic connectors;

the enclosure including a plurality of fiber optic connections extending through the plurality of openings on the mounting faces of the enclosure, each of the connections having a first end within the interior configured to receive one of the connectors of the optical fiber strands within the interior, and a second end accessible from outside the enclosure configured to receive a connector of an optical fiber drop cable extending to an exterior of the fiber enclosure.

2. The fiber access terminal assembly of claim 1, wherein the environmental seal includes a recess and an edge between the first piece and the second piece.

3. The fiber access terminal assembly of claim 1, further comprising a gasket positioned within the recess.

4. The fiber access terminal assembly of claim 1, wherein each mounting face includes one opening having a fiber optic connection extending therethrough.

5. The fiber access terminal assembly of claim 1, further comprising a hinge mounting the first piece to the second piece.

6. A terminal assembly comprising:
a fiber optic cable with a first end and a second end;
an enclosure positioned at the second end of the fiber optic cable and having a cable pass-through end and a non-pass-through end, the enclosure including a front piece fastened to a rear piece, the front and rear pieces cooperating to define an interior volume of the enclosure, the front piece including a front side that faces in a forward direction and the rear piece including a rear side that faces in a rearward direction;
a tab that projects outwardly from the non-pass-through end of the enclosure, the tab defining a tab opening that extends through the tab in a front to rear direction;
the cable pass-through end of the enclosure defining an opening through which the fiber optic cable enters/exits the interior volume of the enclosure;
the fiber optic cable including a plurality of optical fibers, the optical fibers separated from one another within the interior volume of the enclosure, the optical fibers terminated by interior fiber optic connectors that are located within the interior volume of the enclosure;
the front side of the front piece including at least first, second, third and fourth mounting faces arranged in a stepped configuration with the second mounting face being positioned above the first mounting face, the third mounting face being positioned above the second mounting face and the fourth mounting face being positioned above the third mounting face, each of the first, second and third mounting faces being angled to face forwardly and downwardly;
at least some of the first, second, third and fourth mounting faces defining front openings;
front connectors mounted at the front openings, each of the front connectors including a fiber optic adapter, each of the front connectors being angled forwardly and downwardly, each of the front connectors including a first end accessible from within the interior volume of the enclosure and a second end accessible from outside the enclosure, the interior connectors of the optical fibers being received within the first ends of the front connectors, and the second ends of the front connectors being adapted to receive connectorized ends of exterior drop cables;
at least one of the front and rear pieces of the enclosure defining a recess that extends generally around a periphery of the enclosure;
a sealing member positioned within the recess for providing a seal between the front piece of the enclosure and the rear piece of the enclosure; and
at least ten fastening elements for fastening the front and rear pieces of the enclosure together, the fastening elements being positioned generally about the periphery of the enclosure.

7. The terminal assembly of claim 6, wherein at least some of the fastening elements include latches.

8. The terminal assembly of claim 6, wherein at least some of the fastening elements include hinges.

9. The terminal assembly of claim 6, wherein the sealing member includes an o-ring.

10. The terminal assembly of claim 6, wherein the front openings are defined through all of the first, second, third and fourth mounting faces.

11. A terminal assembly comprising:
a fiber optic cable;
an enclosure positioned at one end of the fiber optic cable, the enclosure having a cable pass-through end and an opposite non-pass-through end, the enclosure including a front piece fastened to a rear piece, the front and rear pieces cooperating to define an interior volume of the enclosure, the front piece including a front side that faces in a forward direction and the rear piece including a rear side that faces in a rearward direction;
a tab that projects outwardly from the non-pass-through end of the enclosure, the tab defining a tab opening that extends through the tab in a front to rear direction
the cable pass-through end of the enclosure defining an opening through which the fiber optic cable enters/exits the interior volume of the enclosure;
the fiber optic cable including a plurality of optical fibers, the optical fibers separated from one another within the interior volume of the enclosure, the optical fibers terminated by interior fiber optic connectors that are located within the interior volume of the enclosure;
the front side of the front piece including at least first, second, third and fourth mounting faces arranged in a stepped configuration with the second mounting face being positioned above the first mounting face, the third mounting face being positioned above the second mounting face and the fourth mounting face being positioned above the third mounting face, each of the first, second and third mounting faces being angled to face forwardly and toward the second end of the enclosure;
at least some of the first, second, third and fourth mounting faces defining front openings;

front connectors mounted at the front openings, each of the front connectors including a fiber optic adapter, each of the front connectors being angled forwardly and toward the second end of the enclosure, each of the front connectors including a first end accessible from within the interior volume of the enclosure and a second end accessible from outside the enclosure, the interior connectors of the optical fibers being received within the first ends of the front connectors, and the second ends of the front connectors being adapted to receive connectorized ends of exterior drop cables; and at least ten fastening elements for fastening the front and rear pieces of the enclosure together, the fastening elements being positioned generally about a periphery of the enclosure.

12. The fiber access terminal assembly of claim 1, wherein there is only one fiber optic distribution cable that enters/exits the enclosure and only one opening in the cable pass-through end.

13. The fiber access terminal assembly of claim 12, wherein the only one opening in the cable pass-through end is disposed generally in the center of the cable pass-through end.

14. The terminal assembly of claim 6, wherein there is only one fiber optic cable that enters/exits the enclosure and only one opening in the cable pass-through end.

15. The terminal assembly of claim 14, wherein the only one opening in the cable pass-through end is disposed generally in the center of the cable pass-through end.

16. The terminal assembly of claim 11, wherein there is only one fiber optic cable that enters/exits the enclosure and only one opening in the cable pass-through end.

17. The terminal assembly of claim 16, wherein the only one opening in the cable pass-through end is disposed generally in the center of the cable pass-through end.

* * * * *